(12) United States Patent
Schnellinger et al.

(10) Patent No.: US 11,859,589 B2
(45) Date of Patent: Jan. 2, 2024

(54) DIRECT CURRENT POWER PLANT

(71) Applicant: DEKA Products Limited Partnership, Manchester, NH (US)

(72) Inventors: Andrew A. Schnellinger, Merrimack, NH (US); James R. Lowell, Goffstown, NH (US); Bryan A. Finseth, Newbury, NH (US); Christopher L. Barber, Exeter, RI (US); Jason M. Sachs, Chandler, AZ (US); Donald J. Lucas, Windham, NH (US); Shannon Prescott, Loudon, NH (US); Jeffrey W. Kite, Manchester, NH (US); Andras K. Fekete, Fremont, NH (US); Douglas R. Adams, Pepperell, MA (US)

(73) Assignee: DEKA Products Limited Partnership, Manchester, NH (US)

( * ) Notice: Subject to any disclaimer, the term of this patent is extended or adjusted under 35 U.S.C. 154(b) by 0 days.

(21) Appl. No.: 17/748,458

(22) Filed: May 19, 2022

(65) Prior Publication Data

US 2022/0275781 A1 Sep. 1, 2022

Related U.S. Application Data

(62) Division of application No. 16/990,140, filed on Aug. 11, 2020, now Pat. No. 11,339,758, which is a (Continued)

(51) Int. Cl.
*F02N 11/08* (2006.01)
*F02G 1/043* (2006.01)
(Continued)

(52) U.S. Cl.
CPC .......... *F02N 11/0859* (2013.01); *F02G 1/043* (2013.01); *F02N 11/0866* (2013.01); (Continued)

(58) Field of Classification Search
CPC ............ F02N 11/0859; F02N 11/0866; F02N 2011/0885; F02G 1/043; F02G 2275/40; F24D 11/00; H02J 1/10
See application file for complete search history.

(56) References Cited

U.S. PATENT DOCUMENTS 4,295,085 A 10/1981 Lafuze
6,118,680 A 9/2000 Wallace et al.
(Continued)

FOREIGN PATENT DOCUMENTS

DE 19953940 A1 5/2000
WO WO2003076857 A2 9/2003
WO WO2014152706 A2 9/2014

OTHER PUBLICATIONS

International Search Report dated Sep. 16, 2016, PCT/US2016/037412, filed Jun. 14, 2016, entitled Direct Current Power Plant.
(Continued)

*Primary Examiner* — Viet P Nguyen
(74) *Attorney, Agent, or Firm* — William A. Bonk, III

(57) ABSTRACT

A DC power plant generating DC power from a variety of engines including a Stirling cycle engine. The DC power plant includes a relatively small start-up power source that is discontinued after the engine is running. A method for producing DC power for a load including starting up an engine using power supplied by a relatively small power supply supplemented by a capacitor bank, providing output from the engine to a generator, producing alternating current (AC) power by the generator, converting the AC power to direct current (DC) power, disabling output of the DC power during a first set of pre-selected conditions, limiting a rate of change of current of the DC power during a second set of pre-selected conditions, reducing conducted and radiated emissions of the DC power, disconnecting the DC power
(Continued)

from the load under a third set of pre-selected conditions, and providing the DC power to the load.

20 Claims, 49 Drawing Sheets

Related U.S. Application Data division of application No. 16/243,846, filed on Jan. 9, 2019, now Pat. No. 10,760,541, which is a division of application No. 15/182,147, filed on Jun. 14, 2016, now Pat. No. 10,215,146.

(60) Provisional application No. 62/188,240, filed on Jul. 2, 2015, provisional application No. 62/182,182, filed on Jun. 19, 2015.

(51) Int. Cl.
    *F24D 11/00*     (2022.01)
    *H02J 1/10*     (2006.01)

(52) U.S. Cl.
    CPC ............... *F24D 11/00* (2013.01); *H02J 1/10* (2013.01); *F02G 2275/40* (2013.01); *F02N 2011/0885* (2013.01)

(56) References Cited

U.S. PATENT DOCUMENTS

| | | | |
|---|---|---|---|
| 6,992,452 B1 | 1/2006 | Sachs et al. | |
| 7,701,705 B1 | 4/2010 | Szeremeta | |
| 8,344,528 B2 | 1/2013 | Bassett | |
| 8,866,334 B2 | 10/2014 | Donnelly et al. | |
| 8,957,710 B2 | 2/2015 | Liu | |
| 10,215,146 B2 | 2/2019 | Schnellinger et al. | |
| 2002/0175522 A1* | 11/2002 | Wacknov | H02P 9/30 290/52 |
| 2006/0266044 A1 | 11/2006 | Donnelly et al. | |
| 2008/0148993 A1 | 6/2008 | Mack | |
| 2008/0276610 A1 | 11/2008 | McDowell | |
| 2009/0206667 A1 | 8/2009 | Holliday | |
| 2011/0011078 A1 | 1/2011 | Kamen et al. | |
| 2011/0298219 A1 | 12/2011 | Wenger et al. | |
| 2012/0075755 A1 | 3/2012 | Kim et al. | |
| 2013/0099565 A1 | 4/2013 | Sachs et al. | |
| 2014/0071564 A1 | 3/2014 | Kim | |
| 2014/0091622 A1 | 4/2014 | Lucas et al. | |
| 2014/0307490 A1 | 10/2014 | Sagona | |
| 2015/0042102 A1 | 2/2015 | Hammerman et al. | |
| 2015/0084563 A1 | 3/2015 | Lucas et al. | |
| 2015/0318705 A1 | 11/2015 | Lucas et al. | |

OTHER PUBLICATIONS

Montalban, G. et al., Design of a power conditioning unit for a Stirling generator in space applications, IEEE First AESS European Conference on Satellite Telecommunications, Oct. 2, 2012, XP032296689, DOI: 10.1109/ESTEL.2012.6400101.
Written Opinion of the International Searching Authority, PCT/US2016/037412, filed Jun. 14, 2016, entitled Direct Current Power Plant.
Written Opinion of the International Searching Authority, PCT/US2014/027642, filed Mar. 14, 2014, entitled Modular Power Conversion System.

\* cited by examiner

|  | Message Priority | System Group | Functional Group | Module Group | Device Group | Message Group |
|---|---|---|---|---|---|---|
| bits | 28..26 | 25..23 | 22..19 | 18..12 | 11..9 | 8..0 |
| mask | 0x1C000000 | 0x03800000 | 0x00780000 | 0x0007F000 | 0x00000E00 | 0x000001FF |

FIG. 14A

| Message Priority | 3 bits | actual value | 28..26 | | |
|---|---|---|---|---|---|
| Critical | 00 | 0x00000000 | Priority 0 (highest) | | highest priority control and alarm messages |
| Priority 1 | 10 | 0x04000000 | Priority 1 | | |
| Priority 2 | 20 | 0x08000000 | Priority 2 | cRIO to Power Electronics | |
| Priority 3 | 30 | 0x0C000000 | Priority 3 | Power Electronics to cRIO | |
| Priority 4 | 40 | 0x10000000 | Priority 4 | cRIO to Power Electronics VFDs | |
| Priority 5 | 50 | 0x14000000 | Priority 5 | Power Electronics VFDs to cRIO | |
| Priority 6 | 60 | 0x18000000 | Priority 6 | | |
| Priority 7 (lowest) | 70 | 0x1C000000 | Priority 7 (lowest) | | |

| Module | Type | Attributes | Total (Actual value) |
|---|---|---|---|
| 4 bits for type, 3 bits for attributes | 4bits | 3bits | 7bits |
| | 18..15 | 14..12 | 18..12 |
| | 0x00000000-0x00078000 | 0x00000000-0x00007000 | 0x00000000-0x00020000 |
| Production | | | 0x00000000-0x00020000 |
| *Generator* | 0x00000000-0x00000000 | | 0x00000000-0x00007000 |
| Generator, Diesel, single-phase | | 0 | 0x00000000 |
| Generator, Diesel, three-phase | | 1 | 0x00001000 |
| Generator, Stirling, single-phase | | 2 | 0x00002000 |
| Generator, Stirling, three-phase | | 3 | 0x00003000 |
| Generator, Gasoline, single-phase | | 4 | 0x00004000 |
| Generator, Gasoline, three-phase | | 5 | 0x00005000 |
| Generator, Wind, single-phase | | 6 | 0x00006000 |
| Generator, Wind, three-phase | | 7 | 0x00007000 |
| *Photovoltaic* | 0x00008000 | | 0x00008000-0x0000F000 |
| *Fuel Cell* | 0x00010000 | | 0x00010000-0x00017000 |
| *TBD Production* | 0x00018000 | | 0x00018000-0x0001F000 |
| Transmission | | | 0x00020000-0x00037000 |
| *Grid-tied Inverter* | 0x00020000 | | 0x00020000-0x00027000 |
| *Static Transfer Switch* | 0x00028000 | | 0x00028000-0x0002F000 |
| *TBD Transmission* | 0x00030000 | | 0x00030000-0x00037000 |

FIG. 14E

| Module | Type | Attributes | Total (Actual value) |
|---|---|---|---|
| Storage | | | 0x00038000-0x00047000 |
| Battery | 0x00038000 | | 0x00038000-0x0003F000 |
| | | | |
| TBD Storage | 0x00040000 | | 0x00040000-0x00047000 |
| | | | |
| Consumption | | | 0x00048000-0x0005F000 |
| Power Quality Inverter | 0x00048000 | | 0x00048000-0x0004F000 |
| | | | |
| Battery Charger | 0x00050000 | | 0x00050000-0x00057000 |
| | | | |
| TBD Consumption | 0x00058000 | | 0x00058000-0x0005F000 |
| | | | |
| Utility | | | 0x00060000-0x0006F000 |
| General Purpose Motor Drive (GPMD) | 0x00060000 | | 0x00060000-0x00067000 |
| Variable Frequency Drive (VFD) | | 0 | 0x00060000 |
| TBD1 | | 1 | 0x00061000 |
| TBD2 | | 2 | 0x00062000 |
| TBD3 | | 3 | 0x00063000 |
| TBD4 | | 4 | 0x00064000 |
| TBD5 | | 5 | 0x00065000 |
| TBD6 | | 6 | 0x00066000 |
| TBD7 | | 7 | 0x00067000 |
| | | | |
| TBD Utility | 0x00068000 | | 0x00068000-0x0006F000 |
| | | | |
| ETC | | | 0x00070000-0x0007F000 |
| TBD etc | 0x00070000 | | 0x00070000-0x00077000 |
| | | | |
| TBD etc | 0x00078000 | | 0x00078000-0x0007F000 |

FIG. 14F

| Device | 3 bits | 11...9 |
|---|---|---|
| | For System (Power Electronics), Functional (Utility), Module (VFD) | |
| | | actual value |
| VFD combustion | 0 | 0x00000000 |
| TBD | 1 | 0x00000200 |
| TBD | 2 | 0x00000400 |
| VFD waterpump | 3 | 0x00000600 |
| TBD | 4 | 0x00000800 |
| TBD | 5 | 0x00000A00 |
| VFD radiator | 6 | 0x00000C00 |
| TBD | 7 | 0x00000E00 |

FIG. 14G

| Priority | Fct | Module | Device | Base ID | Message Base | Message Detail | Msg Idx | Msg ID | Fmt |
|---|---|---|---|---|---|---|---|---|---|
| Critical | prod | Generator, Stirling, three-phase | 0 | 0x00005000 | Engine Controller to Electronics Controller | Critical Control Flags | 2 | 0x00005002 | 6 |
| Critical | prod | Generator, Stirling, three-phase | 0 | 0x00005000 | Engine Controller to Electronics Controller | Velocity Command | 3 | 0x00005003 | 1 |
| Critical | prod | Generator, Stirling, three-phase | 0 | 0x00005000 | Engine Controller to Electronics Controller | TC-motor, TC-battery | 4 | 0x00005004 | 2 |
| Critical | prod | Generator, Stirling, three-phase | 0 | 0x00005000 | Engine Controller to Electronics Controller | unused, Ibat | 5 | 0x00005005 | 2 |
| Critical | prod | Generator, Stirling, three-phase | 0 | 0x00005000 | Engine Controller to Electronics Controller | unused, Ips | 6 | 0x00005006 | 2 |
| Critical | prod | Generator, Stirling, three-phase | 0 | 0x00005000 | Engine Controller to Electronics Controller | PV ambient temperature, PV ambient intensity | 7 | 0x00005007 | 2 |
| Critical | prod | Generator, Stirling, three-phase | 0 | 0x00005000 | Engine Controller to Electronics Controller | TC-HS1, TC-HS2, TC-Cabinet | 8 | 0x00005008 | 3 |

| Pty | Fct | Module | Dev | Base ID | Message Base | Message Detail | Msg Idx | Msg ID | Fmt |
|---|---|---|---|---|---|---|---|---|---|
| 2 | prod | Generator, Stirling, three-phase | 0 | 0x08005100 | Electronics Controller to Engine Controller | Motor Iq, Id, | 256 | 0x08005100 | 2 |
| 2 | prod | Generator, Stirling, three-phase | 0 | 0x08005100 | Electronics Controller to Engine Controller | RPM, VDC_Bus | 257 | 0x08005101 | 2 |
| 2 | prod | Generator, Stirling, three-phase | 0 | 0x08005100 | Electronics Controller to Engine Controller | Motor Uq, Ud | 258 | 0x08005102 | 2 |
| 2 | prod | Generator, Stirling, three-phase | 0 | 0x08005100 | Electronics Controller to Engine Controller | VBat, IBat | 259 | 0x08005103 | 2 |
| 2 | prod | Generator, Stirling, three-phase | 0 | 0x08005100 | Electronics Controller to Engine Controller | TC-motor, TC-battery | 260 | 0x08005104 | 2 |
| 2 | prod | Generator, Stirling, three-phase | 0 | 0x08005100 | Electronics Controller to Engine Controller | Inv_Vab, Inv_Vbc, Inv_Vca | 261 | 0x08005105 | 3 |
| 2 | prod | Generator, Stirling, three-phase | 0 | 0x08005100 | Electronics Controller to Engine Controller | Inv_W, Inv_VA | 262 | 0x08005106 | 5 |
| 2 | prod | Generator, Stirling, three-phase | 0 | 0x08005100 | Electronics Controller to Engine Controller | Inv_Ia, Inv_Ib, Inv_Ic | 263 | 0x08005107 | 3 |
| 2 | prod | Generator, Stirling, three-phase | 0 | 0x08005100 | Electronics Controller to Engine Controller | Inv_PF, Inv_CF | 264 | 0x08005108 | 2 |
| 2 | prod | Generator, Stirling, three-phase | 0 | 0x08005100 | Electronics Controller to Engine Controller | Motor Watts, Brake Watts | 265 | 0x08005109 | 5 |

| Pty | Fct | Module | Device Base ID | Message Base | Message Detail | Msg Index | Msg ID | Fmt |
|---|---|---|---|---|---|---|---|---|
| 2 | prod | Generator, Stirling, three-phase | 0 | 0x08005100 | Electronics Controller to Engine Controller | Battery Watts, PV Watts TC-low, TC-avg, TC-high across the 8 aux sensors | 266 | 0x0800510A | 5 |
| 2 | prod | Generator, Stirling, three-phase | 0 | 0x08005100 | Electronics Controller to Engine Controller | | 267 | 0x0800510B | 3 |
| 2 | prod | Generator, Stirling, three-phase | 0 | 0x08005100 | Electronics Controller to Engine Controller | System Faults / Status | 268 | 0x0800510C | 6 |
| 2 | prod | Generator, Stirling, three-phase | 0 | 0x08005100 | Electronics Controller to Engine Controller | Power Stage Faults | 269 | 0x0800510D | 6 |
| 2 | prod | Generator, Stirling, three-phase | 0 | 0x08005100 | Electronics Controller to Engine Controller | Overvoltage Regulator Faults / Status | 270 | 0x0800510E | 6 |
| 2 | prod | Generator, Stirling, three-phase | 0 | 0x08005100 | Electronics Controller to Engine Controller | Motor Drive Faults / Status | 271 | 0x0800510F | 6 |
| 2 | prod | Generator, Stirling, three-phase | 0 | 0x08005100 | Electronics Controller to Engine Controller | Buck/Boost Faults / Status | 272 | 0x08005110 | 6 |
| 2 | prod | Generator, Stirling, three-phase | 0 | 0x08005100 | Electronics Controller to Engine Controller | Inverter Faults / Status | 273 | 0x08005111 | 6 |
| 2 | prod | Generator, Stirling, three-phase | 0 | 0x08005100 | Electronics Controller to Engine Controller | Aux Temperature Sensors 1 - 4 | 274 | 0x08005112 | 6 |
| 2 | prod | Generator, Stirling, three-phase | 0 | 0x08005100 | Electronics Controller to Engine Controller | Aux Temperature Sensors 5 - 8 | 275 | 0x08005113 | 6 |

FIG. 14J

| Pty | Fct | Module | Device Base ID | Message Base | Message Detail | Msg Index | Msg ID | Fmt |
|---|---|---|---|---|---|---|---|---|
| 2 | prod | Generator, Stirling, three-phase | 0 | 0x08005100 | Electronics Controller to Engine Controller | Controller System Info 1 | 276 | 0x08005114 | 5 |
| 2 | prod | Generator, Stirling, three-phase | 0 | 0x08005100 | Electronics Controller to Engine Controller | Controller System Info 2 | 277 | 0x08005115 | TBD |
| 2 | prod | Generator, Stirling, three-phase | 0 | 0x08005100 | Electronics Controller to Engine Controller | Battery Charger active voltage/current ref | 278 | 0x08005116 | 2 |
| 2 | prod | Generator, Stirling, three-phase | 0 | 0x08005100 | Electronics Controller to Engine Controller | PV Faults / Status | 279 | 0x08005117 | 6 |
| 2 | prod | Generator, Stirling, three-phase | 0 | 0x08005100 | Electronics Controller to Engine Controller | Vpv, Ipv | 280 | 0x08005118 | 2 |
| 2 | prod | Generator, Stirling, three-phase | 0 | 0x08005100 | Electronics Controller to Engine Controller | Grid_Vab, Grid_Vbc, Grid_Vca | 281 | 0x08005119 | 3 |
| 2 | prod | Generator, Stirling, three-phase | 0 | 0x08005100 | Electronics Controller to Engine Controller | Digital inputs and status bits, Beacon 10 | 282 | 0x0800511A | 6 |
| 2 | prod | Generator, Stirling, three-phase | 0 | 0x08005100 | Electronics Controller to Engine Controller | Engine power excess/deficit | 283 | 0x0800511B | 5 |
| 2 | prod | Generator, Stirling, three-phase | 0 | 0x08005100 | Electronics Controller to Engine Controller | Igniter Faults / Status | 284 | 0x0800511C | 6 |
| 2 | prod | Generator, Stirling, three-phase | 0 | 0x08005100 | Electronics Controller to Engine Controller | Igniter voltage / current | 285 | 0x0800511D | 2 |

FIG. 14K

| Pty | Fct | Module | Device | Base ID | Message Base | Message Detail | Msg Index | Msg ID | Fmt |
|---|---|---|---|---|---|---|---|---|---|
| 2 | prod | Generator, Stirling, three-phase | 0 | 0x08005100 | Electronics Controller to Engine Controller | DC Output Controller Faults / Status | 286 | 0x0800511E | 6 |
| 2 | prod | Generator, Stirling, three-phase | 0 | 0x08005100 | Electronics Controller to Engine Controller | DC Output Controller voltage / current | 287 | 0x0800511F | 2 |
| 2 | prod | Generator, Stirling, three-phase | 0 | 0x08005100 | Electronics Controller to Engine Controller | DC Output Watts, Igniter Watts | 288 | 0x08005120 | 5 |
| 2 | prod | Generator, Stirling, three-phase | 0 | 0x08005100 | Electronics Controller to Engine Controller | Inverter/Grid/Nominal AC frequency | 289 | 0x08005121 | 3 |
| 2 | prod | Generator, Stirling, three-phase | 0 | 0x08005100 | Electronics Controller to Engine Controller | Digital inputs and status bits, DC Plant | 290 | 0x08005122 | 6 |

FIG. 14L

| Pty | Fct | Module | Device | Base ID | Message Base | Message Detail | Msg Index | Msg ID | Fmt |
|---|---|---|---|---|---|---|---|---|---|
| 3 | Uty | VFD | VFD comb | 0x0C460000 | Engine Controller (cRIO) to VFD combustion controller | control flags | 2 | 0x0C460002 | 6 |
| 3 | Uty | VFD | VFD comb | 0x0C460000 | Engine Controller (cRIO) to VFD combustion controller | velocity command send | 3 | 0x0C460003 | 1 |
| 3 | Uty | VFD | VFD comb | 0x0C460000 | Engine Controller (cRIO) to VFD combustion controller | motor_type_pole_ma xCurrent | TBD | TBD | 6 |
| 3 | Uty | VFD | VFD comb | 0x0C460000 | Engine Controller (cRIO) to VFD combustion controller | send motor_Rr_Rs | TBD | TBD | 2 |
| 3 | Uty | VFD | VFD comb | 0x0C460000 | Engine Controller (cRIO) to VFD combustion controller | send motor_Lsd_Lsq | TBD | TBD | 2 |

1122C

| Pty | Fct | Module | Device | Base ID | Message Base | Message Detail | Msg Index | Msg ID | Fmt |
|---|---|---|---|---|---|---|---|---|---|
| 4 | Utility | VFD | VFD comb | 0x10460100 | VFD combustion controller to Engine Controller (cRIO) | speed | 256 | 0x10460100 | 3 |
| 4 | Utility | VFD | VFD comb | 0x10460100 | VFD combustion controller to Engine Controller (cRIO) | status | 257 | 0x10460101 | 6 |
| 4 | Utility | VFD | VFD comb | 0x10460100 | VFD combustion controller to Engine Controller (cRIO) | current | TBD | TBD | 3 |
| 4 | Utility | VFD | VFD comb | 0x10460100 | VFD combustion controller to Engine Controller (cRIO) | voltage | TBD | TBD | 3 |
| 4 | Utility | VFD | VFD comb | 0x10460100 | VFD combustion controller to Engine Controller (cRIO) | motor_Rr_Rs motor_Lsd_Ls | TBD | TBD | 2 |
| 4 | Utility | VFD | VFD comb | 0x10460100 | VFD combustion controller to Engine Controller (cRIO) | q | TBD | TBD | 2 |

| Pty | Fct | Module | Device | Base ID | Message Base | Message Detail | Msg Idx | Msg ID | Fmt |
|---|---|---|---|---|---|---|---|---|---|
| 3 | Utility | VFD | VFD waterpump | 0x0C460600 | Engine Controller (cRIO) to VFD water pump controller | control flags | 2 | 0x0C460602 | 6 |
| 3 | Utility | VFD | VFD waterpump | 0x0C460600 | Engine Controller (cRIO) to VFD water pump controller | velocity command send | 3 | 0x0C460603 | 1 |
| 3 | Utility | VFD | VFD waterpump | 0x0C460600 | Engine Controller (cRIO) to VFD water pump controller | motor_type_pole_maxCurrent | TBD | TBD | 6 |
| 3 | Utility | VFD | VFD waterpump | 0x0C460600 | Engine Controller (cRIO) to VFD water pump controller | send motor_Rr_Rs send | TBD | TBD | 2 |
| 3 | Utility | VFD | VFD waterpump | 0x0C460600 | Engine Controller (cRIO) to VFD water pump controller | motor_Lsd_Lsq | TBD | TBD | 2 |

1122F

| Pty | Fct | Module | Device | Base ID | Message Base | Message Detail | Msg Idx | Msg ID | Fmt |
|---|---|---|---|---|---|---|---|---|---|
| 4 | Utility | VFD | VFD waterpump | 0x10460700 | VFD water pump controller to Engine Controller (cRIO) | speed | 2560 | 0x10460700 | 3 |
| 4 | Utility | VFD | VFD waterpump | 0x10460700 | VFD water pump controller to Engine Controller (cRIO) | status | 2570 | 0x10460701 | 6 |
| 4 | Utility | VFD | VFD waterpump | 0x10460700 | VFD water pump controller to Engine Controller (cRIO) | current | TBD | TBD | 3 |
| 4 | Utility | VFD | VFD waterpump | 0x10460700 | VFD water pump controller to Engine Controller (cRIO) | voltage | TBD | TBD | 3 |
| 4 | Utility | VFD | VFD waterpump | 0x10460700 | VFD water pump controller to Engine Controller (cRIO) | motor_Rr_Rs | TBD | TBD | 2 |
| 4 | Utility | VFD | VFD waterpump | 0x10460700 | VFD water pump controller to Engine Controller (cRIO) | motor_Lsd_Lsq | TBD | TBD | 2 |

FIG. 14N

| Pty | Fct | Module | Device | Base ID | Message Base | Message Detail | Msg Idx | Msg ID | Fmt |
|---|---|---|---|---|---|---|---|---|---|
| 3 | Utility | VFD | VFD radiator | 0x0C460C00 | Engine Controller (cRIO) to VFD radiator controller | control flags | 2 | 0x0C460C02 | 6 |
| 3 | Utility | VFD | VFD radiator | 0x0C460C00 | Engine Controller (cRIO) to VFD radiator controller | velocity command send | 3 | 0x0C460C03 | 1 |
| 3 | Utility | VFD | VFD radiator | 0x0C460C00 | Engine Controller (cRIO) to VFD radiator controller | motor_type_pole_max Current | TBD | TBD | 6 |
| 3 | Utility | VFD | VFD radiator | 0x0C460C00 | Engine Controller (cRIO) to VFD radiator controller | send motor_Rr_Rs | TBD | TBD | 2 |
| 3 | Utility | VFD | VFD radiator | 0x0C460C00 | Engine Controller (cRIO) to VFD radiator controller | send motor_Lsd_Lsq | TBD | TBD | 2 |

| Pty | Fct | Module | Device | Base ID | Message Base | Message Detail | Msg Idx | Msg ID | Fmt |
|---|---|---|---|---|---|---|---|---|---|
| 4 | Utility | VFD | VFD radiator | 0x10460D00 | Engine Controller (cRIO) VFD radiator controller to | speed | 256 | 0x10460D00 | 3 |
| 4 | Utility | VFD | VFD radiator | 0x10460D00 | Engine Controller (cRIO) VFD radiator controller to | status | 257 | 0x10460D01 | 6 |
| 4 | Utility | VFD | VFD radiator | 0x10460D00 | Engine Controller (cRIO) VFD radiator controller to | current | TBD | TBD | 3 |
| 4 | Utility | VFD | VFD radiator | 0x10460D00 | Engine Controller (cRIO) VFD radiator controller to | voltage | TBD | TBD | 3 |
| 4 | Utility | VFD | VFD radiator | 0x10460D00 | Engine Controller (cRIO) VFD radiator controller to | motor_Rr_Rs | TBD | TBD | 2 |
| 4 | Utility | VFD | VFD radiator | 0x10460D00 | Engine Controller (cRIO) VFD radiator controller to | motor_Lsd_Lsq | TBD | TBD | 2 |

FIG. 14O

CRITICAL CONTROL FLAGS – 1, MESSAGE INDEX 2, MESSAGE ID 0x00005002

WORD # 1 — 1122G

| BIT | DEFINITION | DESCRIPTION |
|---|---|---|
| 0 | Clear Faults | assert to attempt to clear all present fault conditions |
| 1 | Force Power Electronics Controller to Faulted State — 1122H | assert to force the controller into the faulted state, causing a complete shutdown |
| 2 | Enable Motor Controller | assert to enable motor controller. If both the enable and disable control flags are set then the disable wins |
| 3 | Disable Motor Controller | assert to disable motor controller. If both the enable and disable control flags are set then the disable wins. |
| 4 | Enable Field Weakening | assert to enable field weakening feature in motor controller. If both the enable and disable flags are set then the disable wins |
| 5 | Disable Field Weakening | assert to disable field weakening feature in motor controller. If both the enable and disable flags are set then the disable wins |
| 6 | External Brake Active | when asserted signals that the external brake is active |
| 7 | Enable Booster | assert to enable the booster. If both the enable and disable control flags are asserted then the disable wins |
| 8 | Disable Booster | assert to disable the booster. If both the enable and disable control flags are asserted then the disable wins |
| 9 | Enable Inverter | assert to enable the inverter. If both the enable and disable control flags are asserted then the disable wins |
| 10 | Disable Inverter | assert to disable the inverter. If both the enable and disable control flags are asserted then the disable wins |
| 11 | Enable PV | assert to enable the PV controller. If both the enable and disable control flags are asserted then the disable wins |
| 12 | Disable PV | assert to disable the PV controller. If both the enable and disable control flags are asserted then the disable wins |
| 13 | Enable Battery Charger | assert to enable the battery charger. If both the enable and disable control flags are asserted then the disable wins |
| 14 | Disable Battery Charger | assert to disable the battery charger. If both the enable and disable control flags are asserted then the disable wins |
| 15 | Allow Motor Drive Enable | assert to allow the motor drive to be commanded to enable. When false the motor drive is prevented from being enabled, and overrides the motor controller enable bit in this message and also any other external or internal command to enable the motor controller |

FIG. 15A

SYSTEM FAULTS/STATUS
MESSAGE INDEX 268
MESSAGE ID 0x0800510C

WORD #1: SYSTEM FAULT FLAGS

| BIT | DEFINITION | DESCRIPTION |
|---|---|---|
| 0 | FAULT_RESET | a reset has occurred |
| 1 | FAULT_BUS_UV_SW | Bus undervoltage detected in software |
| 2 | FAULT_BRAKE_TEST_FAIL | The brake does not appear to be functional |
| 3 | FAULT_BUS_OV_SW | Bus overvoltage detected in software |
| 4 | FAULT_BATTERY_CONTACTOR_OFF | The battery contactor is open |
| 5 | FAULT_ESTOP | The E-STOP has been activated |
| 6 | FAULT_CONTROLLER_ABSENT | The system is not being controlled by any external source (e.g. canbus, diagnostic UI, etc) |
| 7 | FAULT_HEATSINK_OVERTEMP | The power electronics heatsink temperature is above the fault threshold |
| 8 | FAULT_BUS_VOLTAGE_UNDER_BATTERY_VOLTAGE | the bus voltage is reading below battery voltage |
| 9 | FAULT_BATT_UV_SW | Battery undervoltage detected in software |
| 10 | FAULT_CHASSIS_GROUND_MISSING | The chassis ground connection to the control board is missing |
| 11 | FAULT_BATT_OV_SW | Battery overvoltage detected in software |
| 12 | FAULT_UNRECOVERABLE | unable to recover from previously flagged faults |
| 13 | FAULT_TIMESYNC_INVALID | The controller's time reference is no longer valid. |
| 14 | FAULT_BATTERY_TEMP_SENSOR_FAIL | the controller's battery temperature sensor reading appears to be invalid |
| 15 | FAULT_MOTOR_TEMP_SENSOR_FAIL | the controller's motor temperature sensor appears to be invalid |

FIG. 15B

VFD Message Details

| Can Message | Message format | Direction | Word 1 | Word 2 | Word 3 | Word 4 |
|---|---|---|---|---|---|---|
| speed | 3 | tx (VFD to cRIO) | (Q15) speedRef [rpm] | (Q15) speed [rpm] | N/A | (int16_t) fullscale [rpm] |
| status | 6 | tx (VFD to cRIO) | (int16_t) UserErrorCode | (int16_t) Hardware Enable | (int16_t) motor_type | (int16_t) motor_numPolePairs |
| current | 3 | tx (VFD to cRIO) | (Q15) id [mA] | (Q15) iq [mA] | (Q15) max_Current [mA] | (int16_t) fullscale [mA] = TBD |
| voltage | 3 | tx (VFD to cRIO) | (Q15) Vd [V] | (Q15) Vq [V] | (Q15) VdcBus_kV [V] | (int16_t) fullscale [V] = TBD |
| motor_Rr_Rs | 2 | tx (VFD to cRIO) | (Q15) gMotorVars.Rr_Ohm | (int16_t) fullscale [ohm] = TBD | (Q15) gMotorVars.Rs_Ohm | (int16_t) fullscale [ohm] = TBD |
| motor_Lsd_Lsq | 2 | tx (VFD to cRIO) | (Q15) gMotorVars.Lsd_H | (int16_t) fullscale [H] = TBD | (Q15) gMotorVars.Lsq_H | (int16_t) fullscale [H] = TBD |
| control_flags | 6 | rx (cRIO to VFD) | TBD | TBD | TBD | |
| velocity command | 1 | rx (cRIO to VFD) | (Q15) speed command | (int16_t) fullscale [rpm] | N/A | |
| send motor_type_pole maxCurrent | 6 | rx (cRIO to VFD) | (int16_t) type | (int16_t) numPolePairs | (Q15) max current | (int16_t) fullscale = TBD |
| send motor_Rr_Rs | 2 | rx (cRIO to VFD) | (Q15) R_r | (int16_t) fullscale [ohm] = TBD | (Q15) R_S | (int16_t) fullscale [ohm] = TBD |
| send motor_Lsd_Lsq | 2 | rx (cRIO to VFD) | (Q15) LSD | (int16_t) fullscale [H] = TBD | (Q15) LSQ | (int16_t) fullscale [H] = TBD |

FIG. 15C

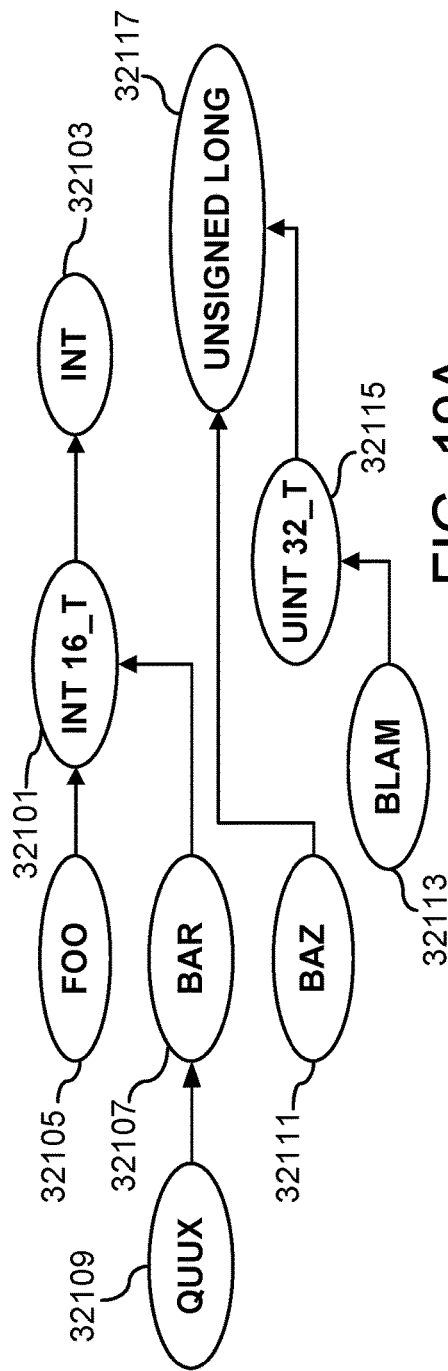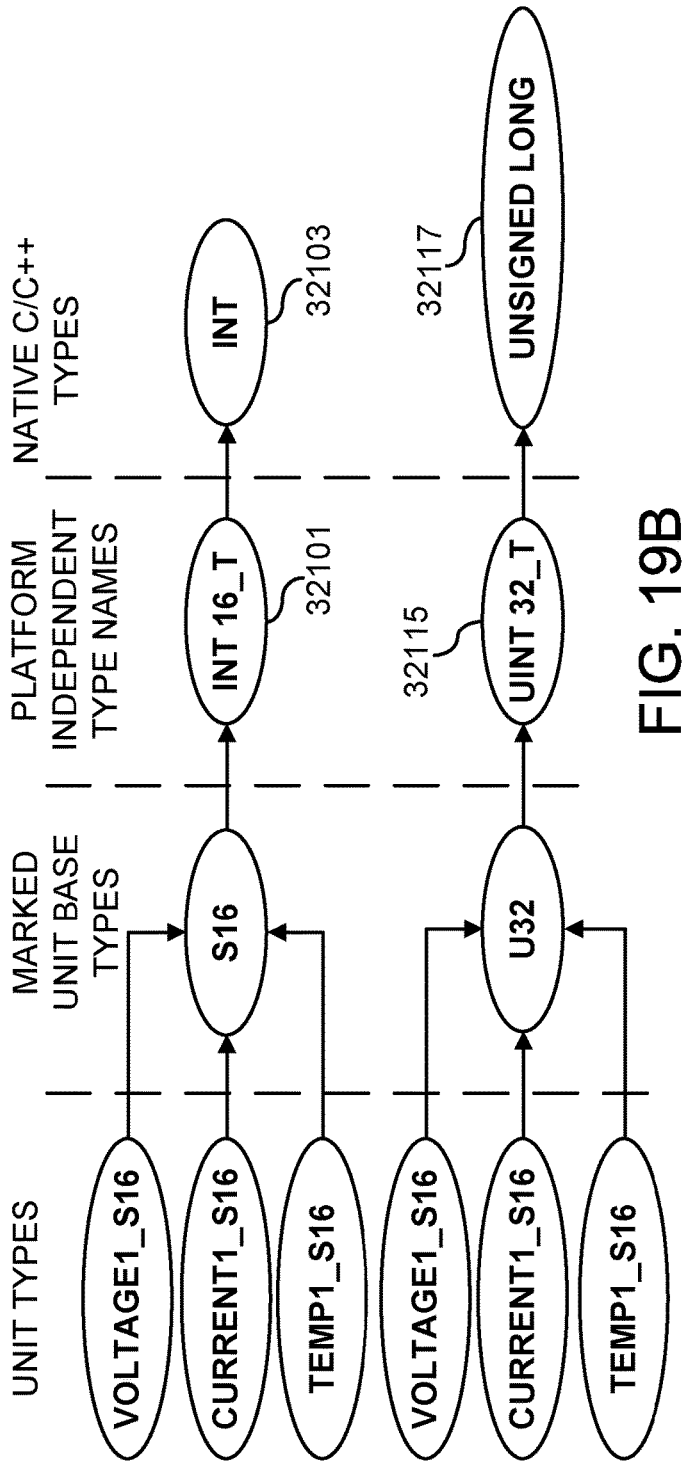

DIRECT CURRENT POWER PLANT

CROSS REFERENCE TO RELATED APPLICATIONS

The present application is a divisional application of U.S. patent application Ser. No. 16/990,140, filed Aug. 11, 2020, entitled Direct Current Power Plant, which is a divisional application of U.S. patent application Ser. No. 16/243,846, filed Jan. 9, 2019, entitled Direct Current Power Plant, which is a divisional application of U.S. patent application Ser. No. 15/182,147, filed Jun. 14, 2016, and entitled Direct Current Power Plant, and claims priority to U.S. Provisional Patent Application Ser. No. 62/182,182, filed Jun. 19, 2015, and entitled Direct Current Power Plant, and U.S. Provisional Patent Application Ser. No. 62/188,240, filed Jul. 2, 2015 and entitled Direct Current Power Plant, each of which is hereby incorporated by reference in its entirety. The present application is related to U.S. patent application Ser. No. 13/827,140, filed Mar. 14, 2013 and entitled Modular Power Conversion System, which is a Continuation-In-Part of U.S. patent application Ser. No. 13/447,897 ('897), filed Apr. 16, 2012 and entitled Modular Power Conversion System, now U.S. Publication No. US-2013-0099565-A1, published Apr. 25, 2013, which claims priority to U.S. Provisional Patent Application Ser. No. 61/476,153, filed Apr. 15, 2011 and entitled Modular Power Conversion System, Method and Apparatus, each of which is hereby incorporated by reference in its entirety.

BACKGROUND

The present teachings relate to generating power and power electronics, and more specifically to generating direct current (DC) power.

Electricity generation is traditionally accomplished by large generating plants such as nuclear reactors, hydroelectric dams, coal, and gas fired boilers. The electric power that is generated is stepped up to a higher voltage, the voltage at which it connects to the transmission network. The transmission network can move, i.e. "wheel", the power long distances until it arrives at a local utility distribution network where, at a substation, the power can be stepped down in voltage from a transmission level voltage to a distribution level voltage. As the power exits the substation, it enters the distribution network. Finally, upon arrival at the service location such as a residential home or commercial user, the power is stepped down again from the distribution voltage to the required service voltage(s).

The traditional grid has limitations including, but not limited to, operational overhead, potential for widespread outages, aging technology, and security vulnerabilities. The traditional grid, along with its regional distinctions, is currently subject to the introduction of more efficient and smarter, although often smaller power generation technologies. Regional and local grids are now subject to low level dispersed power generation from regional large and small wind applications, small hydro-electric facilities, and even commercial and residential photovoltaic installations, for example. As such regional and local power producers come on-line, the characteristics of power generation can, in some new grids, be entirely opposite of those listed herein. The characteristics of regional and local power producers could be attractive for some locales, and can be implemented in the form of what is termed a "smart grid" using a combination of new design options such as net metering, electric cars as a temporary energy source, and/or distributed generation.

Of recent interest is the local generation and distribution of power, in particular, DC power. Many appliances require a conversion from the grid's AC power supply to DC power, which adds to the inefficiencies already inherent in centralized power transmission from large remote power generators. EMERGE® Alliance is an open industry association developing standards for DC power distribution. Current standards include DC power distribution in interiors, and desktop/telecom standards. Alternatively, DC power can be provided to the grid through commercially available inverters, and can be used in local power distribution facilities.

An example of a system that produces DC power is described in U.S. Pat. No. 7,701,705, a free-piston Stirling engine driving an alternator to supply power through a bus to a user load. In this system, the engine is operated at its maximum piston stroke, and the battery is charged if needed, when the bus voltage is in the range between a design nominal bus voltage ($V_1$) and a design minimum battery charging bus voltage ($V_2$). This system could benefit from an efficient means for starting the engine. Exemplary start-up circuits, such as for example, the one described in U.S. Pat. No. 8,957,710, include a detection circuit and a transition circuit for preventing the problem of incapability in transition as well as achieving the purpose of low power consumption. These types of systems lack a means to discontinue current flow to the start-up circuits when the engine is operating.

What is needed is a system to provide DC power from an engine to power a load and to power the control of the system, the system having a relatively small start-up power supply.

BRIEF SUMMARY

The needs set forth herein as well as further and other needs and advantages are addressed by the present configurations, which illustrate solutions and advantages described below.

In accordance with one aspect of the present teachings, a modular power system is disclosed. The system can include a backplane, a housing and a data connection port, and one or more modules that can plug into the backplane, wherein the backplane can include at least one direct current (DC) bus with positive and negative leads, a data connection for each module, connections for electrical power inputs to the module, connections for electrical outputs from the module.

In some configurations, the modular power system can include a microprocessor, one or more half-bridge circuits, power conditioning elements such as inductors, capacitors, voltage and current sensors, and electrical connections. In some configurations, the modular power system can control rotating power generators including, but not limited to, diesel gensets, Stirling gensets, and wind power, to produce DC power, and may connect to an electrical shunt. In some configurations, one or more of the microprocessors can control the power flow that can to control the DC bus voltage to a given set-point.

In some configurations, a method for producing DC power for a load can include, but is not limited to including, starting an engine using power supplied by a relatively small power supply supplemented by a capacitor bank, providing output from the Stirling engine to a generator, producing alternating current (AC) power by the generator, converting the AC power to direct current (DC) power, and providing the DC power to the load. The method can optionally include disabling output of the DC power during a first set of pre-selected conditions, limiting a rate of change of current of the DC power during a second set of pre-selected conditions, reducing conducted and radiated emissions of the DC power, disconnecting the DC power from the load under a third set of pre-selected conditions, and controlling velocity of the Stirling engine by a motor drive power board. The method can further optionally include inhibiting current flow from the motor drive power board to the capacitor bank, powering, by a second power supply at the starting up of the Stirling engine, system control electronics, shunting excess of the DC power in the form of heat produced by the Stirling engine into a shunt load, heating water with the heat, and controlling velocity of the Stirling engine by a motor drive power board and the generator. The first set of pre-selected conditions can include, but is not limited to including, overcurrent and ground fault conditions. The second set of pre-selected conditions can include, but is not limited to including, abnormal conditions. The third set of pre-selected conditions can include, but is not limited to including, an abnormal overcurrent condition. Disconnecting the DC power can include, but is not limited to including, shunt tripping a DC output breaker during an arc fault condition. The method can optionally include providing the DC power to an igniter power board, a pump/fan/blower drive, an engine control I/O PCB, a system control PCB, and a power control PCB.

In some configurations, a system for producing DC power for a load can include, but is not limited to including, a Stirling engine initially powered by a relatively small power supply supplemented by a capacitor bank, a permanent magnet synchronous motor generator (PMSMG) operably coupled to the Stirling engine, the PMSMG producing AC current from the output of the powered Stirling engine, a motor drive power board operably coupled to the PMSMG, the motor drive power board converting the AC current to DC power, and an ARC fault detector operably coupled to the EMI filter and a DC output breaker, the ARC fault detector shunt tripping the DC output breaker during a series ARC fault condition, the DC output breaker providing the DC power to the load when a third set of pre-selected conditions is false. The system can optionally include a DC output board operably coupled to the motor drive power board, the DC output board disabling output of the DC power from the motor drive power board during a first set of pre-selected conditions. The system can further optionally include a di/dT limiter operably coupled to the DC output board, the di/dT limiter limiting a rate of change of current flow of the DC power from the DC output board during a second set of pre-selected conditions. The system can still further optionally include an EMI filter operably coupled to the di/dT limiter, the EMI filter reducing conducted and radiated emissions of the DC power from the di/dT limiter. The system can also optionally include a diode inhibiting current flow from the motor drive power board to the capacitor bank. The PMSMG can optionally control the velocity of the Stirling engine. The first set of pre-selected conditions can include, but is not limited to including, overcurrent and ground fault conditions. The second set of pre-selected conditions can include, but is not limited to including, abnormal conditions. The third set of pre-selected conditions can include, but is not limited to including, an abnormal overcurrent condition. The PMSMG can include, but is not limited to including, a 3-phase generator. The motor drive power board can include, but is not limited to including, a 12 kVA, 3-phase, 4 quadrant AC/DC converter. The EMI filter can include, but is not limited to including, a 50 A filter. The DC output breaker can include, but is not limited to including, a 50 A breaker. The DC power can include, but is not limited to including, 390 VDC. The capacitor bank can include, but is not limited to including, 24.6 mF. The system can optionally include a system control power source, and a start-up system control power source. The relatively small power supply can include, but is not limited to including, a 380 VDC @ 4 A power supply. The system can optionally include a motor controller for a permanent magnetic synchronous motor that can include, but is not limited to including, an analog/digital converter that converts analog sensor signals from the permanent magnetic synchronous motor to digital signals for use by a digital signal processor comprising half bridges across a DC bus and an inductor-capacitor-inductor filter that produce three phase AC power at a predetermined voltage and frequency, at least one voltage sensor and at least one current sensor for three-phase demodulation of the three phase signals and converting the three-phase signals to a two-phase orthogonal reference frame, and a position/velocity estimator for receiving speed sensor signals from the motor and compiling a position and velocity estimation of the motor.

In some configurations, the system can include a brake module. In some configurations, the motor drive for the permanent magnetic synchronous motor can include an analog/digital converter that can convert analog sensor signals from the permanent magnetic synchronous motor to digital signals for use by a digital signal processor, at least one voltage sensor and at least one current sensor for three-phase demodulation of the three phase signals, and a position/velocity estimator for receiving speed sensor signals from the motor and compiling a position and velocity estimation of the motor.

In some configurations, a method for starting a Stirling engine can include, but is not limited to including, powering a first AC power supply, powering a second AC power supply, starting the Stirling engine by the first AC power supply and a capacitor bank, and starting system control electronics by the second AC power supply. The system control electronics can control a power control board, and the power control board can control the Stirling engine.

In some configurations, a method for operating a DC power plant can include, but is not limited to including, driving a generator using output from a running Stirling engine, producing a 3-phase AC current by the generator, converting the AC current to the DC power. And providing the DC power to internal loads internal to the DC power plant and to external loads external to the DC power plant. The method can optionally include measuring voltage and frequency of a grid supply, reporting the voltage and frequency via CANbus to a system controller, starting the engine if the grid supply is within a pre-selected range of tolerance, and recording the voltage and frequency in a continuously running log file. The method can further optionally include receiving an angle from a sawtooth waveform generator, representing the angle by a 16-bit value, applying an average increment to the angle, as the angle sweeps from 0-360°, every 100 µsecs, the average increment having a 32-bit center frequency input and a 16-bit delta frequency input driven by a PI controller, the center frequency input representing a fractional value of the angle, the delta frequency oscillating about zero, producing a sine/cosine pair for the angle, creating an inverter output waveform based on the sine/cosine pair, computing a phase error signal based on the sine of the angle and the voltage of the grid supply, the voltage of the grid supply being equal to the cosine of the voltage of the grid supply, multiplying the sine by the voltage of the grid supply to produce a signal that contains both AC and DC components, the AC component having an amplitude variation based on the amplitudes of the grid supply and the inverter output waveform and having a frequency equal to 2× the frequency of the grid supply when the loop is locked, the DC component having an amplitude variation based on the phase error between the grid supply and the inverter output waveform, low pass filtering the phase error, and eliminating a part of the AC component not relevant to control by supplying the filtered phase error to the PI controller.

In some configurations, the method of the present teachings for producing DC power for a load can include, but is not limited to including, starting up an engine using power supplied by a relatively small power supply supplemented by a capacitor bank, providing output from the engine to a generator, producing alternating current (AC) power by the generator, converting the AC power to direct current (DC) power, disabling output of the DC power during a first set of pre-selected conditions, limiting a rate of change of current of the DC power during a second set of pre-selected conditions, reducing conducted and radiated emissions of the DC power, disconnecting the DC power from the load under a third set of pre-selected conditions, and providing the DC power to the load.

These aspects of the present teachings are not meant to be exclusive and other features, aspects, and advantages of the present teachings will be readily apparent to those of ordinary skill in the art when read in conjunction with the appended claims and accompanying drawings.

BRIEF DESCRIPTION OF THE SEVERAL VIEWS OF THE DRAWING

These and other features and advantages of the present invention will be better understood by reading the following detailed description, taken together with the drawings wherein:

FIGS. 15A-15C are tables including exemplary data in CAN messages;

FIGS. 19A-19B are representations of a method to annotate software variables in an embedded system according to one configuration;

Like reference symbols in the various drawings indicate like elements.

DETAILED DESCRIPTION

A configuration of the DC power plant is discussed in detail below in relation to a thermal engine, in this case a Stirling engine. However, various other Stirling engines may be used. The system may be consolidated in a cabinet and interconnected for example via an isolated Controller Area Network (CAN) 2.0b or other electrical interface(s) that can facilitate communication and data processing between controllers and computers. In more complex systems further modules may be added to handle additional electrical resources. The system may include an LCD front display panel having multiple graphical user interfaces for system status monitoring and control inputs. Alternatively, a personal computer may be accommodated by USB, Ethernet, internet, wireless or other known communications format, to enable monitoring and control of the DC power plant.

Figure 1:
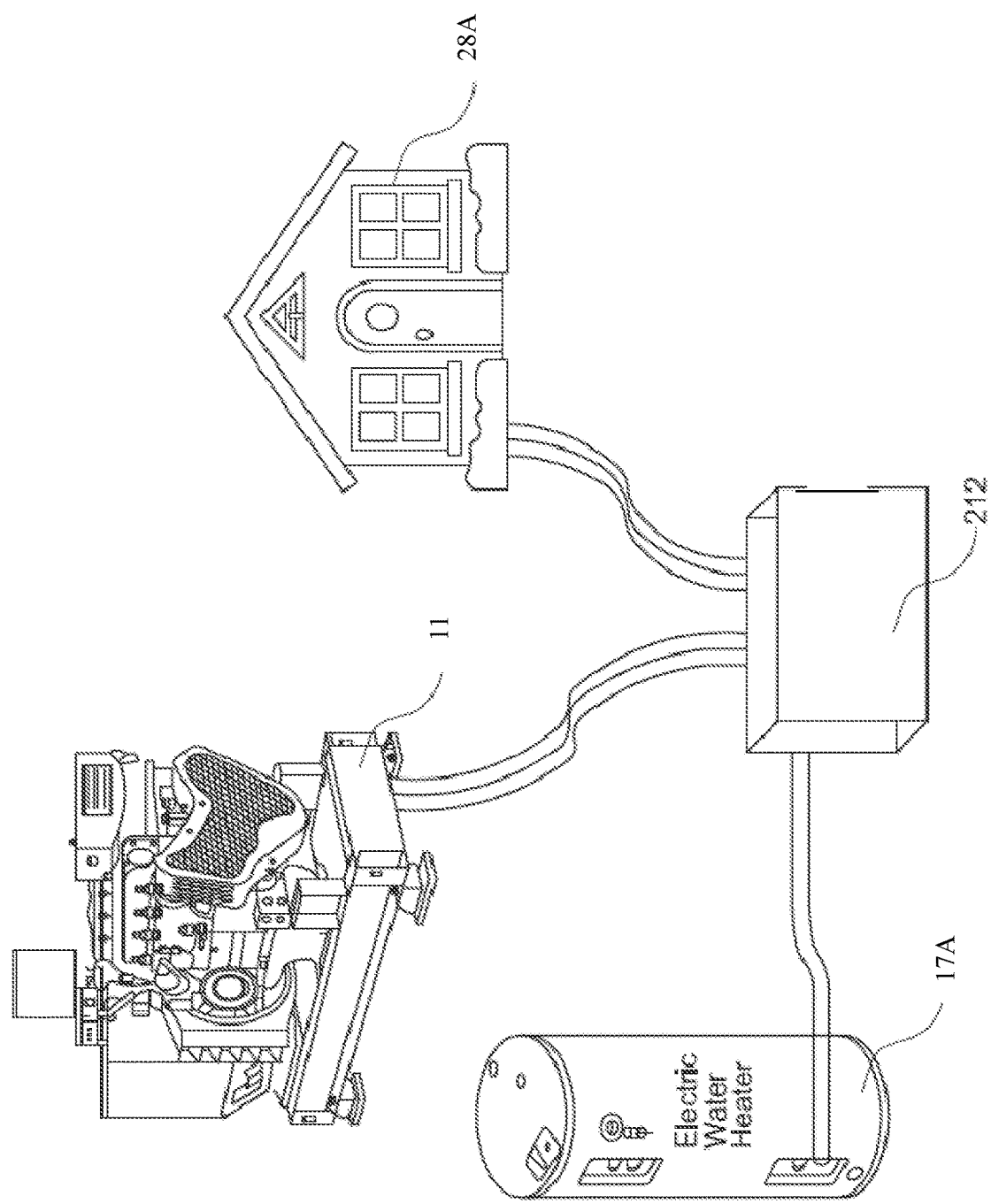
FIG. 1 is a pictorial representation of a configuration of the power system of the present teachings.

Referring now primarily to FIG. 1, generator 11 and exemplary heat sink 17A can be interconnected with modular power production system 212. Exemplary heat sink 17A can also include a power sink that can, for example, connect an electrical resistor that can dissipate excess electrical power from DC bus 250 (FIG. 4E) by converting it to heat. In some configurations, the power from DC bus 250 (FIG. 4E) may be purposely directed to brake module 19A (FIG. 4H) to create heat as the primary purpose of the system. A generator module can include a power source that can convert the polyphase electrical power from engine 11 into DC power primarily for residential load 28A. In some configurations, Stirling engine 11A (FIG. 3), as described in U.S. patent application Ser. No. 12/829,320 filed Jul. 1, 2010, now U.S. Publication No. US-2011-0011078-A1 published Jan. 20, 2011 and entitled Stirling Cycle Machine (Attorney Docket No. 178), which is hereby incorporated herein by reference in its entirety, may generate power in some configurations.

Figure 2:
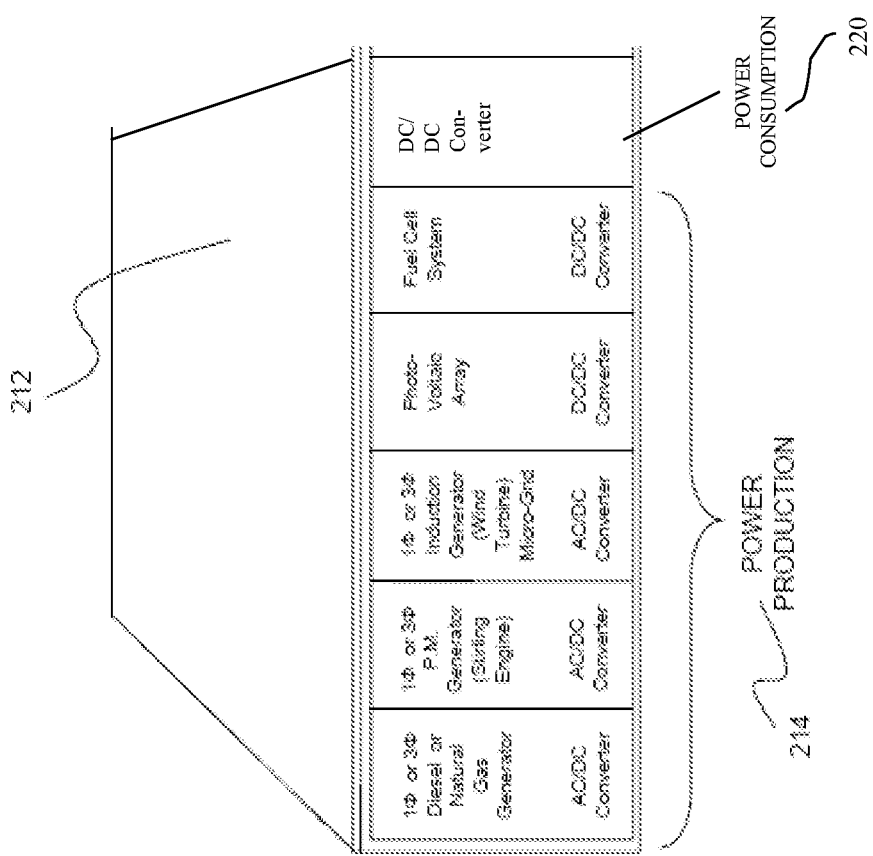
FIG. 2 is a pictorial representation of a configuration of a modular power conversion system.
Figure 3:
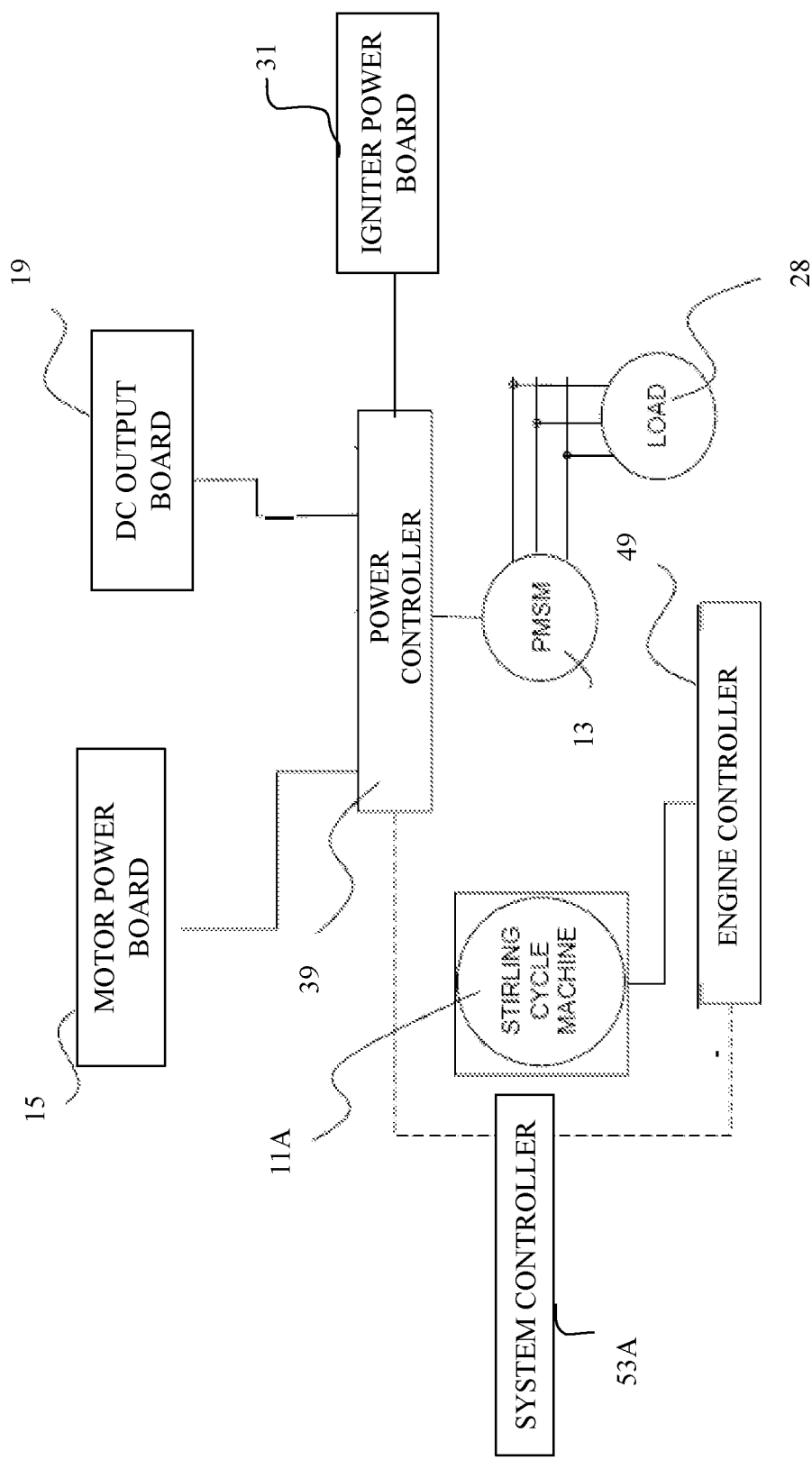
FIG. 3 is a schematic block diagram of a configuration of a power conversion system.

Referring now primarily to FIG. 2, modular power production system 212 can consolidate power control 39 (FIG. 3), including hardware and software, in an interchangeable modular or "block" format. It is the goal of this format to be able to generate and provide DC power from, for example, but not limited to, Stirling engine 11A (FIG. 3), wind, thermal, and photovoltaic to load 28 (FIG. 3). Power production 214 can include, but is not limited to including, in some configurations, electricity production and communication between "electric resources" and for example, but not limited to, electricity production from low level producer(s) such as, for example, but not limited to, Stirling engine 11A (FIG. 3), wind turbine, or photovoltaic array. Electricity can be provided to load 28 (FIG. 3) such as, for example, but not limited to, a commercial or residential building, directly. An electric resource can be an electrical entity that can act as load 28 (FIG. 3), generator 11 (FIG. 1), or storage. In modular power production system 212, each module or "block" is interchangeable to facilitate power production 214 and power consumption 220. The term digital signal processor (DSP) may be used herein to describe any microprocessor with sufficient input/output and speed to read voltages, currents, control multiple sets of half-bridge circuits. In some configurations, the DSP microprocessor can run at 150 MHz. System controller 53 (FIG. 3) for modular power production system 212 may include a data input/output device such as a keyboard and display or a touch-sensitive display or communication port to allow users to control the operation of modular power production system 212. Modular power production system 212 may also include a wireless or hard wired telecommunication ability to allow remote control and access to the system data. An alternative configuration may place all the computing power in a master controller. Thus the operation of each module could be fully under the control of one or more DSPs in the master controller.

Referring now primarily to FIG. 3, Stirling engine 11A, which can be controlled by system controller 53A through engine controller 49, can produce a mechanical output that can drive, for example, but not limited to, permanent magnet synchronous motor (PMSM) 13. Other motors are possible such as, for example, but not limited to, an induction motor and a synchronous reluctance motor. PMSM 13 can be controlled or conditioned to effectively run as an AC motor/generator providing consistent three-phase power to load 28 despite the variable torque generated by Stirling engine 11A. Charging a battery system (not shown) can overcome variable torque. The battery system can receive incoming power, no matter any torque or power fluctuations from the input and/or motor, and can store the power for application to load 28. In some configurations, PMSM 13 can be controlled with power controller 39 including, for example, but not limited to, motor power board 15 and brake chopper 19A (FIG. 4H). Power controller 39 may also receive data and information from system controller 53A.

Continuing to refer primarily to FIG. 3, in some configurations, engine power output can be matched to the DC power demand from externally connected and variable loads 28. Efficiency can be improved if engine 11 (FIG. 4G), for example Stirling engine 11A, does not produce power that is in excess of what is demanded. If excess power is produced, the power can be dissipated through, for example, but not limited to, shunt load 17 (FIG. 4H) and brake chopper 19A (FIG. 4H). The engine power output can be kept slightly higher than load 28 so that there is a buffer of available power for instantaneous supply that can cover a pre-selected increase in demand. Power control board 39 can continuously communicate to motor power board 15 indicating the present state of the power excess. Power excess can be calculated by observing the amount of power being dissipated in the combination of, for example, but not limited to, shunt load 17 (FIG. 4H) and brake chopper 19A (FIG. 4H). Power control board 39 can control igniters 29 (FIG. 4G). In some configurations, igniters 29 (FIG. 4G) can require a power supply of approximately 120V DC at approximately 8 amps. Power control board 39 can include a voltage controller and a current controller that can use conventional proportional-integral (PI) controllers with voltage and current feedback circuits. Power control board 39 can also include logic that can include pre-selected voltage and current regulation values. The voltage regulation value can act as reference input to the voltage controller which can provide a current regulation reference to the current controller, while the current regulation value can act as a limit to the current reference value produced by the voltage controller. A third PI controller can reduce the power being supplied to the igniters 29 (FIG. 4G) by monitoring the system DC voltage level to ensure that igniters 29 (FIG. 4G) do not rob the system of power when it may be needed for other purposes. Note that system 100 (FIG. 4G) can produce DC power for igniters 29 (FIG. 4G) as well as motor power board 15, DC output board 19, and pump, fan, and blower drive 34 (FIG. 4I). The third PI controller can reduce the current regulation limit value that acts upon the current controller. By restricting the amount of current that can flow through igniters 29 (FIG. 4G), the power consumed by igniters 29 (FIG. 4G) can be reduced in proportion. In some configurations, the current limit control can be reduced to zero.

Figure 4A:
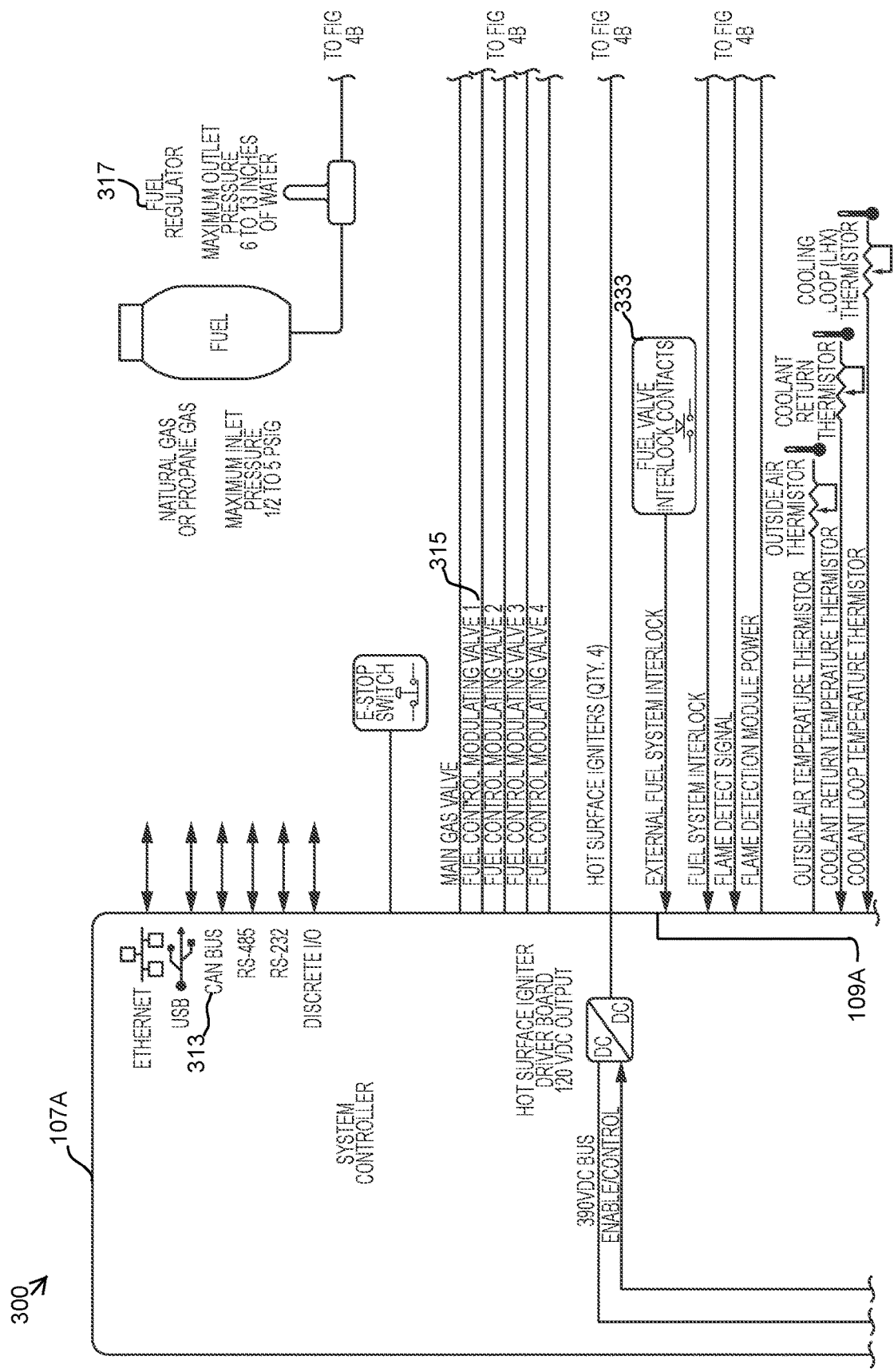
FIGS. 4A-4F are schematic diagrams of a configuration of an engine-based DC power plant.
Figure 4B:
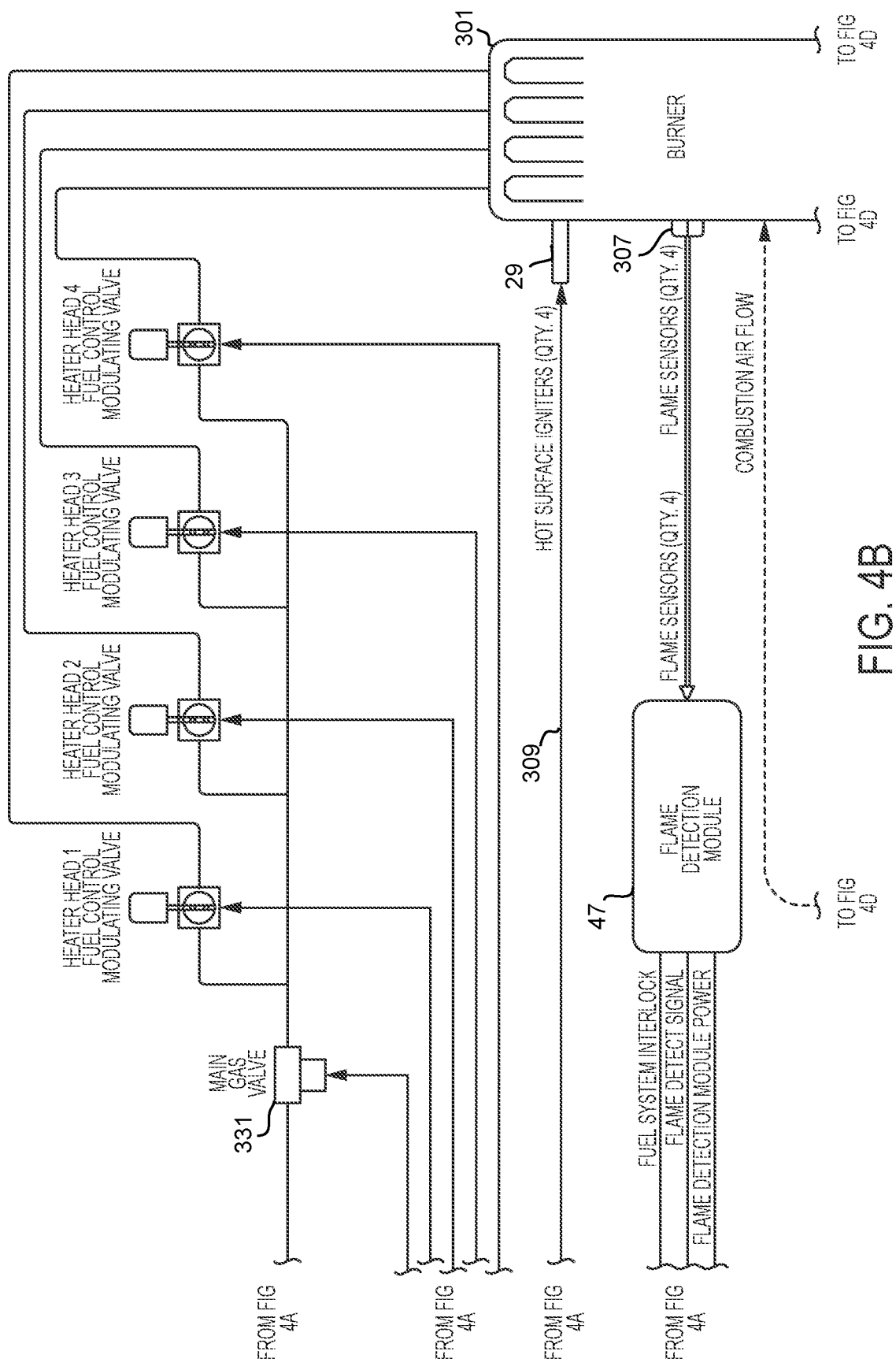
Figure 4C:
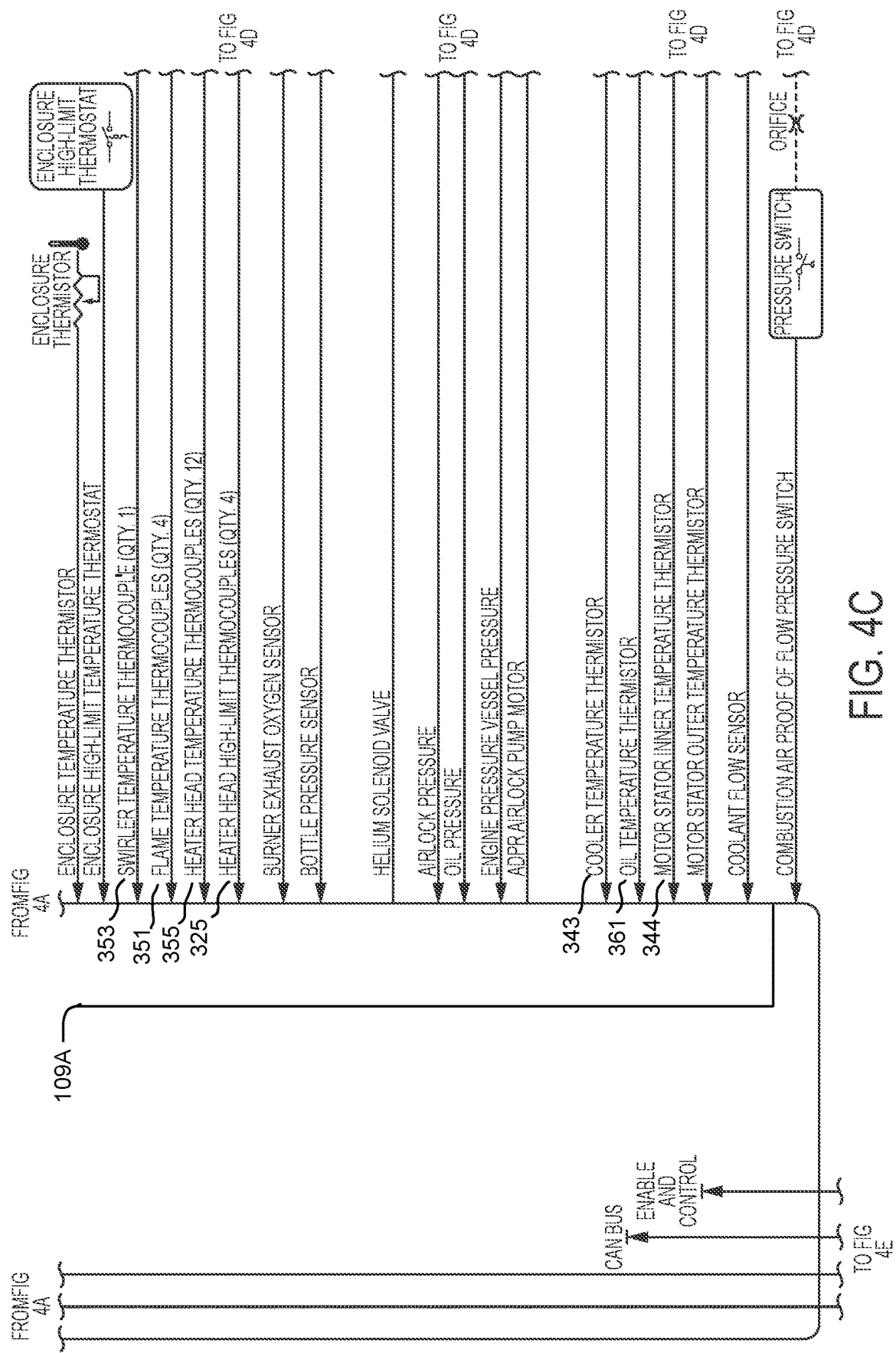
Figure 4D:
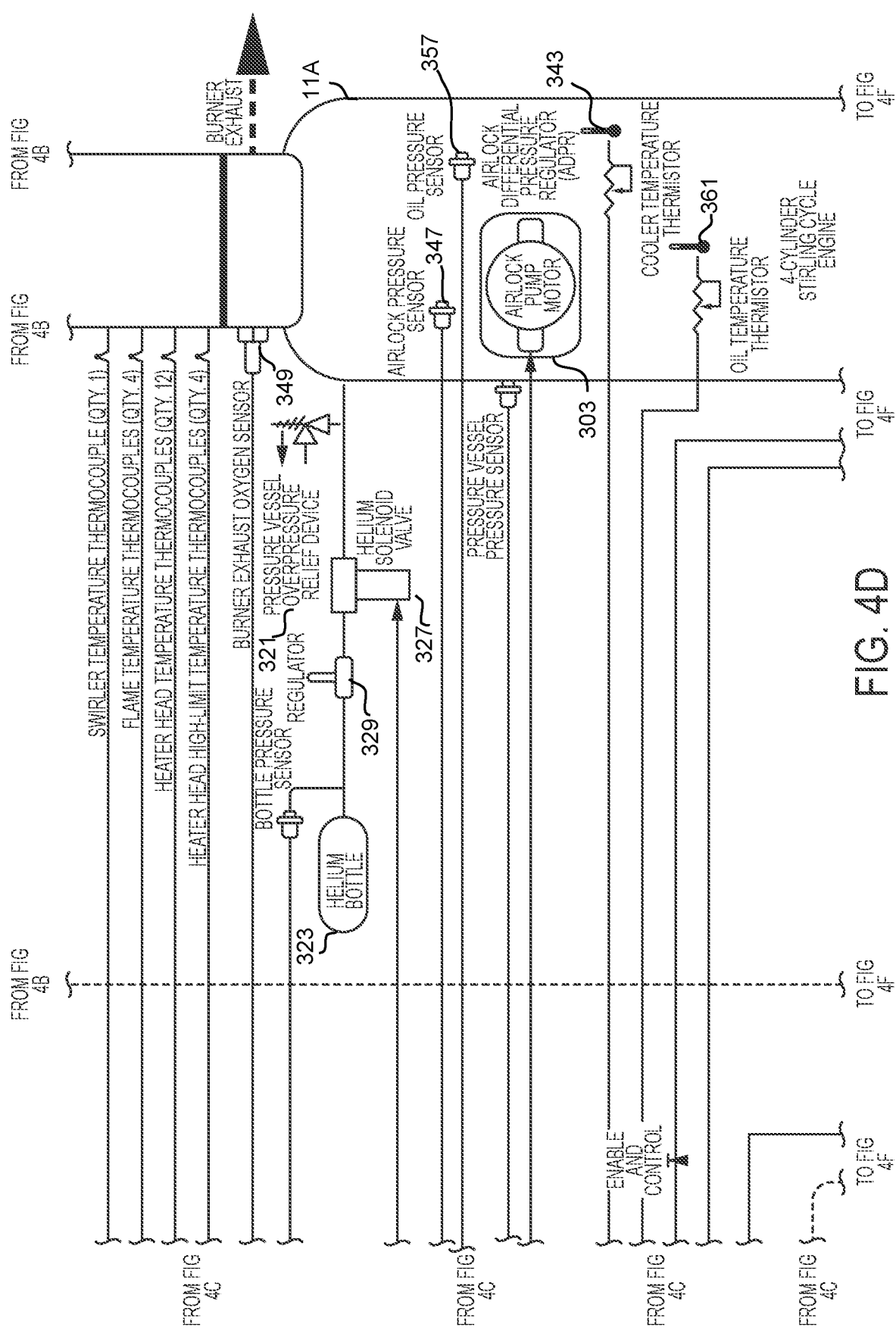
Figure 4E:
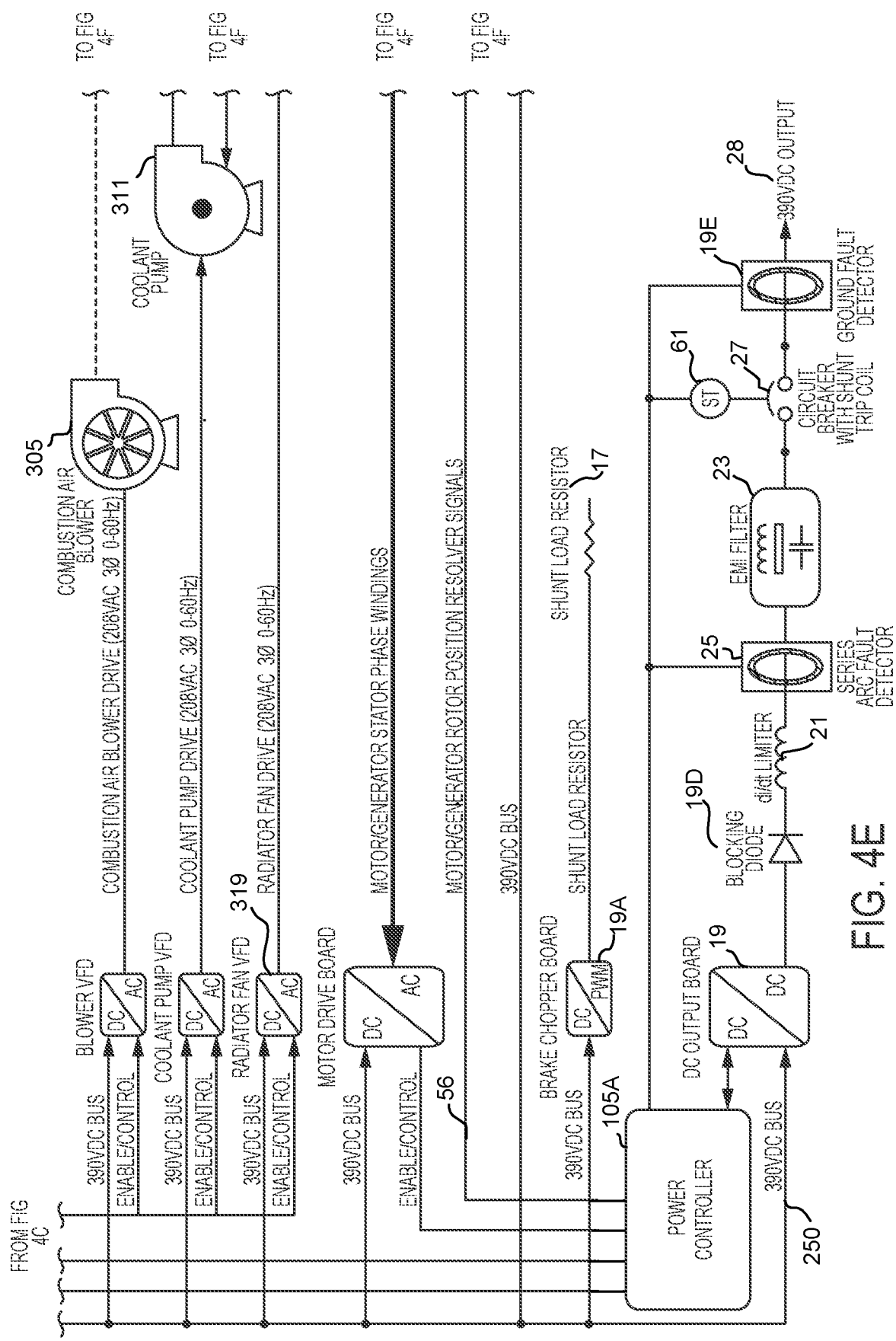
Figure 4F:
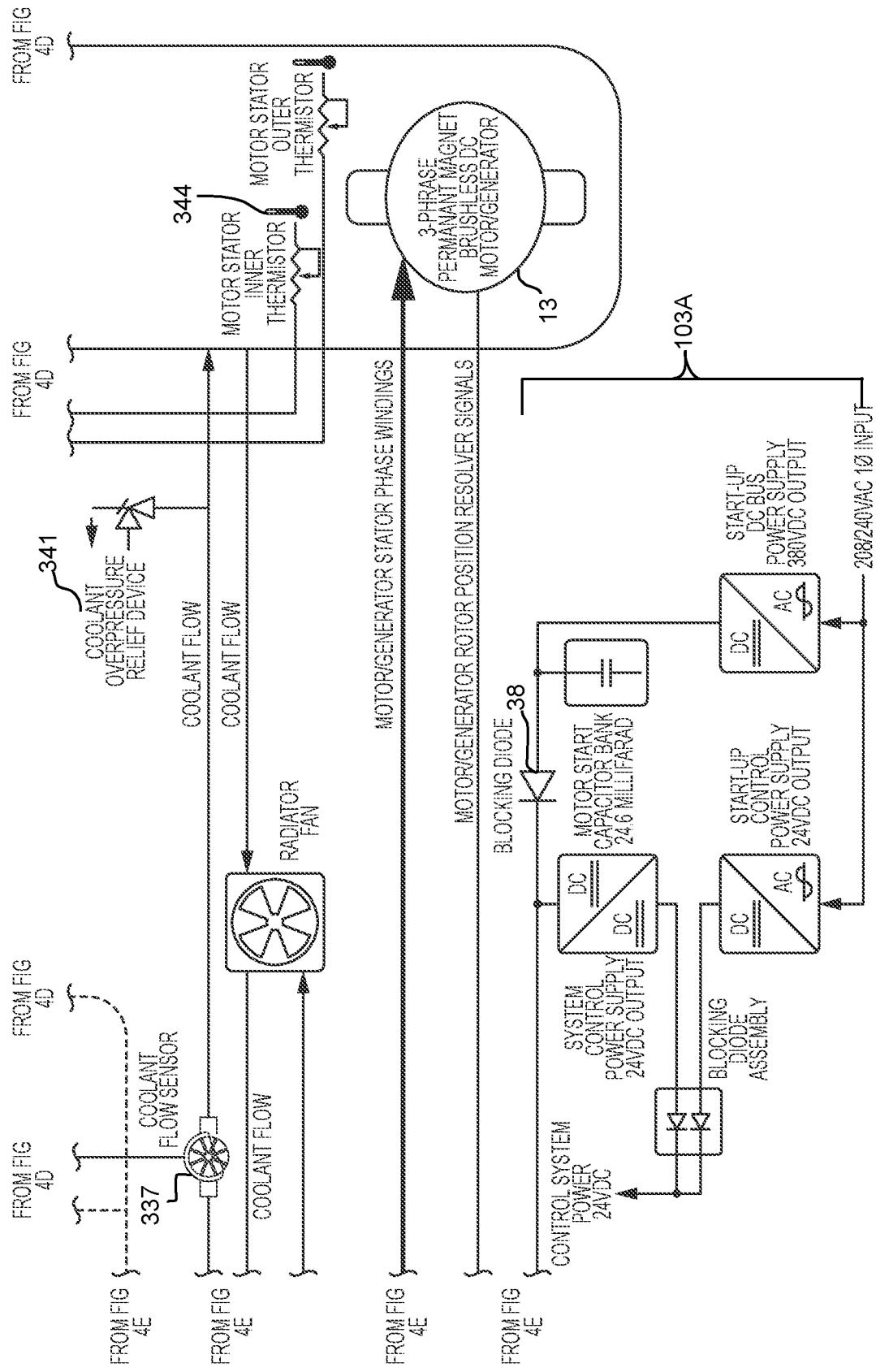
Figure 4G:
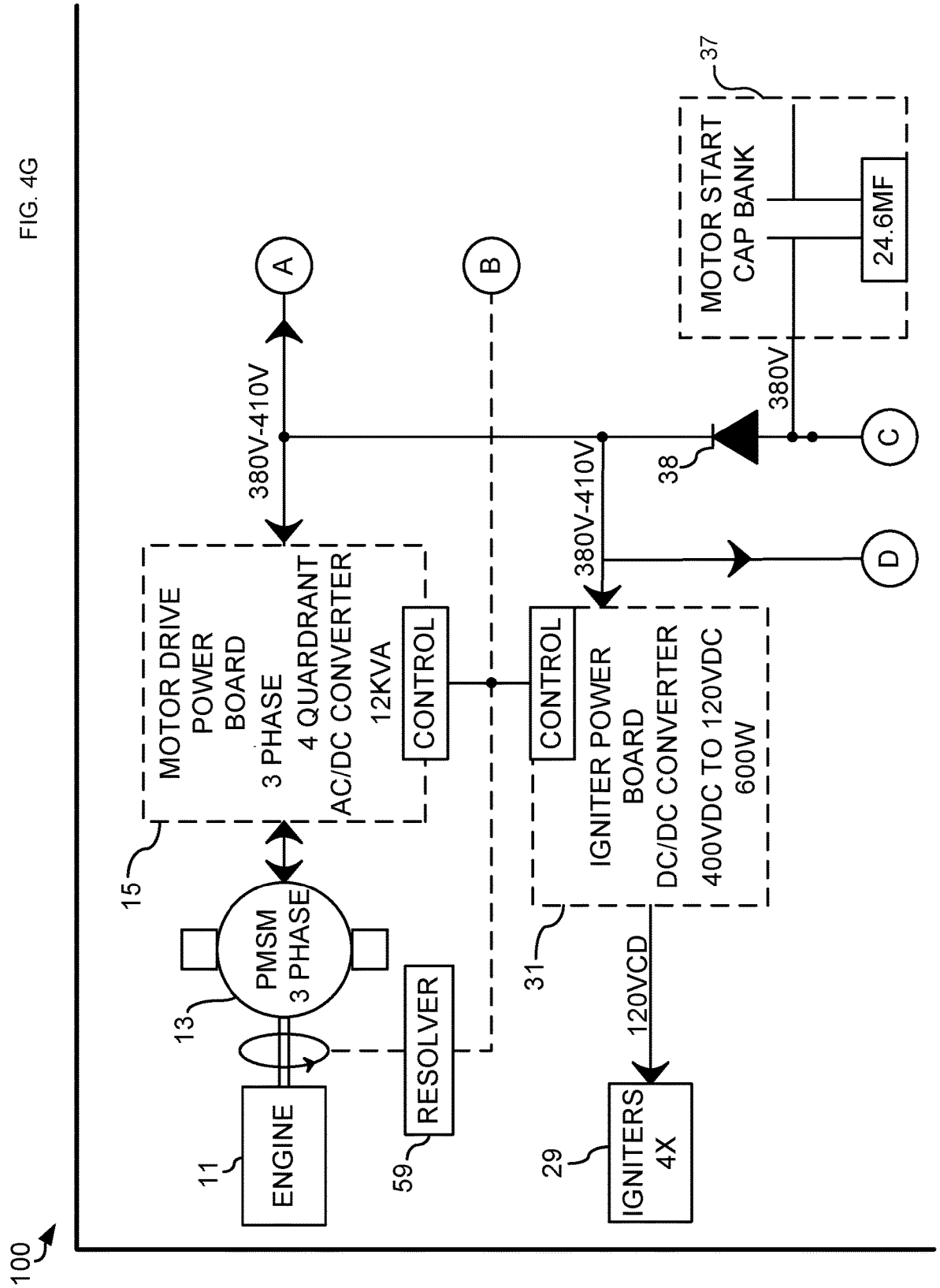
FIGS. 4G-4J are schematic block diagrams of an exemplary configuration of the DC power plant of the present teachings.
Figure 4H:
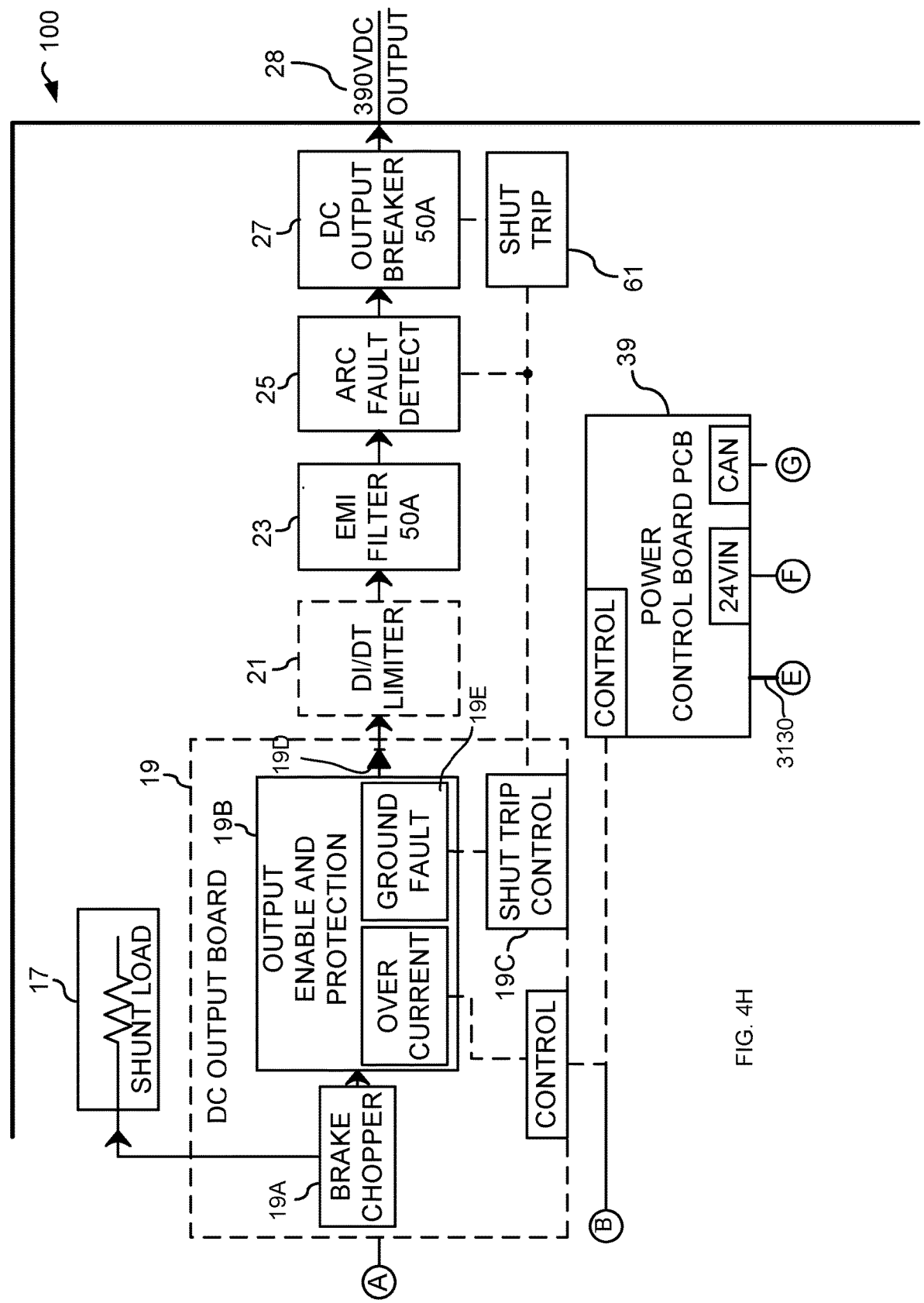
Figure 4I:
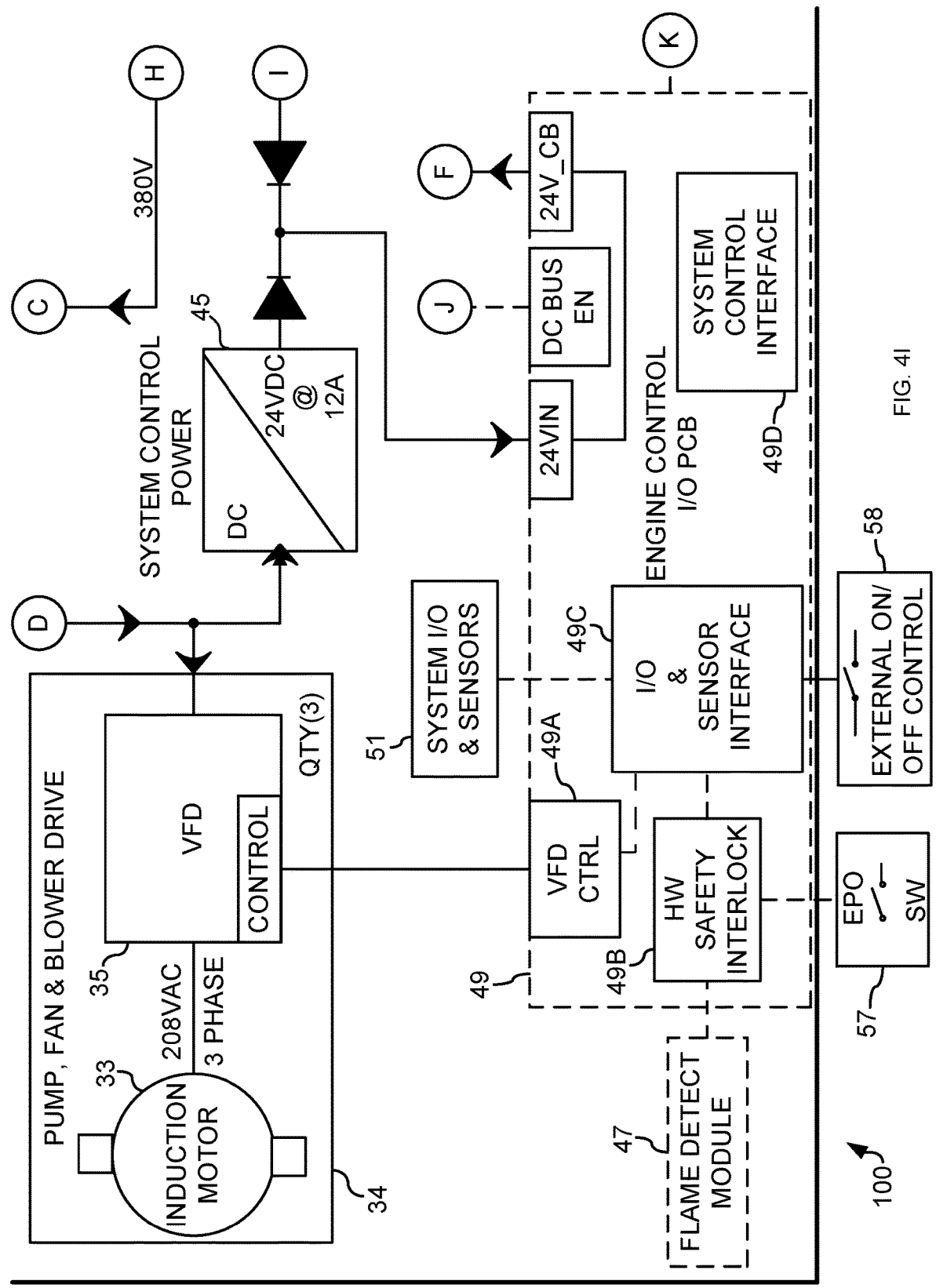

Referring now primarily to FIGS. 4A-4F, in some configurations, major components of second DC power plant configuration can include, but are not limited to including, start-up power components 103A (FIG. 4F), power controller 105A (FIG. 4E), Stirling engine 11A (FIG. 4D), sensors 109A (FIGS. 4A/4C), and system controller 107A (FIG. 4A). In operation, power from start-up power components 103A (FIG. 4F) can be sent to motor 13 (FIG. 4F) which can supply torque to start Stirling engine 11A (FIG. 4D). Start-up power components 103A (FIG. 4F) can also send power to system controller 107A (FIG. 4A) and power controller 105A (FIG. 4E). Burner 301 (FIG. 4B), fueled by, for example, but not limited to, propane or natural gas, can ignite and heat a working gas that can maintain motion in Stirling engine 11A (FIG. 4D). After Stirling engine 11A (FIG. 4D) comes up to speed, it can send energy back to motor 13 (FIG. 4B) which can act as a generator sending power to system controller 107A (FIG. 4A), power controller 105A (FIG. 4E), and to DC load 28 (FIG. 4E). Start-up power components 103A (FIG. 4F) can be taken out of the circuit by diode 38 (FIG. 4F) so that power from motor/generator 13 (FIG. 4B) can flow to the other parts of system 300 without flowing back to start-up power components 103A (FIG. 4F). When motor/generator 13 (FIG. 4B) is generating power, power from start-up power components 103A (FIG. 4F) for system controller 107A (FIG. 4A) and power controller 105A (FIG. 4E) can become unnecessary.

Continuing to refer primarily to FIGS. 4A-4F, in some configurations, Stirling engine 11A (FIG. 4D) can contain a working fluid and burner 301 (FIG. 4B) for heating the working fluid of Stirling engine 11A (FIG. 4D), an airlock space separating the crankcase and the working space for maintaining a pressure differential between the crankcase housing and the working space housing and airlock pressure regulator 303 (FIG. 4D) connected between the crankcase and one of the airlock space and working space. System controller 107A (FIG. 4A) can process a number of failsafe triggers based on sensor data from sensors 109A (FIGS. 4A/4C) and controller evaluation algorithms that can evaluate system 300 and determine if system 300 should be turned to shut-down or stop mode. Levels of heat, power, and oxygen, for example, can be monitored and shut-down or engine stoppage can be performed, or other modifications to system 300 and Stirling engine 11A (FIG. 4D), if a temperature reading is too high, or if exhaust oxygen level is too high, or if engine speed exceeds a desired value, or if the differential pressure within the air lock is too low, for example. These are exemplary triggers for starting shut-down or stop procedures, other triggers could be used as well or in combination with these examples.

Continuing to refer primarily to FIGS. 4A-4F, system 300 can include blower 305 (FIG. 4E) that can provide air or other gas for facilitating ignition and combustion in burner 301 (FIG. 4B). System 300 can also include a preheater (details not shown) that can, for example, but not limited to, define an incoming air passage and an exhaust passage separated by an exhaust manifold wall that can, for example, but not limited to, heat incoming air from the hot exhaust expelled from the heating element, a fuel injector (details not shown) that can, for example, but not limited to, supply fuel to mix with the incoming air, igniter 29 (FIG. 4B) that can, for example, but not limited to, ignite the fuel/air mixture, a prechamber (details not shown) that can, for example, but not limited to, define an inlet for receiving the fuel/air mixture and promote ignition of the mixture, a combustion chamber (details not shown) that can, for example, but not limited to, be disposed linearly below the prechamber that can, for example, but not limited to, maintain supporting a flame developed and ignited in the prechamber, and an electronic control unit (details not shown) that can, for example, but not limited to, control ignition and combustion operations of burner 301 (FIG. 4B), and wherein the combustion chamber can be connected to the exhaust passage into which the exhausted combustion gases are pushed to heat the incoming air following combustion and heating of the engine or machine. During normal engine operation, blower 305 (FIG. 4E) can be operated at least partially by a control loop which can measure the excess oxygen in the exhaust to determine blower speed. Failsafe triggers can include when engine speed exceeds a predetermined range, oxygen levels in exhaust exceed a predetermined range, generator temperature exceeds a predetermined range, burner temperature exceeds a predetermined range, cooler temperature exceeds a predetermined range, flame/ignition failure, and/or repeatable failure of flame ignition, for example. The described control method is not limited to the disclosed triggers and other triggers, factors, and variables may also be analyzed by system controller 107A (FIG. 4A) under the start-up and operation modes.

Continuing to still further refer primarily to FIGS. 4A-4F, system controller 107A (FIG. 4A) may be separate from but connected to and in communication with power controller 105A (FIG. 4E) and a hardware scheme that facilitates conversion of mechanical to electrical energy essentially downstream from Stirling engine 11A (FIG. 4D). Some configurations of the power electronics may be those described in '897. System controller 107A (FIG. 4A) can provide Stirling engine 11A (FIG. 4D) operational control including, but not limited to, regulation of an airlock such as, for example, but not limited to, the airlock described herein as well as for example burner(s) 301 (FIG. 4B). Blower 305 (FIG. 4E) can provide the air flow for combustion in burner(s) 301 (FIG. 4B), as well as cooling of a burner enclosure. System controller 107A (FIG. 4A) can control the air flow via a speed command passed to variable frequency drive (VFD) 35 (FIG. 4I). A blower speed signal may provide a feedback signal to system controller 107A (FIG. 4A) which can permit, for example, but not limited to, evaluation and control of the blower drive by the system controller 107A (FIG. 4A).

Still further referring primarily to FIGS. 4A-4G, in some configurations, for each burner 301 (FIG. 4B), flame detection module 47 (FIG. 4B) can be provided for safety, temperature control, and the ignition process among other things. In some configurations, igniter(s) 29 (FIG. 4B) for each burner 301 (FIG. 4B) can be directly influenced by flame sensors 307 (FIG. 4B) through system controller 107A (FIG. 4A), and igniter(s) 29 (FIG. 4B) can be controlled via igniter signal lines 309 (FIG. 4B) based on the flame sensor data and other data from the engine such as oxygen sensors, for example. In various configurations, coolant flow and temperature can be inputs to system controller 107A (FIG. 4A) to control coolant flow pump 311 (FIG. 4E) and ensure that appropriate coolant temperature is maintained in Stirling engine 11A (FIG. 4D). In some configurations, airlock delta pressure regulator (AdPR) 343 (FIG. 4D) can be directly connected and controlled via system controller 107A (FIG. 4A). In some configurations, system controller 107A (FIG. 4A) may also communicate with power controller 105A (FIG. 4E) over CAN bus 313 (FIG. 4A) but could also, in some configurations, rely on wireless communications or other communications protocols such as USB. System controller 107A (FIG. 4A) may, in some configurations, command the speed of motor/generator 13 (FIG. 4F). Configurations of power electronics as they relate to control and monitoring of motor/generator 13 (FIG. 4F) may be those described in '897. In some configurations, system controller 107A (FIG. 4A) and power controller 105A (FIG. 4E) may exchange data and commands including, but not limited to, motor drive velocity command, generator velocity, bus voltage, bus current, motor drive IGBT bridge temperature, shunt control, shunt active, battery voltage, battery temperature, inverter power, inverter enable, inverter PWM, inverter voltage inverter current, inverter temperature, converter power, converter enable, converter PWM, converter voltage, converter current, and converter temperature. In some configurations, the term converter refers to one or more DC/DC converter circuits. Certain direct inputs into system controller 107A (FIG. 4A) may also be necessary and can include but are not limited to including, oil temperature from the crankcase, battery temperature, motor temperature, and shunt temperature.

Referring now primarily to FIGS. 4G-4J, components of system 300 (FIGS. 4A-4F) important to the improvements of some configurations are shown in system 100 for producing DC power for load 28 (FIG. 4H). System 100 can include, but is not limited to including, engine 11 (FIG. 4G) initially powered by relatively small power supply 41 (FIG. 4J) supplemented by capacitor bank 37 (FIG. 4G). System 100 can further include PMSM 13 (FIG. 4G) operably coupled to engine 11 (FIG. 4G). PMSM 13 (FIG. 4G) can convert electrical energy to mechanical energy (torque) to provide required startup for engine 11 (FIG. 4G). PMSM 13 (FIG. 4G) can act as a generator powered by engine 11 (FIG. 4G) after engine 11 (FIG. 4CG is up to speed, and can provide AC current to motor power board 15 (FIG. 4G). Motor power board 15 (FIG. 4G) can convert the AC current to DC power. System 100 can also include DC output board 19 (FIG. 4H) operably coupled to motor power board 15

(FIG. 4G). DC output board 19 (FIG. 4H) can disable output of the DC power from motor power board 15 (FIG. 4G) during a first set of pre-selected conditions. System 100 can include di/dt limiter 21 (FIG. 4H) operably coupled to DC output board 19 (FIG. 4H). di/dt limiter 21 (FIG. 4H) can limit a rate of change of current flow from DC output board 19 (FIG. 4H) during a second set of pre-selected conditions. di/dt limiter 21 (FIG. 4H) can be a cost-effective way to control current flow from DC output board 19 (FIG. 4H). In some configurations, di/dt 21 (FIG. 4H) can include, for example, a toroidal core constructed and available from, for example, but not limited to, micrometals.com as powdered iron alloy #2. Core material #2 is characterized by the property that it does not saturate. System 100 can further include EMI filter 23 (FIG. 4H) operably coupled to di/dt limiter 21 (FIG. 4H). EMI filter 23 (FIG. 4H) can reduce conducted and radiated emissions of the DC power from di/dt limiter 21 (FIG. 4H). System 100 can still further include ARC fault detector 25 (FIG. 4H) operably coupled to EMI filter 23 (FIG. 4H) and DC output breaker 27 (FIG. 4H). ARC fault detector 25 (FIG. 4H) can shunt trip DC output breaker 27 (FIG. 4H) during a series ARC fault condition. DC output breaker 27 (FIG. 4H) can provide the DC power to load 28 (FIG. 4H) when a third set of pre-selected conditions is false. The first set of pre-selected conditions can optionally include overcurrent and ground fault conditions, the second set of pre-selected conditions can optionally include abnormal conditions, and the third set of pre-selected conditions can optionally include an abnormal overcurrent condition.

Continuing to refer primarily to FIGS. 4G-4J, resolver 59 (FIG. 4G) is a position measurement device used for commutation of PMSM 13 (FIG. 4G). The fuel source for engine 11 (FIG. 4G) can be, for example, but not limited to, propane gas or natural gas. PMSM 13 (FIG. 4G) can be used as a motor initially to start engine 11 (FIG. 4G). Once engine 11 (FIG. 4G) is turning and producing power, PMSM 13 (FIG. 4G) can be used as a generator to control the velocity of engine 11 (FIG. 4G) and extract power from engine 11 (FIG. 4G). PMSM 13 (FIG. 4G) can be brought up to an approximate alternator electrical speed before it locks (synchronizes) to a selected rotational rate. Once up to speed, PMSM 13 (FIG. 4G) can maintain synchronism with the AC power source, can develop torque, and can maintain a constant speed. When PMSM 13 (FIG. 4C) is 3-phase 4-pole, for example, it can generate an electrically rotating field in the stator. The three phases of stator excitation can add vectorially to produce a single resultant magnetic field which can rotate at 1800 rpm with 60 Hz power or 1500 rpm with 50 Hz power. System 100 can include motor power board 15 (FIG. 4G), including a 3-phase, 4-quadrant AC/DC converter used for velocity control of PMSM 13 (FIG. 4G). System 100 can further include DC output board 19 (FIG. 4H) including brake chopper 19A (FIG. 4H), output enable and protection 19B (FIG. 4H), and shunt trip control 19C (FIG. 4H). DC output board 19 (FIG. 4H) can be operably connected to power control board 39 (FIG. 4H) and resolver 59 (FIG. 4G). Brake chopper 19A (FIG. 4H) can limit DC bus voltage by, for example, but not limited to, switching the excess energy to shunt load 17 (FIG. 4H). Output enable and protection 19B (FIG. 4H) can disable output power from the DC output terminals during overcurrent or ground fault conditions. Shunt trip control 19C (FIG. 4H) can control the fault conditions under which shunt trip 61 (FIG. 4H) is driven. The fault conditions can include, but are not limited to including, arc fault, ground fault, and unexpected loss of control power.

Continuing to refer primarily to FIGS. 4G-4J, system 100 can further include di/dt limiter 21 (FIG. 4H), EMI filter 23 (FIG. 4H), arc fault detector 25 (FIG. 4H), and DC output breaker 27 (FIG. 4H). di/dt limiter 21 (FIG. 4H), operably electrically coupled with DC output board 19 (FIG. 4H) and EMI filter 23 (FIG. 4H), can provide series inductance to limit current rate of change under abnormal conditions. Commercially available EMI filter 23 (FIG. 4H) (for example, but not limited to, 50A), operably electrically coupled with di/dt limiter 21 (FIG. 4H) and arc fault detector 25 (FIG. 4H), can reduce conducted and radiated emissions. Commercially available arc fault detector 25 (FIG. 4H), operably electrically coupled with EMI filter 23 (FIG. 4H) and DC output breaker 27 (FIG. 4H), can shunt trip DC output breaker 27 (FIG. 4H) during a series arc fault condition. Commercially available DC output breaker 27 (FIG. 4H) (for example, but not limited to, 50A), operably electrically coupled with arc fault detector 25 (FIG. 4H) and the external load, can disconnect the DC power plant + and − terminals from external load 28 (FIG. 4H) in the event of an abnormal overcurrent condition. Arc fault detector 25 (FIG. 4H) can be operably connected to shunt trip 61 (FIG. 4H) and shunt trip control 19C (FIG. 4H). DC output breaker 27 (FIG. 4H) can be operably connected to shunt trip 61 (FIG. 4H).

Continuing to refer primarily to FIGS. 4G-4J, system 100 can also include igniters 29 (FIG. 4G), hot surface ignition sources, that establish flame in burner 301 (FIG. 4B). System 100 can also include igniter power board 31 (FIG. 4G) (for example, but not limited to, 400 VDC to 120 VDC, 600 W), a DC/DC buck converter used to drive hot surface igniters 29 (FIG. 4G), with which igniter power board 31 (FIG. 4G) can be operably electrically connected. Igniters 29 (FIG. 4G) and igniter power board 31 (FIG. 4G) can be powered by startup DC bus power 41 (FIG. 4J) during startup, and by PMSM 13 (FIG. 4G) while system 100 is in run mode. Igniter power board 31 (FIG. 4G) can be operably connected to power control board 39 (FIG. 4H). System 100 can also include pump, fan, and blower drive 34 (FIG. 4I) including induction motor 33 (FIG. 4I) and variable frequency drive 35 (FIG. 4I) (VFD) used to drive induction motor 33 (FIG. 4I) to cool engine 11 (FIG. 4G). VFD 35 (FIG. 4I) can be operably connected to engine control I/O PCB 49 (FIG. 4I). Pump, fan, and blower drive 34 (FIG. 4I) can include combustion air blower 305 (FIG. 4E) providing combustion air to burner 301 (FIG. 4B). A combustion air pressure switch to prevent fuel flow if combustion air blower 305 (FIG. 4E) flow is low can also be included. Coolant pump 311 (FIG. 4E) can also be included that provides coolant flow to engine 11 (FIG. 4G) used to maintain proper engine temperatures. Fuel control modulating valve 315 (FIG. 4A) can modulate a gas valve that controls fuel flow into burner 301 (FIG. 4B) to regulate heat transfer surface temperature of engine 11 (FIG. 4G). Fuel regulator 317 (FIG. 4A) can regulate fuel pressure into burner 301 (FIG. 4B). Radiator fan 319 (FIG. 4E) can provide system cooling to maintain temperature differential that drives engine 11 (FIG. 4G). Pressure vessel overpressure relief device 321 (FIG. 4D) can limit the pressure in a pressure vessel under abnormal conditions. The pressure vessel can contain helium working gas for engine 11 (FIG. 4G). Power burner 301 (FIG. 4B) can provide heat to the heat transfer surface of engine 11 (FIG. 4G) to create heat differential that can drive, if engine 11 (FIG. 4G) is Stirling engine 11A (FIG. 4D), the Stirling cycle. Heater head high-limit thermocouple 325 (FIG. 4C) is a hardware safety overtemp that can provide equipment protection. A helium fill system can be used to maintain proper helium pressure in the Stirling engine pressure vessel. The fill system can include helium bottle 323 (FIG. 4D), pressure transducer, gas pressure regulator 329 (FIG. 4D), and solenoid valve 327 (FIG. 4D). Main gas valve 331 (FIG. 4B) can be a dual solenoid valve that isolates system 100 from a main gas supply. Fuel valve interlock contacts 333 (FIG. 4A) or optional contacts can be included that can be wired to a remote on/off switch, a CO detector, and/or a heat alarm. An airlock can separate a wet lubricated sump from a dry workspace. The airlock can include a differential pressure transducer and an electric pump motor for closed loop control of airlock pressure.

Figure 4J:
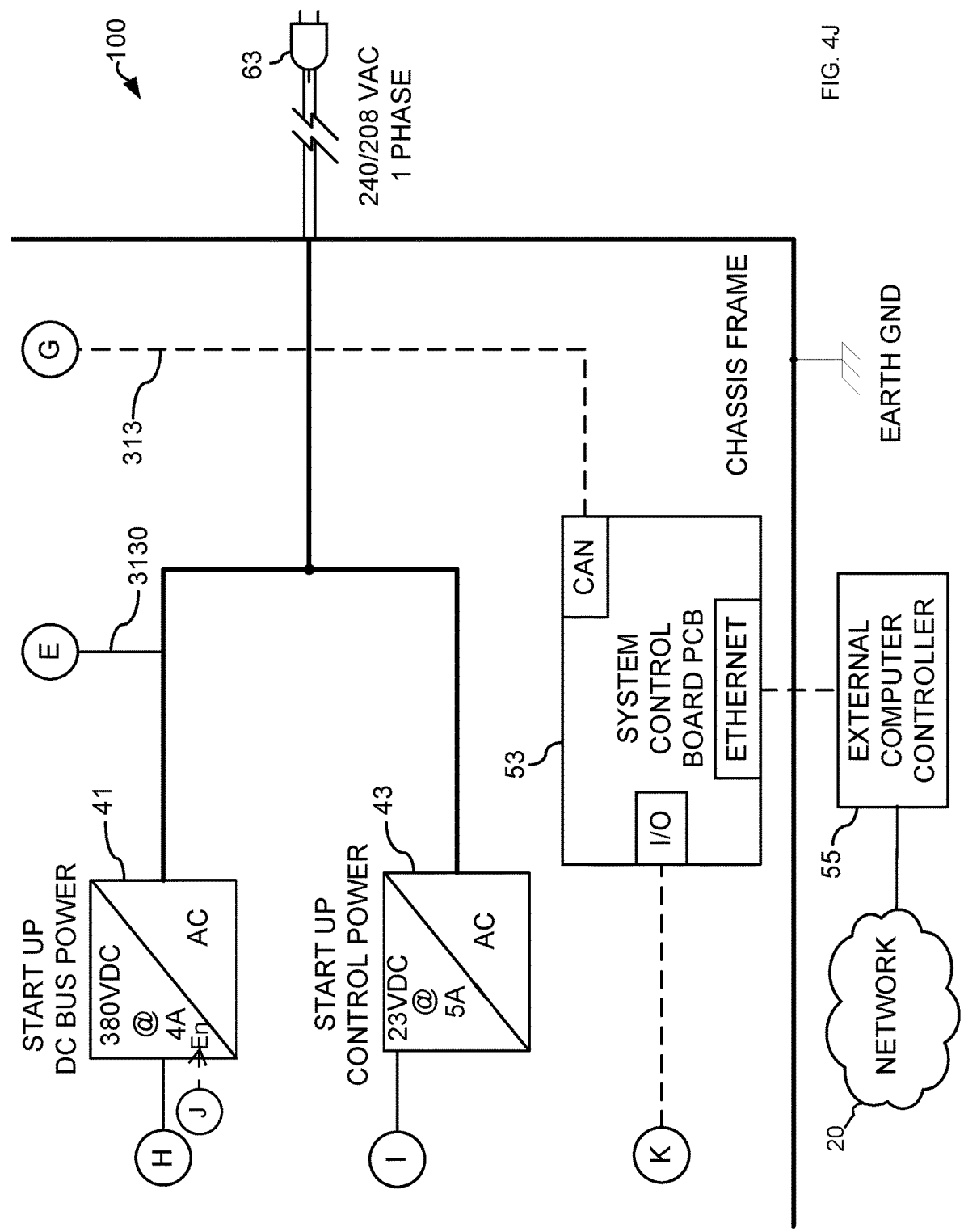

Continuing to refer primarily to FIGS. 4G-4J, system 100 can optionally include diode 38 (FIG. 4G) inhibiting current flow from motor power board 15 (FIG. 4G) to capacitor bank 37 (FIG. 4G) as discussed herein. PMSM 13 (FIG. 4G), along with motor power board 15 (FIG. 4G) and engine control board 49 (FIG. 4I), can control engine 11 (FIG. 4G). PMSM 13 (FIG. 4G) can optionally be a 3-phase generator. Motor power board 15 (FIG. 4G) can provide 12 kVA, and be a 3-phase, 4 quadrant AC/DC converter. In some configurations, EMI filter 23 (FIG. 4H) can include a 50A filter, DC output breaker 27 (FIG. 4H) can include a 50A breaker, DC power can be delivered at 390 VDC, relatively small power supply 41 (FIG. 4J) can supply 380 VDC @ 4A, and the capacity of capacitor bank 37 (FIG. 4G) can be a function of the starting torque. In some configurations, more or less power can be supplied, where each other power component can be scaled according to the overall system requirements. System 100 can include system control power source 45 (FIG. 4I) and start-up system control power source 43 (FIG. 4J). Power control board 39 (FIG. 4H) and system control board 53 (FIG. 4J) can optionally include commercially available hardware and software to implement controller area network (CAN) bus 313 (FIG. 4J). Exemplary messages exchanged over CAN bus 313 (FIG. 4J) are described herein. System 100 can further include engine control input/output (I/O) board 49 (FIG. 4I) operably connected to start-up control power 43 (FIG. 4J), external on/off control 58 (FIG. 4I), and system control power 45 (FIG. 4I). Engine control board 49 (FIG. 4I) can be powered at start-up by start-up control power 43 (FIG. 4H), and then during operation by engine 11 (FIG. 4G) through system control power 45 (FIG. 4I).

Continuing to refer primarily to FIGS. 4G-4J, system 100 can include at least one start-up DC bus power 41 (FIG. 4J), an AC mains-derived DC power supply used during engine starts. Start-up DC bus power 41 (FIG. 4J) can supply power to DC bus 250 (FIG. 4E) and ultimately engine 11 (FIG. 4G), and can derive its power from AC power source 63 (FIG. 4J). In some configurations, start-up DC bus power 41 (FIG. 4J) can supply, for example, but not limited to, 380 VDC @ 4A. When that is not enough power to start engine 11 (FIG. 4G), at least one motor start capacitor bank 37 (FIG. 4G) can supply some of its stored energy to start engine 11 (FIG. 4G). Motor start capacitor bank 37 (FIG. 4G) can be sized at, for example, but not limited to, 24.6 milli-Farads. The pairing of start-up DC bus power 41 (FIG. 4H) with motor start capacity bank 37 (FIG. 4G) can allow start-up DC bus power supply 41 (FIG. 4H) to be relatively smaller than a power supply that would alone supply peak power required for start-up of engine 11 (FIG. 4G). DC bus power 41 (FIG. 4H) can optionally be enabled which can be powered, at start-up, by start-up control power 43 (FIG. 4H), an AC mains-derived DC power supply used during engine starts that can supply power (for example, but not limited to, 23 VDC @ 5A) to engine control I/O board 49 (FIG. 4I), system control board 53 (FIG. 4J), and power control board 39 (FIG. 4H). After engine start-up and current flow begins, diode 38 (FIG. 4G) can prevent current from flowing into motor start capacitor bank 37 (FIG. 4G) and start-up DC bus power 41 (FIG. 4J). Further, when engine 11 (FIG. 4G) is operational, it can supply current to power subsystem 105A (FIG. 4I), which can replace start-up control power 43 (FIG. 4J) as the power supply for control subsystem 107A (FIG. 4A) by providing a higher voltage, for example, but not limited to 24 VDC @ 5A, relative to the power of start-up control 43 (FIG. 4J) which can be, but is not limited to being, 23 VDC @ 5A.

Referring still primarily to FIGS. 4G-4J, system control power 45 (FIG. 4I) can be the power supply on DC bus 250 (FIG. 4E) that can supply power to system and power controllers at 24 VDC @ 12A. Some configurations of power control board 39 (FIG. 4H) are described in part in United States Patent Application #s 2013-0099565, 2014-0091622, WO 2014/152706, and 2015-0084563, all entitled Modular Power Conversion System. In some configurations, Modular Power Conversion System, upon which power control board 39 (FIG. 4H) can be based, can convert any form of electrical power to any other form of electrical power and optimize the available sources and loads based on real time pricing and demand variables without grid feedback. Power control board 39 (FIG. 4H) can be an embedded control and acquisition system that can include a digital signal processor, I/O and peripherals. Power control board 39 (FIG. 4H) can send control signals to motor power board 15 (FIG. 4G), DC output board 19 (FIG. 4H), and igniter power board 31 (FIG. 4G). The control signals can include, but are not limited to including, conventional low voltage differential signaling (LVDS) gate control signals. Other control signals can include LVDS Bridge Fault and Status Signals and inter-integrated circuit communication signals. Power control board 39 (FIG. 4H) can monitor 240 VAC 63 through monitor line 3130 (FIGS. 4H/4J). System 100 phase locks to 240 VAC input 63 (FIG. 4J) to measure voltage and frequency and report these via CANbus 313 (FIG. 4J) to system control board 53 (FIG. 4J). System control board 53 (FIG. 4J) can, for example, but not limited to, decide whether to allow an engine start sequence depending on whether 240 VAC 63 (FIG. 4J) appears to be within acceptable tolerances. System control board 53 (FIG. 4J) can also record the reported voltage and frequency in a continuously running log file. The recorded frequency measurement may indicate when an externally attached grid-forming inverter is using a frequency shift method of signaling a change in power demand to other attached grid tied inverters.

Referring again primarily to FIGS. 4G-4J, system 100 can further include engine control I/O board 49 (FIG. 4I), including VFD control 49A (FIG. 4I), hardware safety interlock 49B (FIG. 4I), I/O and sensor interface 49C (FIG. 4I), and system control interface 49D (FIG. 4I). System 100 can also include system control board 53 (FIG. 4J) that can enable, for example, but not limited to, embedded control and acquisition. Engine control I/O board 49 (FIG. 4I) can be powered by startup DC bus power 41 (FIG. 4J) until engine 11 (FIG. 4G) is running. Engine control I/O board 49 (FIG. 4I) can be operably connected to system control board 53 (FIG. 4J), and emergency power off (EPO) switch 57 (FIG. 4I). System control board 53 (FIG. 4J) can be operably connected to external computer controller 55 (FIG. 4J) (and ultimately network 20 (FIG. 4J)). External on/off control 58 (FIG. 4I) can include, but is not limited to including, a contact closure that can be used to signal system 100 to start. Engine control I/O board 49 (FIG. 4I) can include, but is not limited to including, commercially available components such as, for example, National Instruments (NI) cRIO 9023, NI 9112 FPGA 8 slot chassis, NI 9213 Thermocouple module, NI 9426 Digital Input Module, NI 9477 Digital Output Module, ONI 9205 Analog Input Module, NI 9264 Analog Output Module, NI 9505 DC Servo Drive Module, NI 9375 Digital IO Module, and NI 9853 CAN Communications Module.

Continuing to refer primarily to FIGS. 4G-4J, system 100 can further include, but is not limited to including, system I/O and sensors 51 (FIG. 4I) and flame detect module 47 (FIG. 4I). Flame detect module 47 (FIG. 4I) can, for example, but not limited to, monitor the presence of flame in burner 301 (FIG. 4B); the monitoring can avoid accumulation of unburnt fuel in a burner system. Parameters that can be sensed by system I/O and sensors 51 (FIG. 4I) can include, but are not limited to including, (1) motor stator inner thermistor 344 (FIG. 4C) that can monitor stator temperature of PMSM 13 (FIG. 4G) for equipment protection, (2) airlock pressure sensor 347 (FIG. 4D) that can maintain proper helium pressure in engine 11 (FIG. 4G), (3) coolant flow sensor 337 (FIG. 4F) that can monitor coolant flow in system 100 where the monitoring can protect engine 11 (FIG. 4G), (4) coolant pressure relief valve 341 (FIG. 4F) that can limit the pressure in the cooling system under abnormal conditions, (5) cooler thermistor 343 (FIG. 4C) that can monitor coolant temperature in engine 11 (FIG. 4G) for equipment protection and control, (6) a crankcase pressure sensor (not shown) that can monitor bulk working gas pressure in a pressure vessel of engine 11 (FIG. 4G), (7) exhaust gas oxygen sensor 349 (FIG. 4D) that can monitor the oxygen level in burner exhaust gas and for closed loop control of a fuel/air ratio, (8) flame temperature thermocouple sensor 351 (FIG. 4C) that can monitor the temperature of a power burner flame, (9) swirler thermocouple 353 (FIG. 4C) that can monitor air preheat temperature in a burner recuperator, (10) heater head thermocouple 355 (FIG. 4C) that can monitor the temperature of a heat transfer surface of engine 11 (FIG. 4G), (11) oil pressure sensor 357 (FIG. 4D) that can monitor oil pressure in engine 11 (FIG. 4G) for equipment protection, and (12) oil temperature thermistor 361 (FIG. 4D) that can monitor oil temperature in engine 11 (FIG. 4G), where the monitoring can protect the equipment.

Figure 5A:
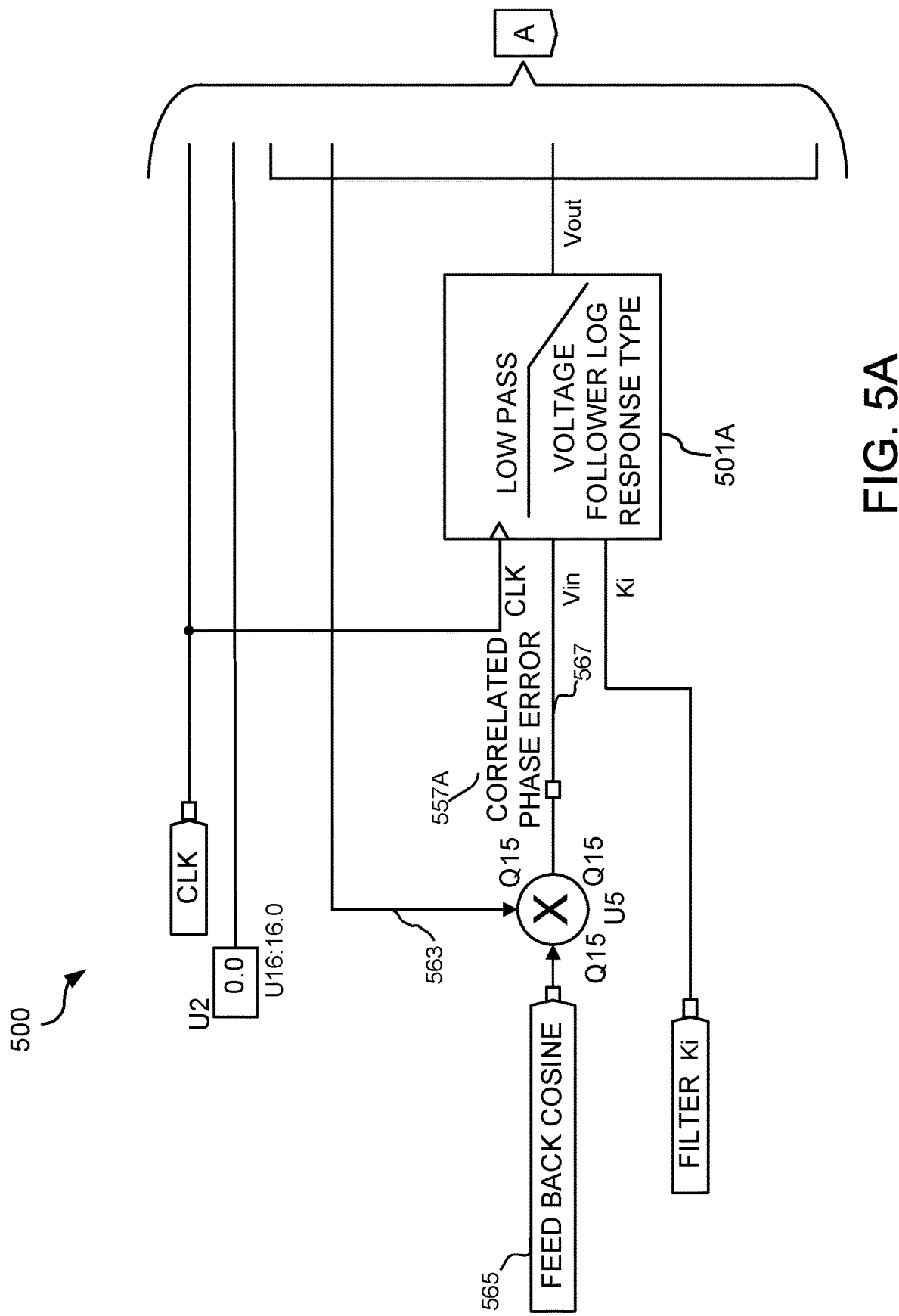
FIGS. 5A-5C are schematic diagrams that together represent an individual phase lock loop building block of some configurations.
Figure 5B:
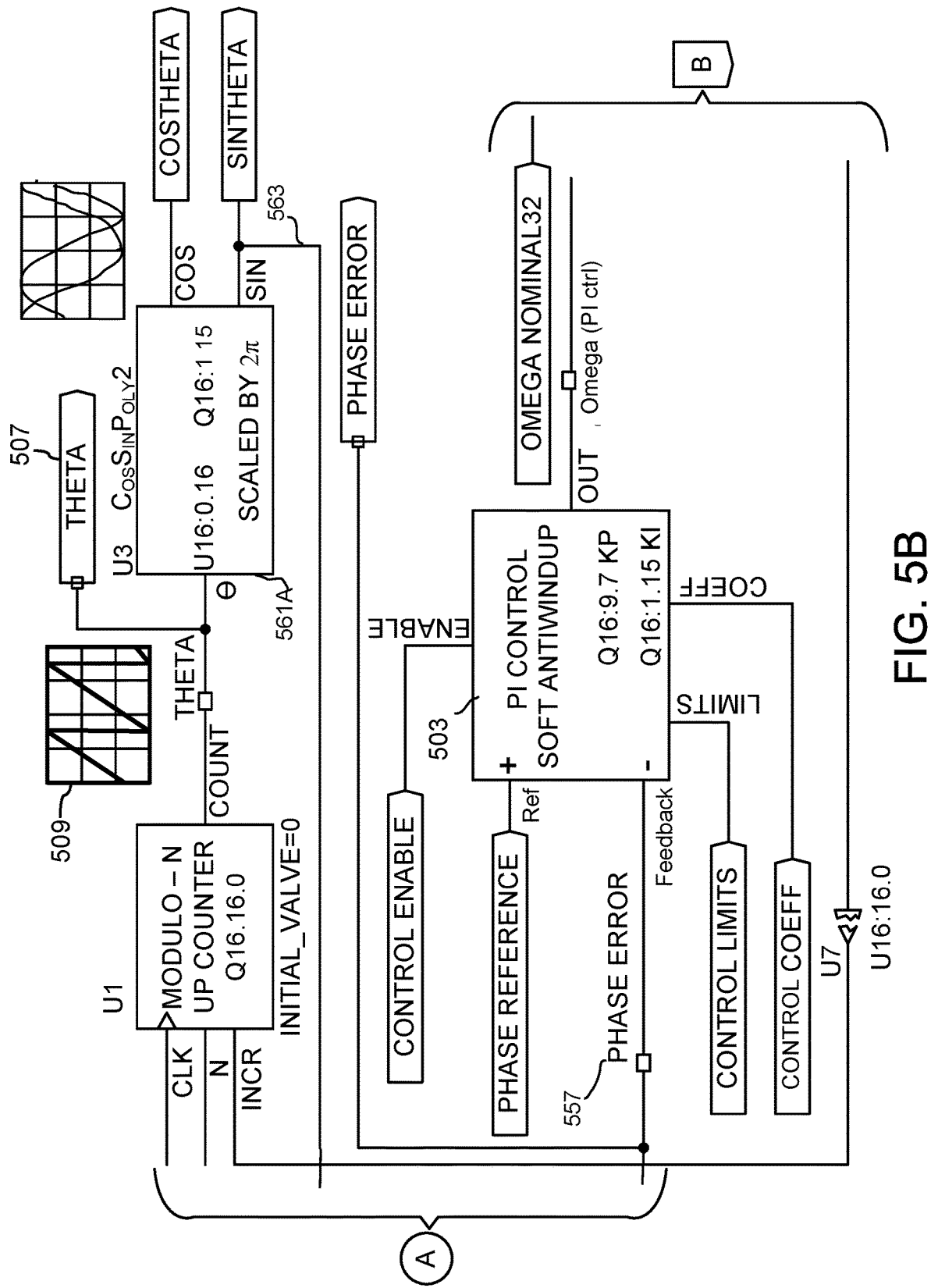
Figure 5C:
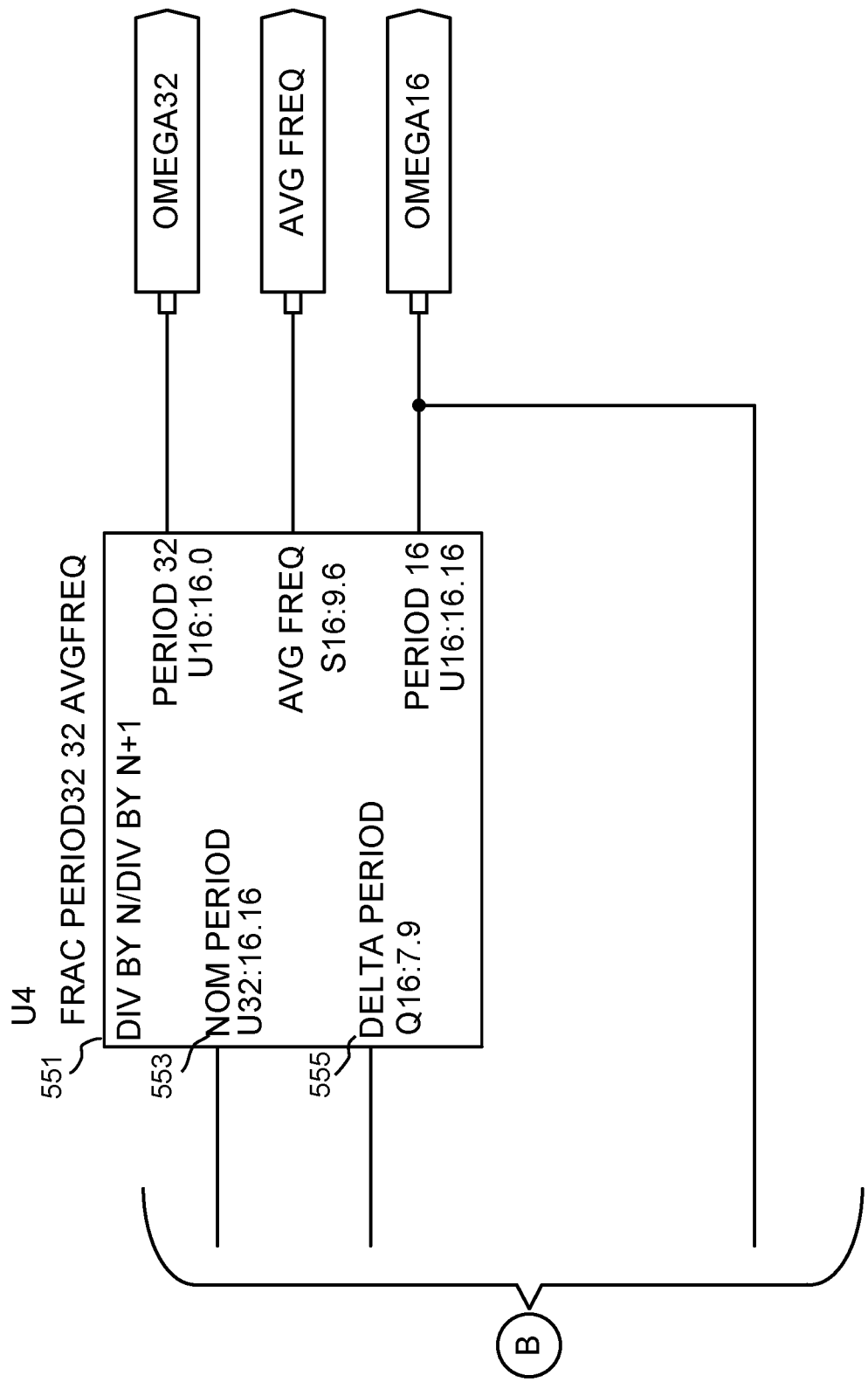
Figure 5D:
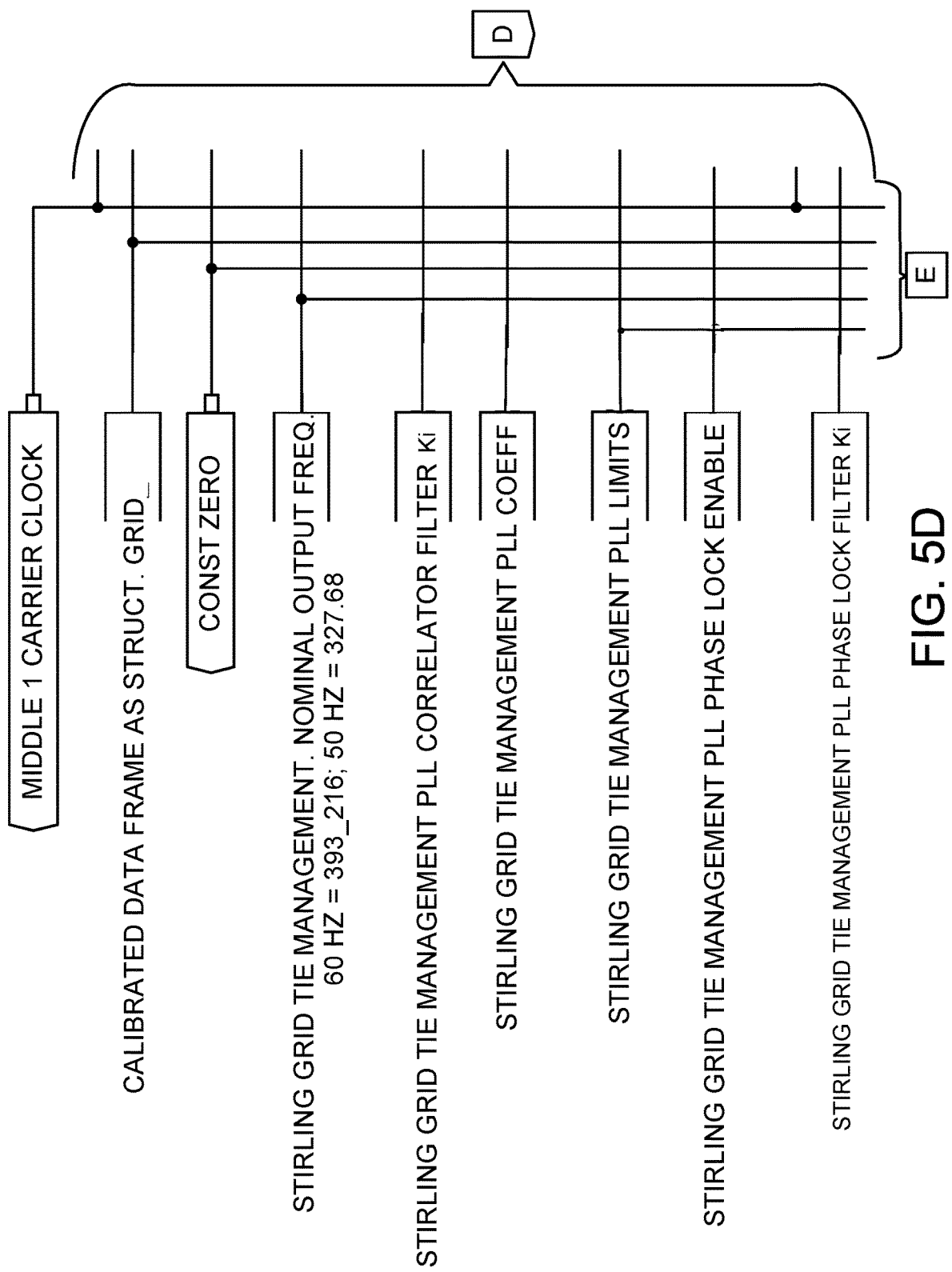
FIGS. 5D-5I are schematic diagrams that together represent dual phase lock loops of some configurations.
Figure 5E:
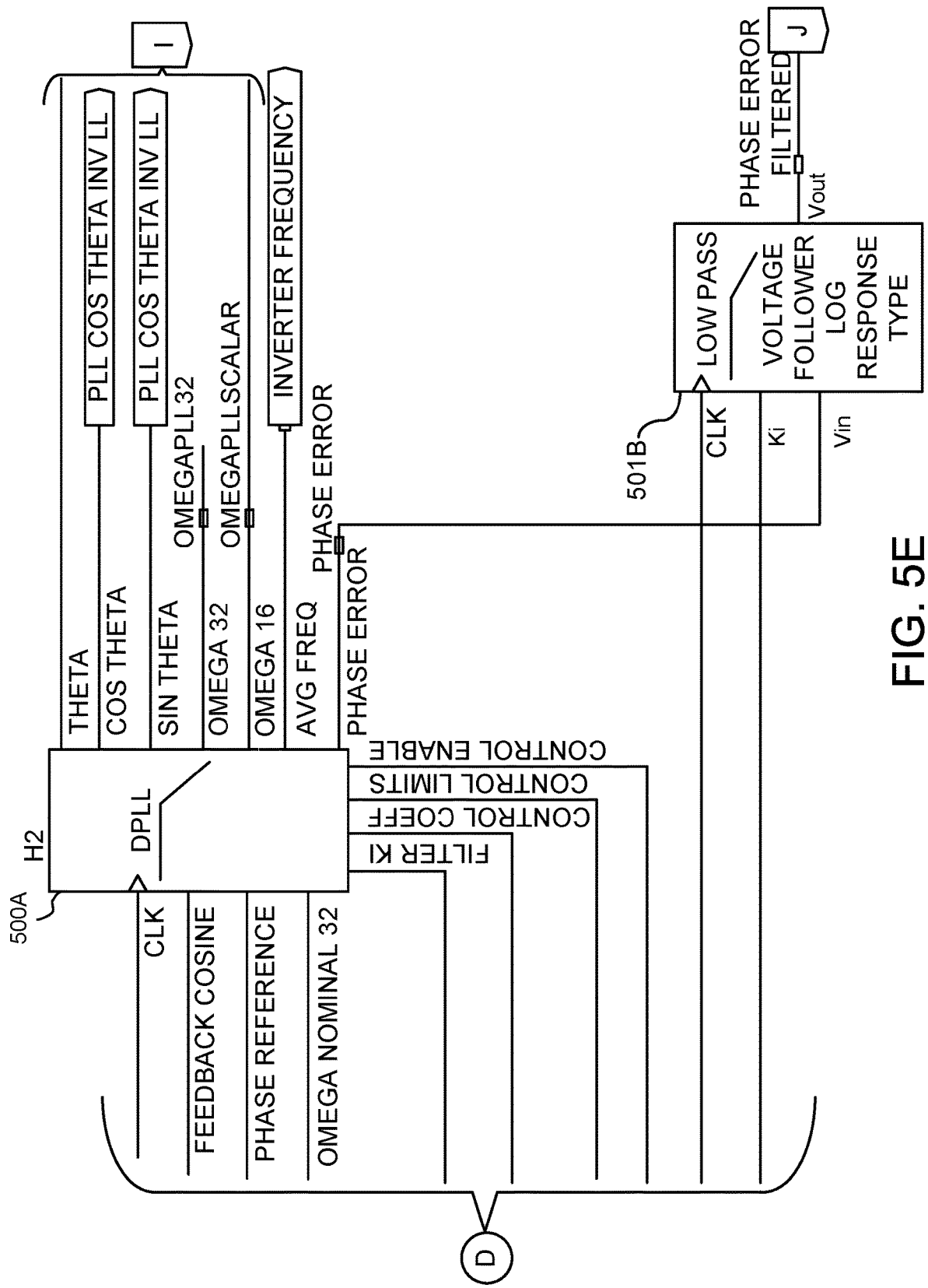
Figure 5F:
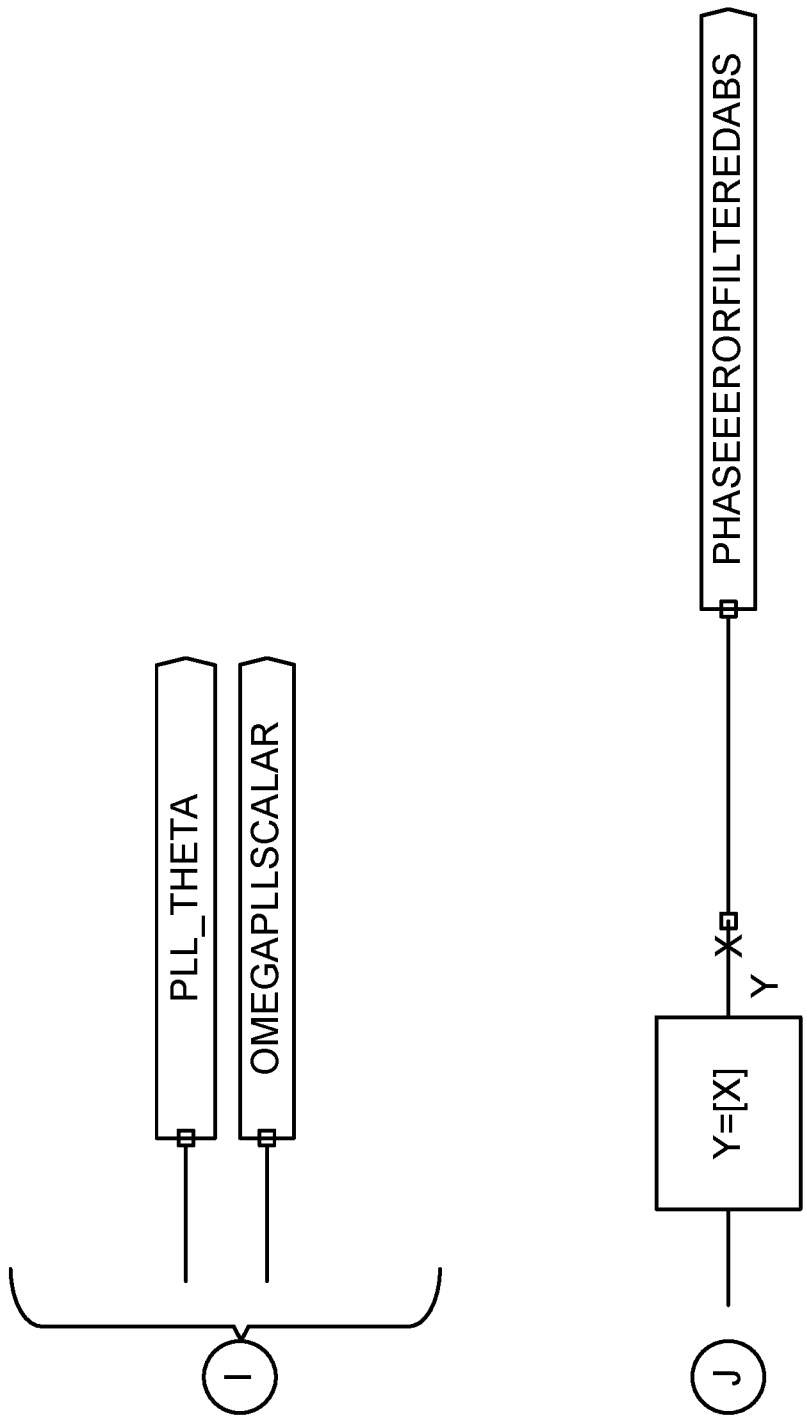
Figure 5G:
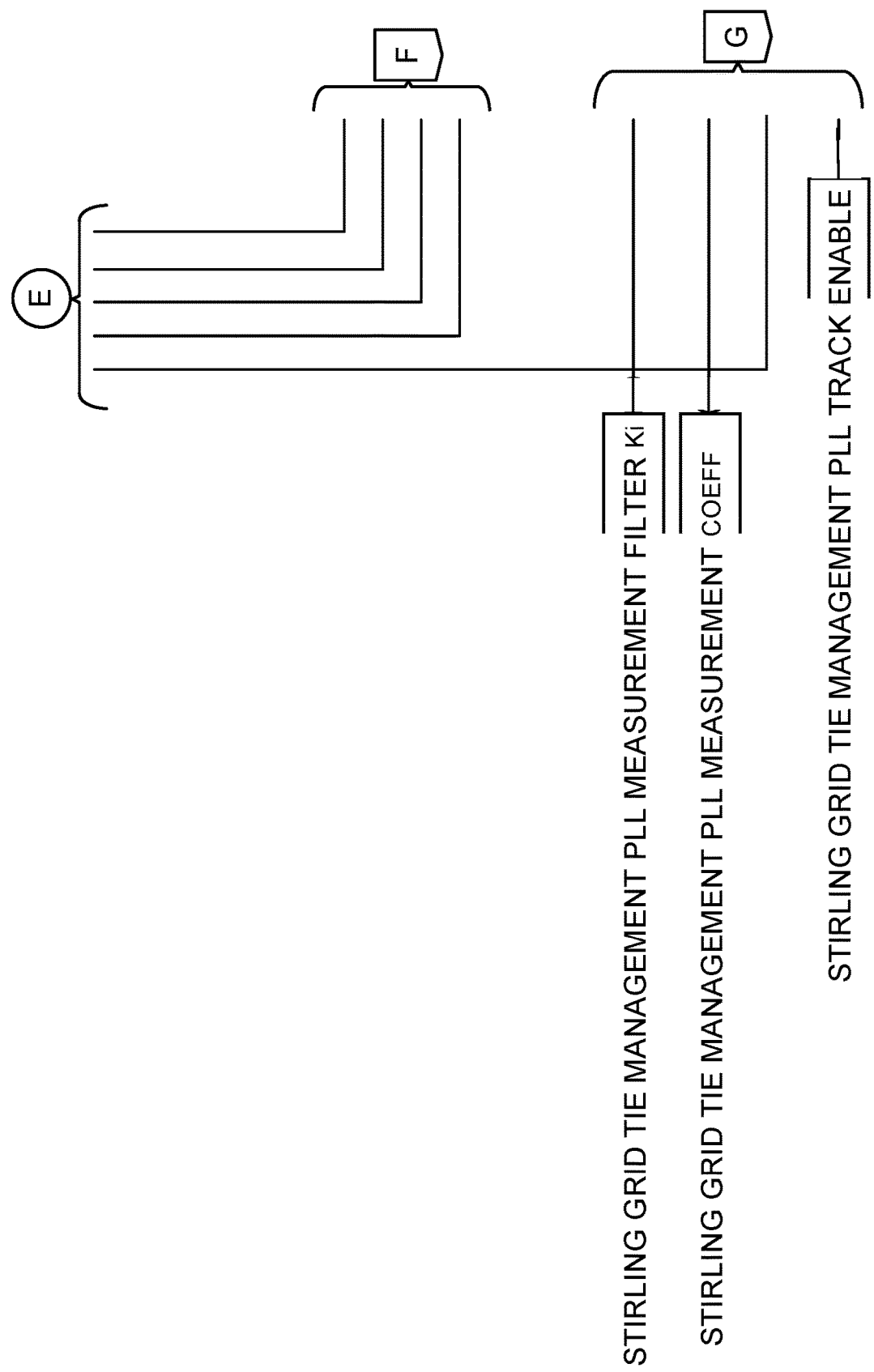

Referring now primarily to FIGS. 5A-5C, phase lock loop (PLL) 500 (FIG. 5A) can integrate frequency-based grid connection safety features into system 100 (FIGS. 4C-4F). PLL 500 (FIG. 5A) can include sawtooth waveform generator 509 (FIG. 5B) that can provide angle θ 507 (FIG. 5B) to polynomial calculation 561A which can produce sine and cosine pair (quadrature) 509 (FIG. 5B) for angle θ 507 (FIG. 5B). Angle θ 507 (FIG. 5B) can be constantly swept from 0° through 360° (via sawtooth 505 (FIG. 5B)) at rate (i.e. frequency) which can be varied, for example, but not limited to, under software control to achieve an operating frequency of 60 Hz +/− approximately 6 Hz. To achieve phase lock with the grid, a phase error signal can be derived by multiplying sine 563 (FIG. 5A) of the phase lock loop reference by the grid voltage Vab which is assumed to be a sinusoidal signal also operating at approximately 60 Hz. At this step, the voltage Vab is taken to be cosine 565 (FIG. 5A) of the grid voltage. By multiplying sine 563 (FIG. 5A) of the reference by cosine 565 (FIG. 5A) of the grid, a signal 567 (FIG. 5A) is produced which contains both an AC and a DC component. The AC component will vary in amplitude according to the amplitudes of the reference and the grid, and will have a frequency of 2× the grid frequency once the loop is locked. The DC component will vary in amplitude according to the phase error between the reference and the grid. Since the reference and the grid form a quadrature pair, the phase error will be zero when they are 90° apart. With a known phase error 557 (FIG. 5B), PI controller 503 (FIG. 5B) can be applied to create a closed loop control which can drive phase error 557 (FIG. 5B) to zero by modulating frequency. In some configurations, system 100 (FIGS. 4C-4F) can operate within the constraints of fixed-point integer math and a fixed frequency (10 kHz) carrier rate. The 10 kHz carrier rate means that angle θ 507 (FIG. 5B) is updated once every 100 μsec. Angle θ 507 (FIG. 5B) is represented by an unsigned 16-bit value where zero=0° and $2^{16}-=359.995°$.

Continuing to refer to FIGS. 5A-5C, to achieve a frequency of 60 Hz, angle θ 507 (FIG. 5B) must sweep from 0° through 360° in 16.6 (1/60) msec with a constant increment applied once every 100 μsec (the carrier period). This increment can be calculated as follows: (65536/10000 Hz)× 60 Hz=393.216 where 65536=360° as represented by the angle θ, 10000 Hz=carrier frequency, and 60 Hz=desired angle θ→frequency. Fixed point integer math cannot produce a non-integral increment on an individual carrier. The nearest two integral values (in this case 393 and 394) are interleaved so that the average increment equals the exact required increment over some number of carriers, referred to herein as fractional clock division. Fractional clock divider 551 (FIG. 5C) can follow PI controller 503 (FIG. 5B), and can utilize a combination of 32-bit center frequency input 553 (FIG. 5C) (e.g. 60 Hz) and a 16-bit delta frequency input 555 (FIG. 5C) which can be driven by PI controller 503 (FIG. 5B). 32-bit center frequency value 553 (FIG. 5C) can allow direct representation of the fractional increment value where the delta frequency input allows PI controller 503 (FIG. 5B) to operate in its natural bipolar mode centered on zero. Even operating at a fixed frequency (holding delta frequency at a constant) the output of clock divider 551 (FIG. 5C) will not be a constant, but, in the case of a 60 Hz system, the output of clock divider 551 (FIG. 5C) will be toggling between 393 and 394 in a predictable pattern. Thus, the instantaneous value of output from clock divider 551 (FIG. 5C) may not be able to be used as a direct indication of operating frequency because the value is constantly changing. Frequency measurement accuracy and/or PLL stability can be affected by the AC component (sinusoidal) in phase error signal 557 (FIG. 5B). Feeding phase error 557 (FIG. 5B) into PI controller 503 (FIG. 5B) can cause the error to propagate directly through PI controller 503 (FIG. 5B) which could cause the instantaneous value of the frequency to be incorrect. Using low pass filter 501A (FIG. 5A) to filter phase error 557A (FIG. 5A) before supplying it to PI controller 503 (FIG. 5B) could eliminate most of the AC component which is not relevant to the control.

Figure 5H:
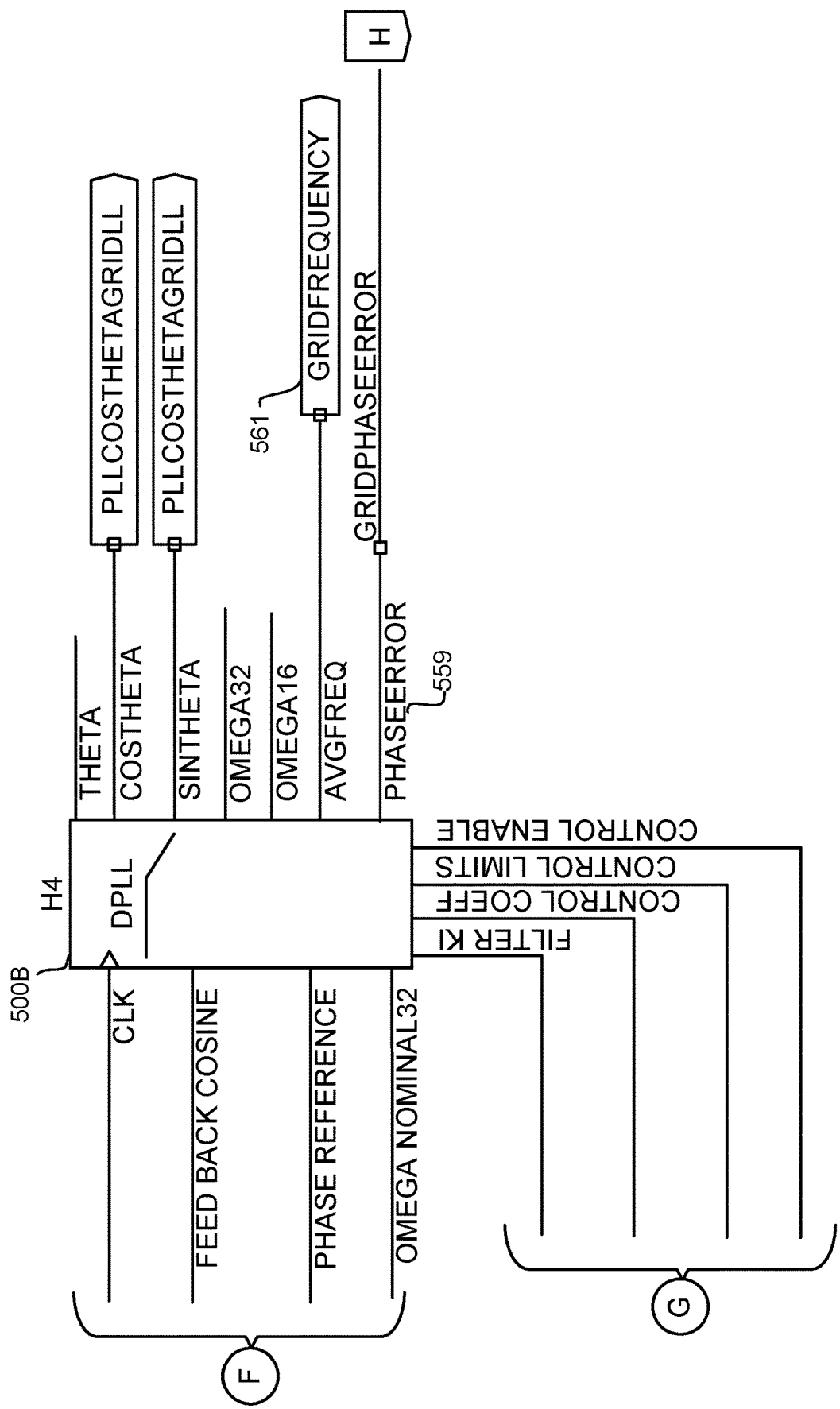
Figure 5I:
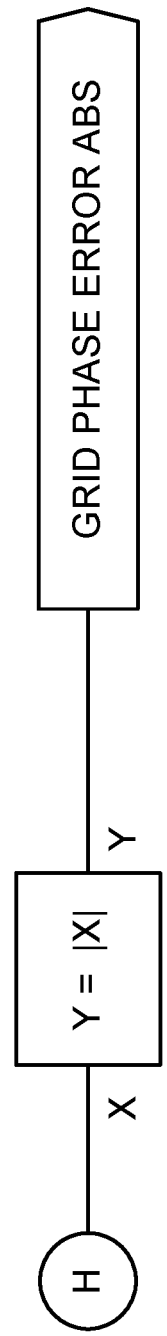

Referring now primarily to FIGS. 5D-5I, in an exemplary use of the logic from FIGS. 5A-5C, dual PLLs can be used in system 100 (FIGS. 4C-4F) to monitor grid voltage and frequency. Specifically, first digital phase locked loop (DPLL) 500A (FIG. 5E) can track grid voltage and frequency when the voltage and frequency are within tolerance. Second DPLL 500B (FIG. 5H) can continuously measure and report grid frequency 561 (FIG. 5H) and phase error 559 (FIG. 5H), and can remain locked over as wide a range as possible. Grid voltage measurement can be referenced to second DPLL 500B (FIG. 5H). Conditions that can be required for PLL lock are that (1) absolute error must be less than a threshold, and (2) input voltage must be within a threshold. Low pass filter 501B (FIG. 5E) can be used to filter the output of first DPLL 500A (FIG. 5E) to improve PLL performance.

Figure 6:
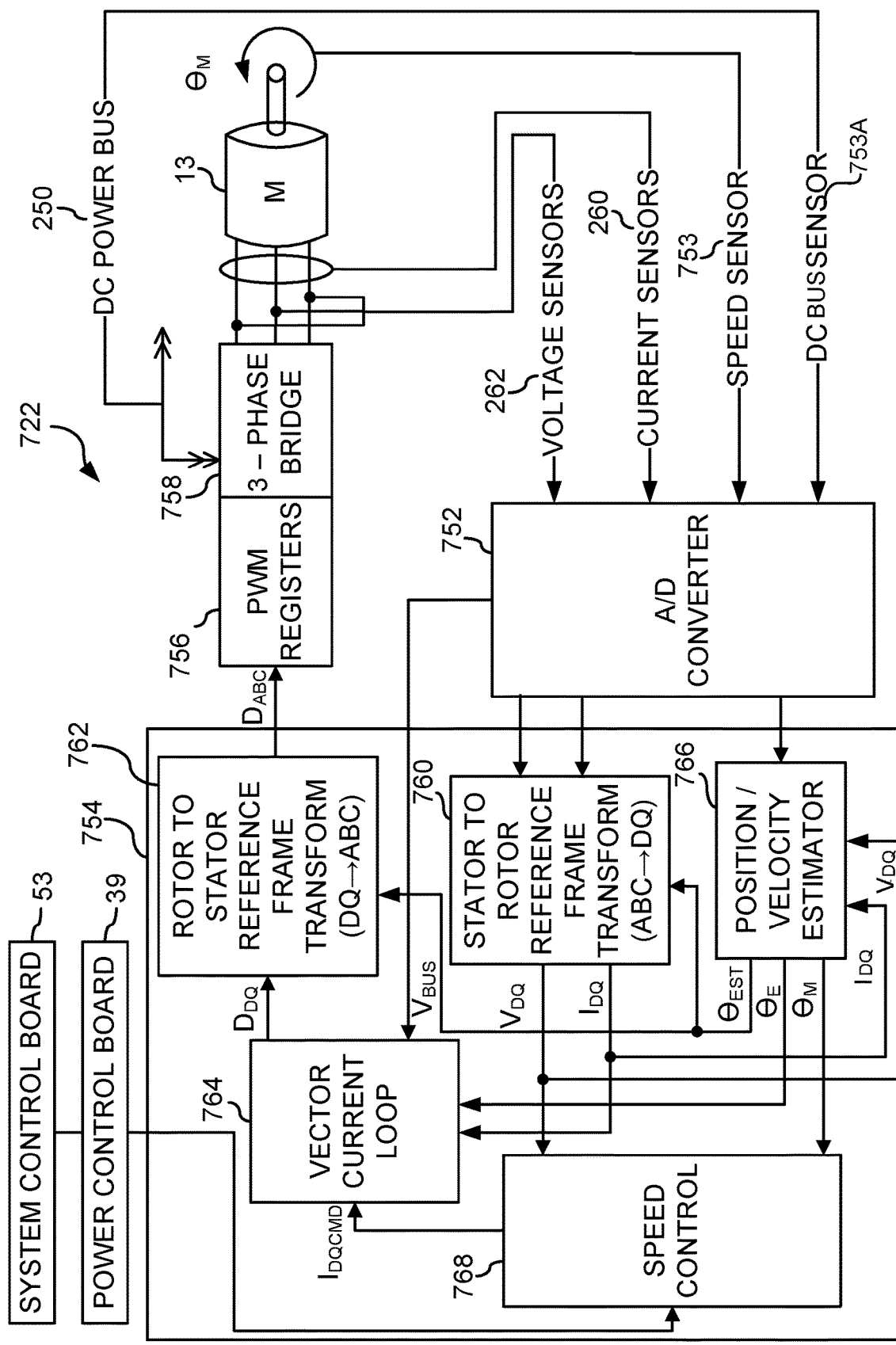
FIG. 6 is a schematic block diagram of the velocity controller state machine of the present teachings.

Referring now primarily to FIG. 6, velocity control for PMSM 13 can include power electronic circuit 722 for 3-phase PMSM 13. Other control loop structures may also be used to control PMSM motor/generator 13 or other motors as well. Analog/digital (A/D) converter 752 can convert analog sensor signals from PMSM motor 13 to digital signals for use by digital signal processor (DSP) 754. Digital Hall sensors (not shown) can be used to eliminate A/D converter 752. Voltage sensors 262 and current sensors 260 can be provided for 3-phase demodulation of the three phase signals ABC and, applying Clarke/Park transforms, given sin/cos of the electrical angle, the 3-phase signal can be converted to a 2-phase orthogonal (xy) reference frame, and then from the stationary reference frame to the rotor (dq) reference frame for vector current loop 764. Each of the Clarke/Park orthogonal reference frame transform 760 and rotor reference frame transform 762 have different scaling and normalization factors and circuitry can be provided to prevent saturation of the output duty cycle and allow significant amplitude to be added to the net output duty cycle. Position/velocity estimator 766 can receive signals from motor velocity sensor 753 sensing the velocity of PMSM motor 13, as well as orthogonal reference frame transform 760, and can compile a position and velocity estimation of PMSM motor 13. Vector current loop 764, orthogonal reference frame transform 760, rotor reference frame transform 762, PWM registers 756, 3-phase bridge 758, and position velocity estimator 766 can execute in a motor velocity control loop 768 which can receive commands from system control board 53 via power control board 39 to directly control PMSM motor/generator 13.

Continuing to refer primarily to FIG. 6, Stirling engine 11A (FIG. 3) does not produce constant output torque, so as it operates, the torque oscillates up and down. To control the motor torque of PMSM motor/generator 13 and hence the velocity, vector current feedback loop 764 can be used so that the variable torque from Stirling engine 11A (FIG. 3) and the resultant DC power do not detrimentally effect PMSM motor/generator 13. Vector control of PMSM motor/generator 13 can be used with a velocity control state machine using essentially three different control states: start-up, starting and running states. Position/velocity estimator 766 can estimate position/velocity through information provided by position sensors, for example resolver 59 (FIG. 3), or three Hall sensors (not shown) at, for example, 60°. DC bus sensor 753A can provide DC bus status information to A/D converter 752.

Figure 7:
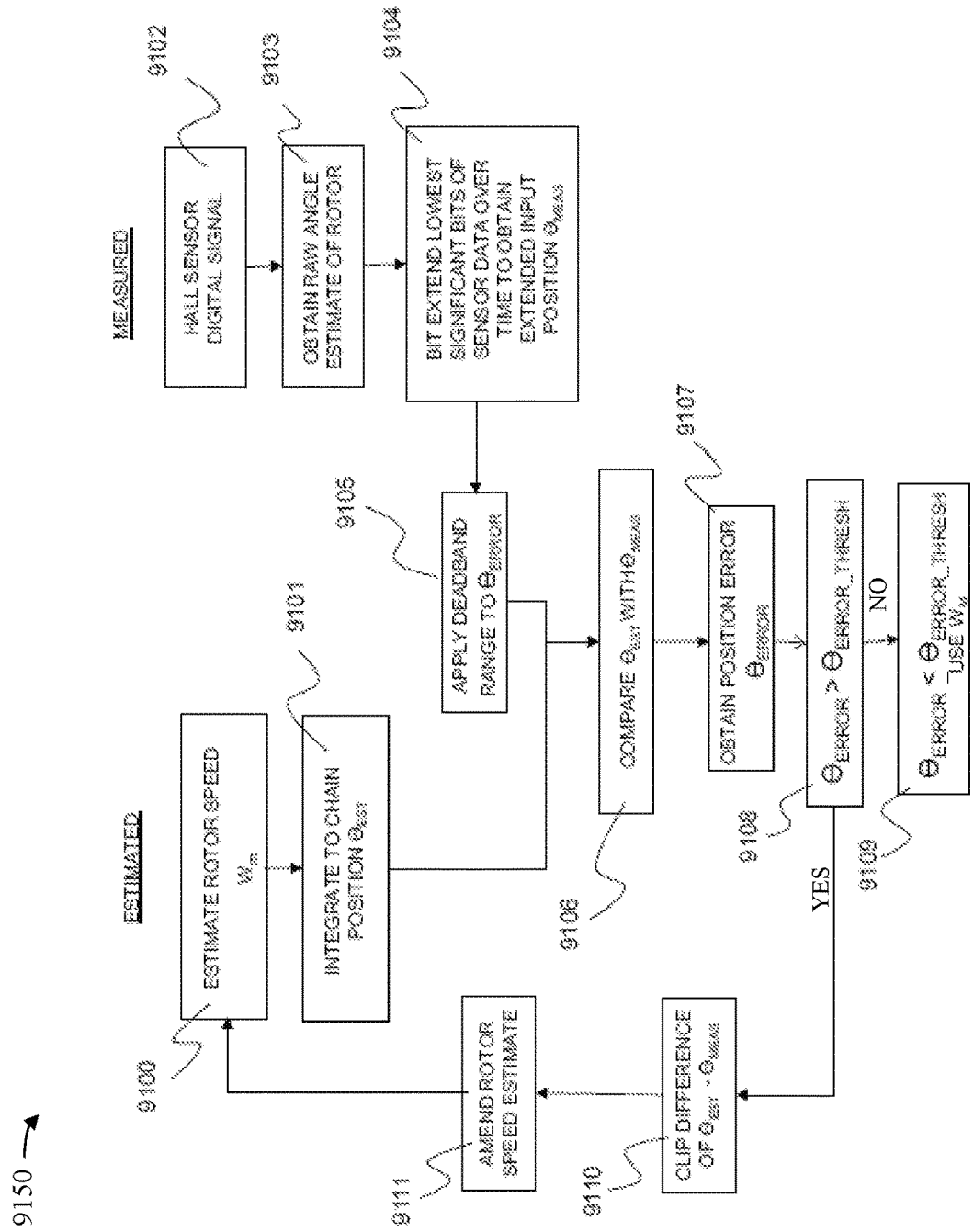
FIG. 7 is a schematic block diagram of one configuration of the feedback loop for adjustments to rotor speed of the present teachings.

Referring now primarily to FIG. 7, using Hall sensors in their stateless form it is possible to decode the sector from the Hall sensor and compute position increment and unwrap, which can provide a raw Hall angle and an indication of which positional motor segment the rotor is in. In order to obtain the necessary motor speed estimate for motor power board 15 (FIG. 3), the position can be differentiated, or a feedback loop can be used. Method 9150 can include estimating 9100 rotor speed and integrating 9101 estimated speed to get an estimated rotor position. Method 9150 can further include receiving 9102 a Hall sensor digital signal and obtaining 9103 from the digital signal a raw estimate of angle of the rotor with each 60° step of the motor cycle, and unwrapping 9104 the raw estimate bit by extending the lowest significant bits of the sensor information over time to obtain a bit extended input position. Method 9150 can include transforming 9105 a sawtooth error from the Hall sensor by putting the input position through a deadband block. The deadband range can compensate for the +30° and −30° limit of known natural error of a Hall sensor. The deadband range is 70-80% of this limit of natural error and therefore everything outside the error which exists within the deadband range may be essentially disregarded and/or moved towards a zero value. Error may also be limited by the use of techniques and methods for dynamically setting limits on the commanded current. Method 9150 can further include comparing 9106 the estimated rotor position to the measured rotor position from the Hall sensor(s) to produce an error term. Method 9150 can include computing 9107 a position error based on the error term, and changing 9111 the initial speed estimate based on the position error. Method 9150 can optionally include if 9108 the error is greater than an error threshold, clipping 9110 the difference between the estimated position and the measured position. Method 9150 can further optionally include if 9108 the error is less than or equal to the error threshold, if 9109 the error is less than or equal to the error threshold, using the estimated rotor speed. Current limits can be used in electronic circuitry in order to prevent excessive current that may result in catastrophic failure of electronic components, in this case motor/generator 13 (FIG. 3). In some configurations, the generation of commands for current which can prevent the current from exceeding a dynamically predetermined limit can be used. The limit may be determined for example as a function of power dissipation in a component as estimated from a measured current level and as a function of a measured temperature proximate to the component. Other methods and techniques for limiting current are possible as well. Some of these are described in U.S. Pat. No. 6,992,452, entitled Dynamic Current Limiting, issued on Jan. 31, 2006, and hereby incorporated by reference.

Continuing to refer primarily to FIG. 7, if an input sensor has inaccuracies, for example, if a Hall sensor is inaccurate to 30°, or a resolver is inaccurate to 5°, the input sensor can override if the error between input sensor and estimate is too high. For example, if the Hall sensor measurement is 5° different from the raw input estimate, then the estimated value can be used. If the error is within 70°, the difference between the Hall sensor and the estimate can be clipped to a desired range, for instance an error threshold of 35-45°. The error value can be limited to a band around the angle. Other threshold errors could also be used as well.

Figure 8:
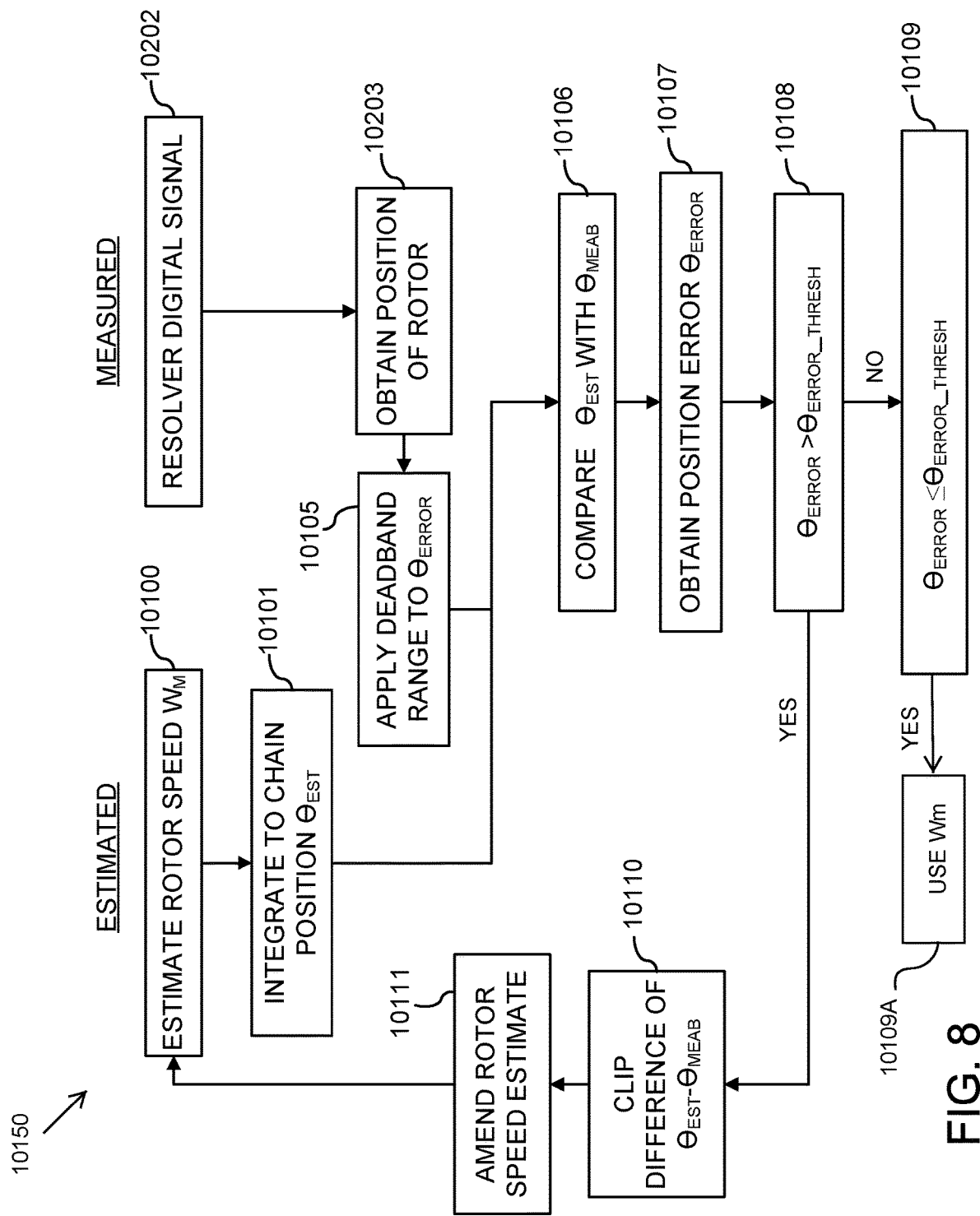
FIG. 8 is a schematic block diagram of another configuration of the feedback loop for adjustments to rotor speed of the present teachings.

Referring now primarily to FIG. 8, in some configurations, the feedback loop of FIG. 7 may use a resolver instead of Hall sensors. Method 10150 can include estimating 10100 the rotor speed, and integrating 10101 the estimated speed to obtain an estimated rotor position. Method 10150 can further include receiving 10202 resolver digital signal 56 (FIG. 4E) and calculating 10203 a measured position of the rotor based on resolver digital signal 56 (FIG. 4E). Method 10150 can also include comparing 10106 the estimated rotor position to the measured rotor position from the resolver, and calculating 10107 a position error based on the comparison. Method 10150 can include changing 10111 the initial speed estimate based on the position error. In some configurations, obtaining an accurate measured rotor angle position can be aided by the use of limiters, i.e. current limiting methods and techniques, as well as deadbands based on resolver performance. Method 10150 can optionally include applying 10105 a deadband range to the measured rotor position which can transform the sawtooth error from the resolver, narrowing the measured input position value that can then be compared to the estimated position. The deadband range can compensate for the +5° and −5° degree limit of known natural error of a resolver. The deadband range can be 70-80% of this limit of natural error and therefore everything outside the error which exists within the deadband range may be essentially disregarded and/or moved towards a zero value. Error may also be limited by the use of techniques and methods for dynamically setting limits on the commanded current. Method 10150 can further optionally include if 10108 the error is greater than an error threshold, clipping 10110 the difference between the estimated position and the measured position. Method 10150 can further optionally include if 10109 the error is less than or equal to the error threshold, using 10109 A the estimated rotor speed.

Figure 9:
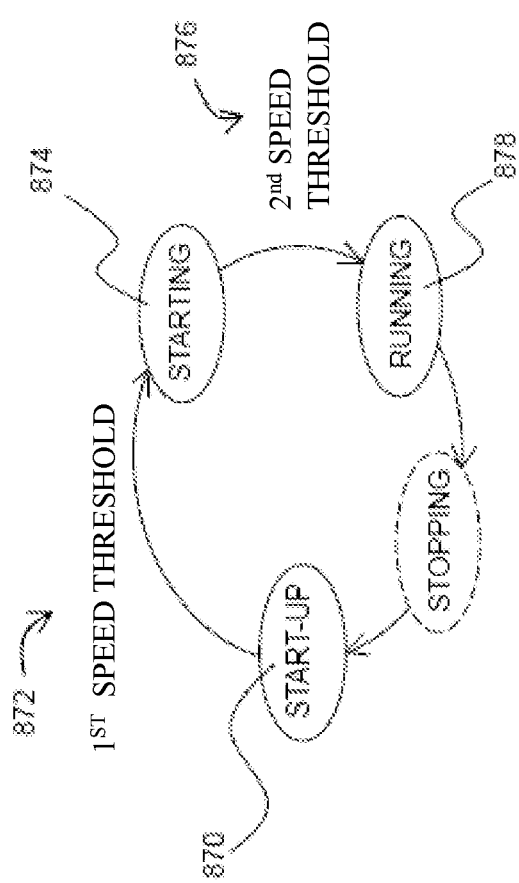
FIG. 9 is a diagrammatic representation of state and transition values of a configuration of the velocity controller state machine of the present teachings.

Referring now primarily to FIG. 9, a difficulty in controlling the velocity based on input from Stirling engine 11A (FIG. 3) is that the torque $\tau_{st}$ of Stirling engine 11A (FIG. 3) has high spatial harmonics: $\tau_{st}=\tau_0+\tau_1 f(\theta_m)$ where $\tau_0$ and $\tau_1$ are functions of the slowly changing variables of head temperature and pressure, and $f(\theta_m)$ is a periodic function of angular position with respect to amplitude. At start-up of Stirling engine 11A (FIG. 3) the start-up torque $\tau_{st}$ is negative and typically varies significantly as Stirling engine 11A (FIG. 3) turns through a complete revolution. One of the pistons of Stirling engine 11A (FIG. 3) compresses gas during part of a revolution leading to more negative torque. In a later part of the revolution, the piston allows the gas to expand producing a less negative torque or even a positive torque. This change in torque over small angles i.e. $\tau_{st} \approx -k\theta_m$ can lead to highly variable torque output. This effect can occur during the cycle of Stirling engine 11A (FIG. 3), but can be more significant during startup as the slow engine speed does not produce a flywheel effect to coast through the more negative torque periods. Once Stirling engine 11A (FIG. 3) is rotating, the inertia of Stirling engine 11A (FIG. 3) can be enough to maintain a more constant, but still somewhat variable torque. Following start-up, because the average torque of a cycle is positive and the time over which the torque harmonics act is inversely proportional to speed, the peak speed fluctuations are inversely proportional to average speed. But at start-up, a velocity controller (motor velocity control loop 768 (FIG. 6)) for PMSM 13 (FIG. 3) may exert a motor torque $\tau_m$ which could be greater than the peak negative "springy" torque generated in start-up in order to get Stirling engine 11A (FIG. 3) rotating. At start-up, it can be preferable that the motor torque $\tau_m$ increases at a steady rate until it exceeds a lower threshold $\tau_{max\_neg}$ and Stirling engine 11A (FIG. 3) accelerates. The rate of torque increase cannot occur too slowly otherwise start-up will take too long to start and the motor power board 15 (FIG. 3) can risk overheating. If the torque increase is too fast, more motor torque than necessary may be produced and motor power board 15 (FIG. 3) may not be able to tell how much torque is actually needed.

Further referring primarily to FIG. 9, motor power board 15 (FIG. 3) could counteract or dampen the "springiness" of Stirling engine 11A (FIG. 3) at low speeds, and not use excess torque in accelerating Stirling engine 11A (FIG. 3). The costs of excess torque can be excess heating and excess power draw. Also, start-up and starting torque may exceed average running torque by a factor of two or three in some engines, so it could be start-up and starting torque that can dictate the peak power handling capability of motor power board 15 (FIG. 3). A proportional-integral (PI) controller of speed can be used in some configurations. When Stirling engine 11A (FIG. 3) is rotating at sufficient speed, motor torque Tm can counteract the average torque of Stirling engine 11A (FIG. 3) and can maintain roughly constant speed. Motor power board 15 (FIG. 3) can yield generated power from PMSM 13 (FIG. 3) as a side effect of speed control. After Stirling engine 11A (FIG. 3) is running, the same PI controller gains used for start-up and starting states can be modified for use at running speeds. At running speeds, the gains can be low so that motor power board 15 (FIG. 3) does not fight the oscillating torque fluctuations of Stirling engine 11A (FIG. 3). The gains can maintain a slowly changing generating torque to counteract the average torque from Stirling engine 11A (FIG. 3), while allowing moderate speed fluctuation.

Referring still primarily to FIG. 9, in some configurations, the differences between start-up and running torque can be addressed by utilizing a velocity controller state machine with three (3) states, although other numbers of states could also be determined. Power control board 39 (FIG. 10) can initiate in start-up state 870 and, after predetermined first speed threshold 872 is exceeded, power control board 39 (FIG. 10) can enter starting state 874. When second predetermined speed threshold 876 is exceeded, power control board 39 (FIG. 10) can shift to running state 878.

Figure 10:
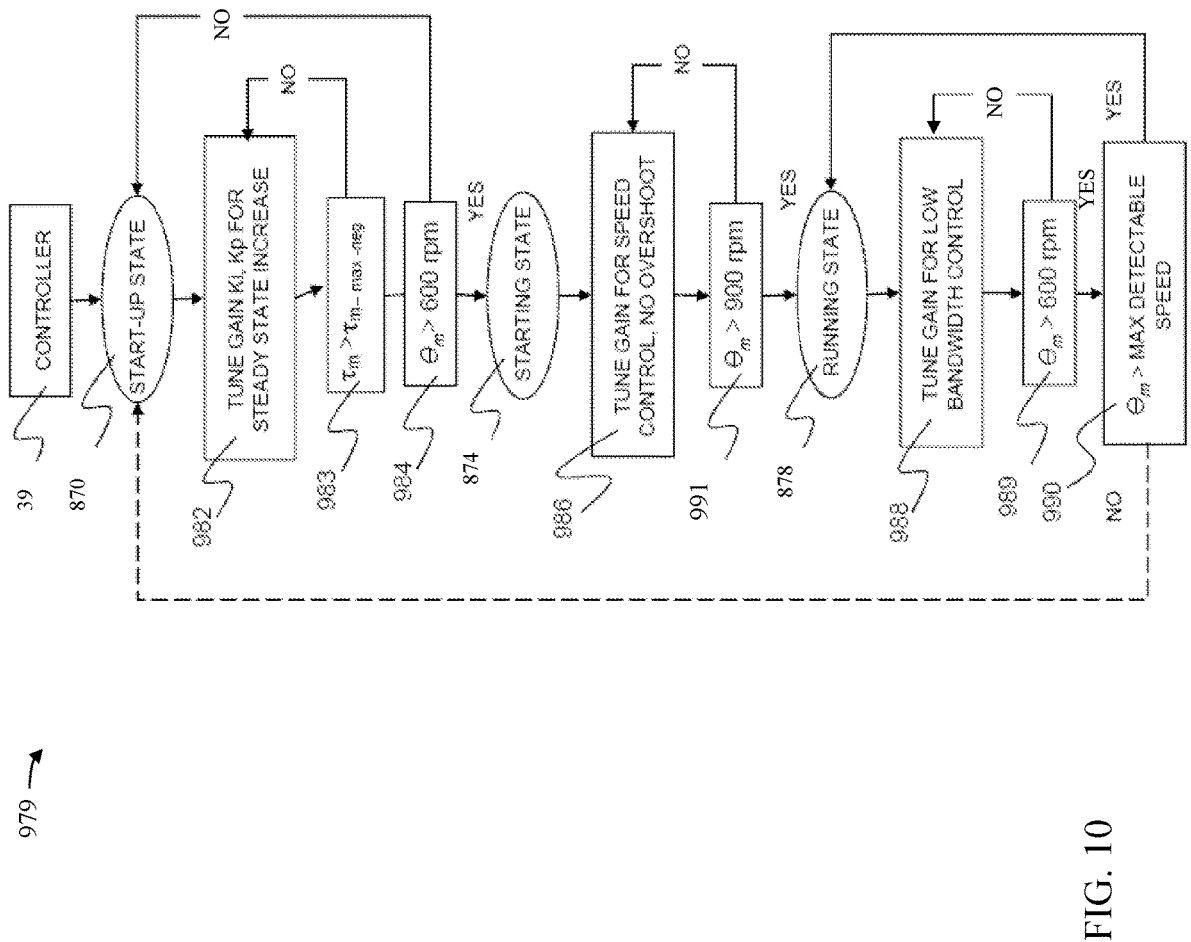
FIG. 10 is a flowchart of state and transition values of a configuration of the velocity controller state machine of the present teachings.

Referring now primarily to FIG. 10, each of the three states can have a different integral gain Ki and different proportional gain Kp. The state transition condition for each speed threshold is $|\omega_m|$<thresh_lo or $|\omega_m|$>thresh_hi where $\omega_m$ is the measured or estimated motor velocity. A maximum speed command max_cmd parameter can limit the input to the velocity control loop 768 (FIG. 6) to be within the range of +/−max_cmd. Kp and Ki can be tuned according to the desired behavior of each state. As an example of some parameter sets for entering start-up state 870, entering starting state 874, and entering running state 878, method 979 can show these three states and transition values as follows: Start-up:
  Kp, Ki tuned for optimal torque ramp rate
  Thresh_lo=0
  Thresh_hi=600 rpm
  Max_cmd=650 rpm (transition to starting state when speed >600 rpm just slightly greater than the transition threshold.) Starting:
  Kp, Ki tuned for fast speed control without overshoot
  Thresh_lo=0
  Thresh_hi=900 rpm
  Max_cmd=950 rpm (transition to starting state when speed >900 rpm just slightly greater than the transition threshold.)
Running:
  Kp, Ki tuned for low bandwidth speed control;
  Thresh_lo=600
  Thresh_hi=spd_max (max detectable speed)
  Max_cmd=spd_max (no limit)

Continuing to refer primarily to FIG. 10, method 979 for controlling the speed of motor 13 (FIG. 3) can include, but is not limited to including, entering 981 startup state 870, tuning 982 the integral gain and the proportional gain for a steady state increase. If 983 the torque is greater than the maximum negative torque, and if 984 the motor speed is greater than 600 rpm, entering 985 starting state 874. If 983 the torque is less than or equal to the maximum negative torque, returning to step 982. If 984 the motor speed is less than or equal to 600 rpm, returning to step 981. Method 979 can further include tuning 986 gain for speed control, no overshoot. If 991 the motor speed is greater than 900 rpm, entering 987 running state 878. If 991 the motor speed is less than or equal to 900 rpm, returning to step 986. Method 979 can also include tuning 988 gain for low bandwidth control. If 989 the motor speed is greater than 600 rpm, and if 990 the motor speed is greater than a maximum detectable speed, returning to running state 987. If 989 the motor speed is less than or equal to 600 rpm, returning to step 988. If 990 the motor speed is less than or equal to the maximum detectable speed, entering 981 start-up state 870.

Figure 11:
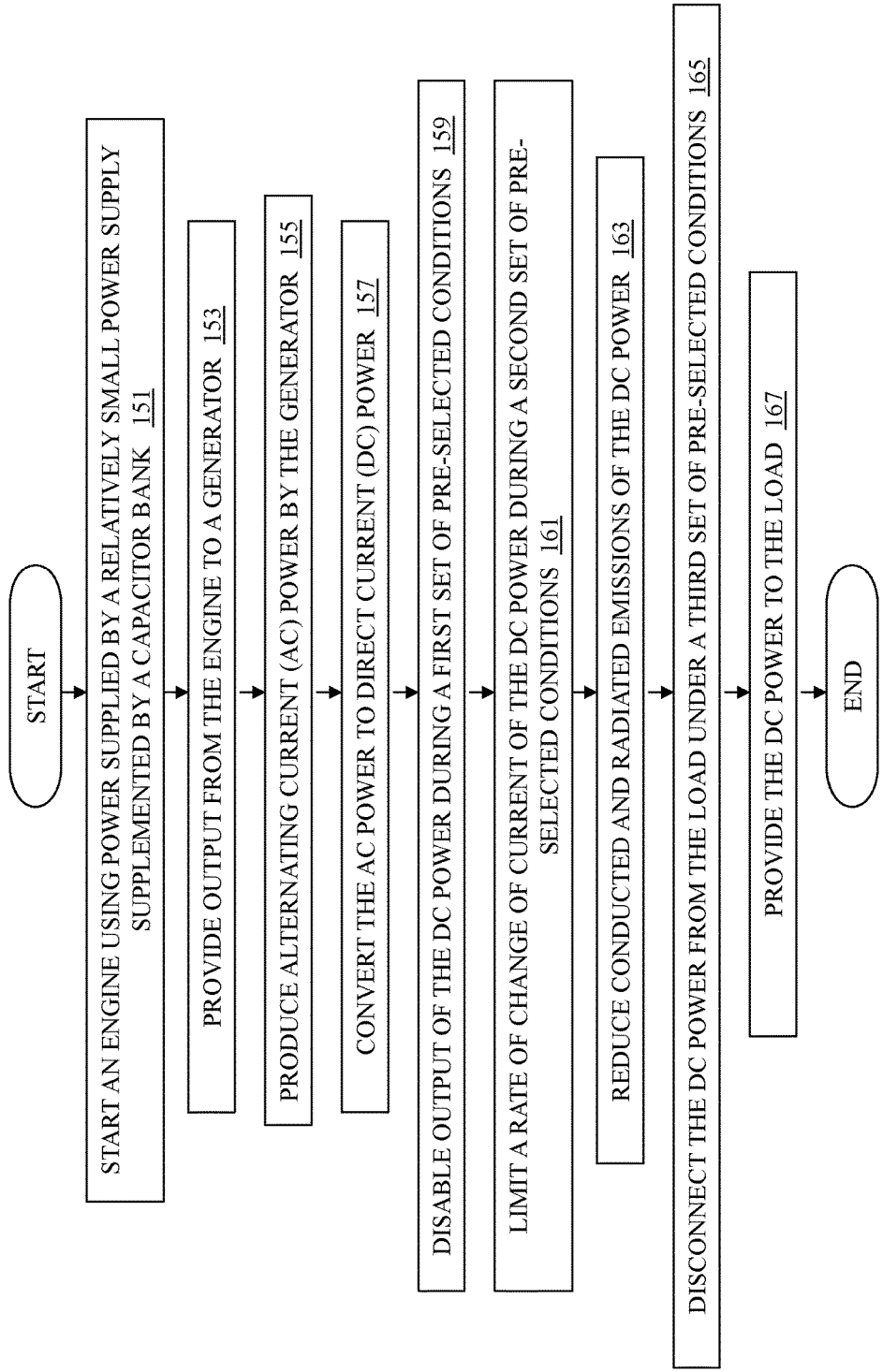
FIG. 11 is a flowchart of the method of one configuration of the present teachings.

Referring now primarily to FIG. 11, with respect to three operating states, method 150 for producing DC power for a load can include, but is not limited to including, starting 151 an engine using power supplied by a relatively small power supply supplemented by a capacitor bank, providing 153 output from the engine to a generator, producing 155 alternating current (AC) power by the generator, converting 157 the AC power to direct current (DC) power, disabling 159 output of the DC power during a first set of pre-selected conditions, limiting 161 a rate of change of current of the DC power during a second set of pre-selected conditions, reducing 163 conducted and radiated emissions of the DC power, disconnecting 165 the DC power from the load under a third set of pre-selected conditions, and providing 167 the DC power to the load.

Continuing to refer primarily to FIG. 11, method 150 can optionally include controlling velocity of the motor by a motor drive power board as commanded by a system control board via a power control board, and inhibiting current flow from the motor drive power board to the capacitor bank. Method 150 can further optionally include powering, by a second power supply at the starting up of the engine, system control electronics. Method 150 can still further optionally include shunting excess of the DC power in the form of heat produced by the Stirling engine into a shunt load and heating water with the heat. Method 150 can also optionally include controlling velocity of the motor by a motor drive power board and the generator. The first set of pre-selected conditions can optionally include, but is not limited to, overcurrent and ground fault conditions. The second set of pre-selected conditions can optionally include, but is not limited to including, abnormal conditions. The third set of pre-selected conditions can optionally include, but is not limited to including, an abnormal overcurrent condition. Disconnecting the DC power can optionally include shunt tripping a DC output breaker during an arc fault condition. Method 150 can optionally include providing the DC power to an igniter power board, a pump/fan/blower drive, an engine control I/O PCB, a system control PCB, and a power control PCB.

Figure 12:
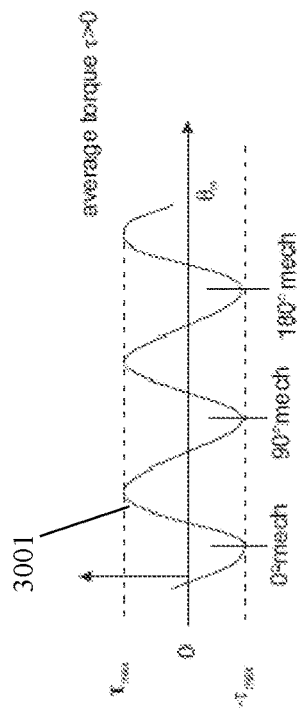
FIG. 12 is a graphical representation of the Stirling engine torque according to one configuration of the present teachings.

Referring now primarily to FIG. 12, one alternative to the above parameters is to override motor speed in all states besides the running state, instead of limiting it. Controlling the motor speed with a feedback PI loop, for example, on the motor speed depends on varying instantaneous motor speed over each revolution during starting as torque 3001 varies. Thus, in some configurations, an adaptive estimate of the amplitude and phase of speed fluctuation using low pass filtering (LPF) 3101 (FIG. 13) can remove noise and thus subtract out as much of the fluctuation as possible, so that the PI loop does not need to respond to this fluctuation.

Figure 13:
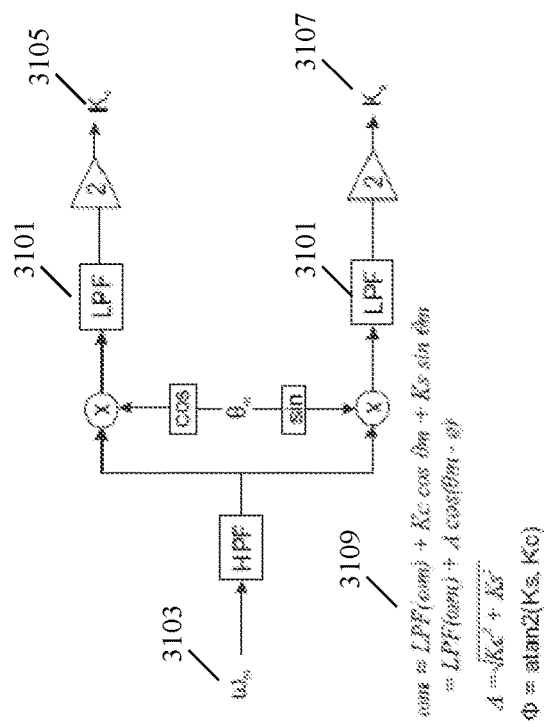
FIG. 13 is a schematic diagram of an alternative engine starting algorithm according to one configuration of the present teachings.

Referring now primarily to FIG. 13, the amplitude and phase may change very slowly, so quadrature demodulation may allow amplitude component resolution. Speed signal 3103 can be filtered to remove frequencies much higher than the speed ripple. Speed signal 3103 can be passed through a synchronous demodulated algorithm to produce Kc 3105 and Ks 3107. The time varying values of Kc 3105 and Ks 3107 are the sinusoidal components of speed ripple that are at 90° from each other. Note that the low pass filters 3101 of the demodulator algorithm and the computation 3109 of $\omega_m$ are different. The ripple-free or average speed is $\omega_m' = \omega_m - Kc^*\cos(\omega_m) - Ks^*\sin(\omega_m)$ and the control speed is based on this estimate of $\omega_m'$. In a further configuration of motor control architecture, a vector control motor which may use variable frequency drives to control the torque, and thus the speed of 3-phase electric motor/generators by controlling the current fed to the machine, can be used. Different motor types are possible such as induction motors, permanent magnet synchronous motors (PMSM), and synchronous reluctance motors (Synch Rel) for instance with PMSM motors used by way of example for some configurations. In PMSM motors, the permanent magnets on the rotor are pulled in one direction or another by the relative position of the stator and rotor fields. Because the rotor field is fixed in orientation with the rotor, torque production and control requires knowledge of rotor position.

Referring again primarily to FIG. 6, there are a number of ways to write the torque equation for PMSM motor 13, for example:

$$V_{dq} = K_e \omega_m = RI_{dq} + L_{dq}\frac{dI_{dq}}{dt} + J\omega_e L_{dq} I_{dq}$$

where V is the terminal voltage, I is the motor current, $K_e$ is the back-emf constant, $\omega_m$ is the mechanical rotational frequency of the rotor, $\omega_e = \omega_m P/2$ is electrical rotational frequency of the rotor, P is the number of poles, and L and R are the inductance and resistance. The equation is written in the rotor (dq−) reference frame with $$J = \begin{bmatrix} 0 & -1 \\ 1 & 0 \end{bmatrix}, V_{dq} = \begin{bmatrix} V_d \\ V_q \end{bmatrix}, I_{dq} = \begin{bmatrix} I_d \\ I_q \end{bmatrix}, L_{dq} = \begin{bmatrix} L_d & 0 \\ 0 & L_q \end{bmatrix}, K_e = \begin{bmatrix} 0 \\ \frac{2\lambda m}{P} \end{bmatrix}$$

where λm=rotor magnet flux, which may then be used to write out the state equation in scalar form as $$V_d = RI_d - \omega_e L_q I_q + L_d \frac{dI_d}{dt}$$

$$V_q = K_e \omega_m + RI_q + \omega_e L_d I_d + L_q \frac{dI_q}{dt}$$

The cross terms (with $\omega_e$) result from reference frame rotation (similar to Coriolis "force"); in the stator (xy−) reference frame, they are not present but the $$L_d \frac{dI_d}{dt}$$

and $K_e \omega_m$ terms are present. The cross terms can couple the two equations at nonzero speed. The torque equation is $$\tau_m = \frac{3}{2}\left(\frac{P}{2}(L_q - L_d)I_q I_d + K_e I_q\right) = \frac{3}{2}\frac{P}{2}((L_q - L_d)I_q I_d + \lambda_m I_q)$$

which includes a reluctance torque term due to rotor saliency ($L_q \neq L_d$) and an alignment torque term. In some configurations PMSM motor 13 with a torque control loop structure could utilize a sine-drive or a six-step drive. The six-step drive could be a good match for digital Hall sensors. Utilizing a sine-drive, the choice of torque loop may be decoupled from the choice of position/speed sensor.

Figure 14C:
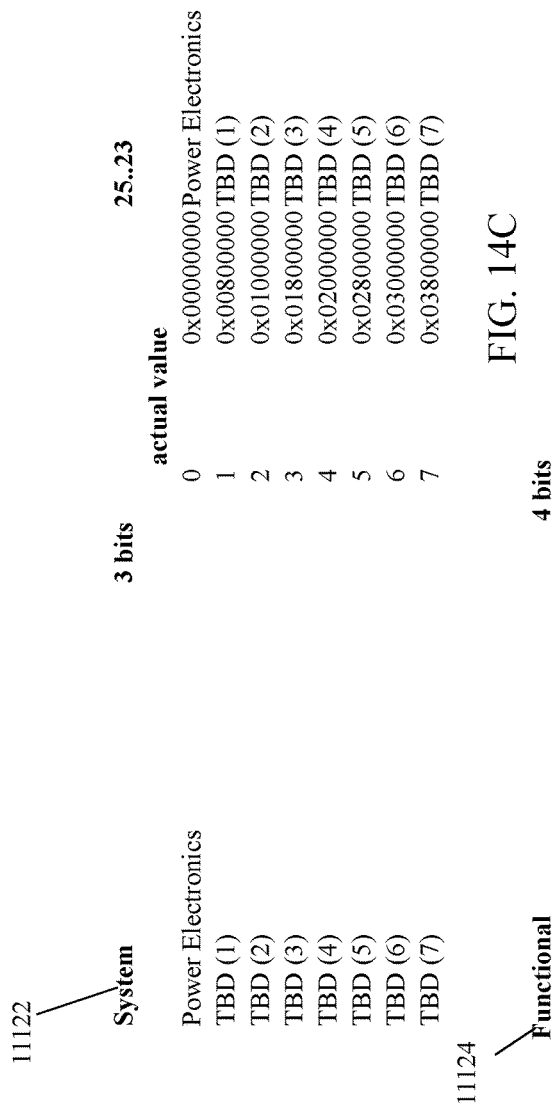
FIGS. 14A-O are tables including CAN bus message header definitions of the present teachings.

Referring now primarily to FIG. 14A, power controller 39 (FIG. 3) can communicate with motor power board 15 (FIG. 3), DC output board 19 (FIG. 3), and igniter board 31 (FIG. 3) to control motor 13 (FIG. 3) as well as Stirling engine 11A (FIG. 3). CAN bus 313 (FIG. 4J) can be used to, for example, but not limited to, enable communications among the various subsystems in power controller 39 (FIG. 3), system controller 53A (FIG. 3), and various control actuators and/or receive feedback from various sensors and ensure that the appropriate messages are timely delivered to the appropriate subsystem to be evaluated and acted on by power controller 39 (FIG. 3). Each message from an electronic control unit of power controller 39 (FIG. 3) can be transmitted onto a data bus in which message conflicts can be resolved using standard protocols. Conforming to Part B of the CAN specification 2.0, 1991, a CAN message can include, but is not limited to including, 29 bits of message identifier, four bits of a data length field, and 0-8 bytes of data, among other fields. In some configurations, data can include, but is not limited to including, critical control flags, system faults/status, power stage faults, overvoltage regulator faults/status, motor drive faults/status, buck/boost faults/status, inverter faults/status, and controller system information. In the 29-bit extended mode message identifier, bits 0-28, message priority 11120 can be defined by the highest three bits—bits 28, 27, 26—with zero being the highest priority. Priority of messages having equal message priorities 11120 can be arbitrated by the contents of other bits in the message identifier. In some configurations, the priority zero (highest) can be used only for the most critical control and alarm functions. The highest bits can be used to define priority because, similar to standard arbitration protocols, if two messages are transmitted at the same time, as soon as a recessive (1 value bit) is seen for a lower priority message transmission, the message is stopped and a higher priority message with a dominant (0 value bit) is sent unimpeded to CAN bus 313 (FIG. 3). For example, a message with the bits 28, 27 and 26 set to zero can be the highest priority message that may be sent. On the other hand if these same bits are all set to 1, this can be the lowest priority that may be set for a message, but a recessive value at any bit location could stop transmission of the message if another message being transmitted has a dominant bit value at the same location. The impeded message can then be transmitted based on its priority after the higher priority message. This can provide for a total of eight different priority combinations or definitions where each bit is either 0 or 1 in binary notation, and with three bits the total number of permutations is 2×2×2=8 combinations or definitions for message priority 11120.

Continuing to refer primarily to FIG. 14A, the standard CAN protocol does not include system configuration information, for example, information about the destination of a message. Instead, all messages are sent to all nodes. Nodes can decide whether to act upon data in the message based on the contents of the message. Thus, any number of nodes can receive the message and act upon it simultaneously. After transmission of the message priority 11120, the remainder of the bits can be utilized as the message definitions body themselves and these definitions can be divided into a series of groups, for example, but not limited to: system group 11122 defined by three bits—25, 24, 23—functional group 11124 defined by four bits—22, 21, 20 and 19—module group 11126 defined by eight bits—18-11-device group 11127 defined by three bits—11, 10, and 9—and message group 11128 defined by eleven bits—bits 10-0. Message priority 11120 and the groups do not have to contain these specific bits or this exact number of bits described here, other allocations of bits may be provided as well. However, the CAN protocol interprets any zero bit value to trump any non-zero bit value in terms of message priority 11120. Therefore, assigning bit values to members of groups can require evaluation of priority.

Continuing to still further refer primarily to FIG. 14A, system group 11122 can include, for example, bit settings to identify power controller 39 (FIG. 3), for example, the setting of bits 23-25 to zero. Other configurations for power controller 39 (FIG. 3) may be assigned using other bit value combinations. Functional group 11124 can identify subgroups power production, power transmission, power consumption, energy storage, and utility by unique bit settings. In some configurations, power production messages can be assigned the highest priority, which means setting of bits 19-22 to zero. Other subgroups may be defined as well. Module group 11126 can identify various power production, transmission, and consumption devices, for example engines such as diesel and gas generators, thermal engines such as Stirling engines, wind turbines, photovoltaic systems, fuel cells, and for energy storage with battery storage systems and battery charging systems. In some configurations, Stirling engine 11A (FIG. 3) can be assigned the highest priority. In some configurations, there may be over 2000 messages defined in message group 11128, and any given message may be identified as important to any module in Module Group 11126. These specific and unique identifiers not only readily allow orderly communication of messages across CAN bus 313 (FIG. 4J), but also tell the controllers what the message is, and may contain associated measured or sensed data which can permit the controller to determine appropriate commands for controlling the various modules or system components. Device group 11127 can identify one of eight possible devices on the bus with otherwise identical attributes of system, function, and model groups.

Referring now primarily to FIG. 14B, in some configurations, a message identification field can include priority field 11120 occupying the most significant of the 29-bit CAN message header to ensure that critical system control messages do not get superseded by less important messages. Priorities identified in some configurations can include, but are not limited to including, National Instruments rugged and reconfigurable control and monitoring system (cRIO) to power electronics messages (highest priority, i.e. priority 0), power electronics to cRIO (priority 2), cRIO to power electronics variable frequency device messages (priority 3), and power electronics variable frequency device to cRIO messages (priority 4).

Referring now primarily to FIGS. 14C-G, in some configurations, system group 11122 (FIG. 14C), functional group 11124 (FIG. 14D), module group 11126 (FIGS. 14E and 14F), and device group 11127 (FIG. 14G) can include various bit configurations.

Referring now primarily to FIGS. 14H-14O, in some configurations, message characteristics for messages transferred among elements of the system can include critical messages (FIG. 14H) priority two messages (FIGS. 14I-14L), and priority three and four messages (FIGS. 14M-14O) For example, critical control flags 1122A for a 3-phase Stirling generator have message ID 0x00005002, and message index two. Priority two power electronics messages (FIGS. 14I-14L) can include 3-phase Stirling generator motor watts and brake watts messages 1122B, message ID 265, for example. Priority three and four power electronics messages for utility function, VFD module, and VFD combustion device (FIG. 14M) can include, for example, control flags 1122C, message index 2, and speed 1122D, message index 256. Priority three and four power electronics messages for utility function, VFD module, and VFD water pump (FIG. 14N) can include, for example, control flags, message index two and speed message index 256. Priority three and four power electronics messages for utility function, VFD module, and VFD water radiator (FIG. 14O) can include, for example, control flags 1122E, message index 2 and speed 1122F message index 256.

Referring now primarily to FIG. 15A, critical control flags, message ID 0x00005002, message index 2, can occupy two 16-bit words (four bytes) with bits set by system control board 53 (FIG. 8), for example. System control board 53 (FIG. 3) can send a CAN message having specific bits set to power control board 39 (FIG. 3) which in turn could use the information in the critical control flags to control motor power board 15 (FIG. 3), igniter power board 31 (FIG. 3), and DC output board 19 (FIG. 3). For example, if power control board 39 (FIG. 3) receives a CAN message having data including message ID 0x00005002 followed by a 16-bit word with at least bit one 1122G set, power control board 39 (FIG. 3) could force itself to a faulted state. Likewise, if power control board 39 (FIG. 3) receives a message according to CAN bus protocol having data including message ID 0x00005002 followed by a 16-bit word with at least bit two 1122H set, power control board could enable engine controller 49 (FIG. 3). Message index 2 information is also shown in FIG. 14H.

Referring primarily to FIG. 15B, a first 16-bit word for system faults/status could be included in the data section of the CAN message for message ID 0x0800510C, message index 268. The word could, for example, but not limited to, communicate status of various devices, for example, but not limited to, shunt 17 (FIG. 4H). Message index 268 information is also shown in FIG. 14J.

Referring primarily to FIG. 15C, VFD message details corresponding to utility VFD, VFD radiator (FIG. 14P) message information is shown. In general, each CAN message in the VFD message group can include four words of data, the exemplary contents of which can include, in some configurations, messages relating to speed, status, current, and voltage, for example.

Figure 16:
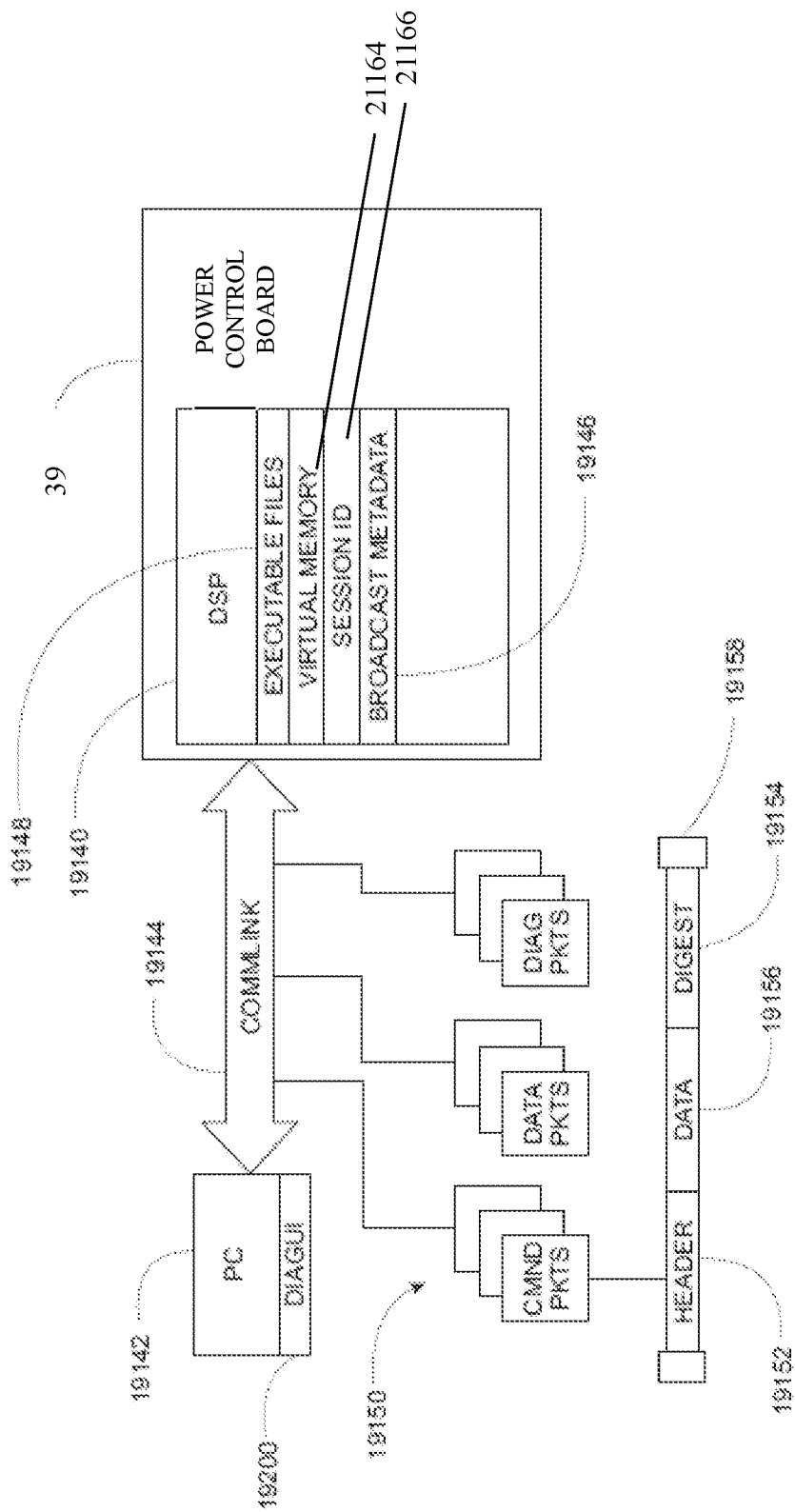
FIG. 16 is a schematic block diagram of the communications links and transmissions of an embedded power electronics system according to one configuration of the present teachings.

Referring now primarily to FIG. 16, measured or sensed data and other arbitrary information from embedded power control board 39 can be collected in real-time to, for example, but not limited to, diagnose errors and/or debug issues. Digital signal processor (DSP) 19140 for example can operably communicate with at least one device such as computer or PC 19142 via communications link 19144. Communications link 19144 can be, but is not limited to being, a serial port or UART, Ethernet, Bluetooth wireless, or can accommodate other communication protocols. A relevant characteristic of communications link 19144 is that there can be a stream of information flowing in each direction. A protocol can define several different types of packets of information for each direction of the protocol. DSP 19140 can transmit packets to the PC 19142, some of which may include broadcast of arbitrary data. PC 19142 can transmit packets to the DSP 19140, some of which are commands to read or write data in DSP 19140, including data that can determine which data DSP 19140 should be broadcasting to PC 19142. This can allow for changes at any time as to which data PC 19142 receives. In addition there can be other packets that can allow DSP 19140 and PC 19142 to determine whether communication link 19144 between the two is maintained. If communication link 19144 is interrupted and resumed, a status check of communication link 19144 between each of the devices and links with other devices within the system can be performed with diagnostic checks that can determine if there are any changes in performance of any of the devices. Further executable programs such as DiagUI 19200 may be installed on PC 19142 and may use communications link 19144 to transmit and receive data as discussed herein.

Referring again primarily to FIG. 16, the information available to both DSP 19140 and PC 19142 can include how to communicate via a protocol, as well as how to build metadata including the following data: (1) date and time the DSP program was compiled, (2) a unique 128-bit ID generated per the standard Universally Unique Identifier (UUID) mechanism, (3) a program identifier (a human-readable string to distinguish varying types of DSP programs), (4) a version number that can corresponds to the version of the source code stored in a source control repository such as SURROUND SCM®, CLEARCASE®, and/or SUBVERSION®. Metadata can be stored within executable file 19148 that can be generated at compile time. DSP 19140 can be programmed using executable file 19148. PC 19142 can have access to executable file 19148, as well as access to build metadata. Executable file 19148 can also have a DSP symbol table so that given the name of a variable on DSP 19140 that has a fixed memory location, PC 19142 can determine what type of variable it is (e.g. 16-bit unsigned integer, 32-bit pointer, structure, union, etc.), and where it is located in the DSP's memory.

Continuing to refer primarily to FIG. 16, DSP 19140 may use, for example, but not limited to, a 2.34375 Mbaud serial port with the standard UART configuration of one start bit, eight data bits, and one stop bit per byte, or 234,375 bytes per second maximum throughput in each direction. If a diagnostic kernel routine on the DSP executes at a 10 kHz rate, then the diagnostic kernel may send and receive at most 23.4 bytes on average; data that exceeds that length can be enqueued or dequeued in a buffer. Each packet 19150 can include header 19152, message digest 19154, data (varies depending on the type of packet) 19156, and delimiting mechanism 19158. Delimiting mechanism 19158 can provide a determination of when one packet ends and the next packet begins. Consistent overhead byte stuffing (COBS) can provide a fixed overhead of two bytes for packets of less than 255 data bytes (one extra byte per packet for encoding, and one extra byte for delimiting), thereby efficiently encoding and decoding each packet. Message digest 19154 can provide a means for detecting transmission errors by adding, at the end of packet 19150, extra bytes that are a function of the previous bytes in the packet, so that a receiver of the packet may compute the same message digest 19154, and if it matches the one transmitted, there is high probability that the packet 19150 has arrived without errors. A 16-bit cyclic redundancy check (CRC) can be used in some configurations as a message digest, adding two bytes overhead.

Continuing to still further refer primarily to FIG. 16, before transmission, packet 19150 can be formed as a raw data packet, which can have the 2-byte CRC appended to it, and can be encoded using COBS, for example. The header can include, but is not limited to including, at least one byte at the beginning of the raw data packet that can determine which type of packet it is. Each header 19152 can include, but is not limited to including, a tag that is a prefix code, i.e. within the set of possible header tags, in some configurations, no tag is the prefix of any other tag (e.g. the header tags 0xff, 0xfe00, and 0xfe01 can be a valid set, but the header tags 0xff, 0xff00 can be an invalid set because 0xff is a prefix of 0xff00). Using this method, 256 valid one byte header tags may be developed and more if more than one byte for some of the header tags is used. In some configurations, the overhead for packet encoding can be at least one byte for the header tag, two bytes for the CRC, and two bytes for COBS, or five bytes per packet.

Continuing to refer primarily to FIG. 16, there can be a number of different packet types that can be used for communication protocols. In some configurations, a ping packet can be sent from DSP 19140 to PC 19142 on a periodic basis, or in response to a ping request packet. The ping packet can contain a counter incremented each time a ping packet is sent (this allows the PC to detect missing packets), a 16-bit timestamp, and critical message counters (described herein). A ping request packet can be sent from PC 19142 to DSP 19140 on an arbitrary basis. For "keepalive" purposes, a predetermined timeout of approximately 100 msec can be used both for ping packets and ping request packets. Both PC 19142 and DSP 19140 can transmit the corresponding packet during each timeout interval, and if a timeout interval elapses without receiving the corresponding packet, something could be wrong and the communications connection could be considered to be interrupted. A memory read request can be sent from PC 19142 to DSP 19140 on an arbitrary basis. The memory read request can include an 8-bit read request ID, eight bits of flags, an 8-bit byte count, and a 32-bit starting address. The flags can include one bit determining whether the address points to absolute memory or "virtual memory" (described herein). Upon receiving the memory read request, DSP 19140 can read the requested memory and respond with a memory read response. A memory read response can be sent from DSP 19140 to PC 19142 in response to a memory read request. The memory read response can contain the 8-bit read request ID, and data corresponding to the memory read request. The request ID can enable the PC 19142 to request several different pieces of data and later match the responses with the requests. If a read response is not received, PC 19142 may re-issue the read request. A memory write request can be sent from PC 19142 to DSP 19140 on an arbitrary basis. The memory write request can contain an 8-bit critical message count, eight bits of flags, a 32-bit starting address, and data. The flags can include one bit indicating whether the address points to absolute memory or virtual memory. Upon receiving the memory write request, DSP 19140 can write the requested memory. A critical message count can be maintained by DSP 19140 and reported in a ping packet. For packet types that are considered critical messages (including memory write requests), DSP 19140 can ignore any message where the received critical message count does not match its internal counter. If the critical message counts match, DSP 19140 can increment the critical message count and act upon the received message. DSP 19140 and PC 19142 can stay in sync with respect to critical messages based on the protocol described herein. If messages are improperly received, they can be ignored, and PC 19142 may detect the improper reception and re-send messages. If the same message is received twice, the duplicate message can elicit a single reaction. A broadcast packet can be sent from DSP 19140 to PC 19142. The broadcast packet can include a packet ID header tag, an 8-bit counter field, and data. Header tags 0x00-0x7f for broadcast packets can be reserved, leaving tags 0x80-0xff for the packet types described above as well as application-specific packets. A broadcast packet can be sent once each time a diagnostic kernel of DSP 19140 executes, and when DSP 19140 has detected valid communications from PC 19142 (e.g. it has received a ping request packet within its timeout). Header tag 19152 can allow twenty-eight different sets of data to be sent.

Continuing to still further refer primarily to FIG. 16, each data set may have arbitrary data, to the extent that it may fit within the available bandwidth. In some configurations, twenty-three bytes can be available with four bytes overhead for COBS and the CRC—one byte for the packet header tag and one byte for the counter field—leaving seventeen bytes for data. In some configurations, fourteen bytes (seven 16-bit words) can be used. An 8-bit counter field can include a 3-bit change counter and a 5-bit tick count. The change counter can be incremented once each time DSP 19140 executes a memory write request that could affect the contents of the broadcast packet, so that, for example, if PC 19142 sends a request to DSP 19140 to write memory, the contents of the broadcast packet could be changed, and PC 19142 may determine exactly when DSP 19140 is sending new data. The 5-bit tick count can provide a fine-grained timestamp for the data that was sent. The 5-bit tick count can allow for up to thirty-one broadcast packets to be lost while still maintaining a valid timestamp. Ping packet can include the same timestamp but can use a full sixteen bits. The combination of these two timestamps can allow PC 19142 to track timestamps even in the presence of missing packets, and can allow PC 19142 to extrapolate received data—data measured or sensed voltage—without DSP 19140 having to allocate large amounts of bandwidth. PC 19142 can include a copy of executable file 19148 containing a symbol file which can provide for PC 19142 to access the memory of DSP 19140.

Figure 17:
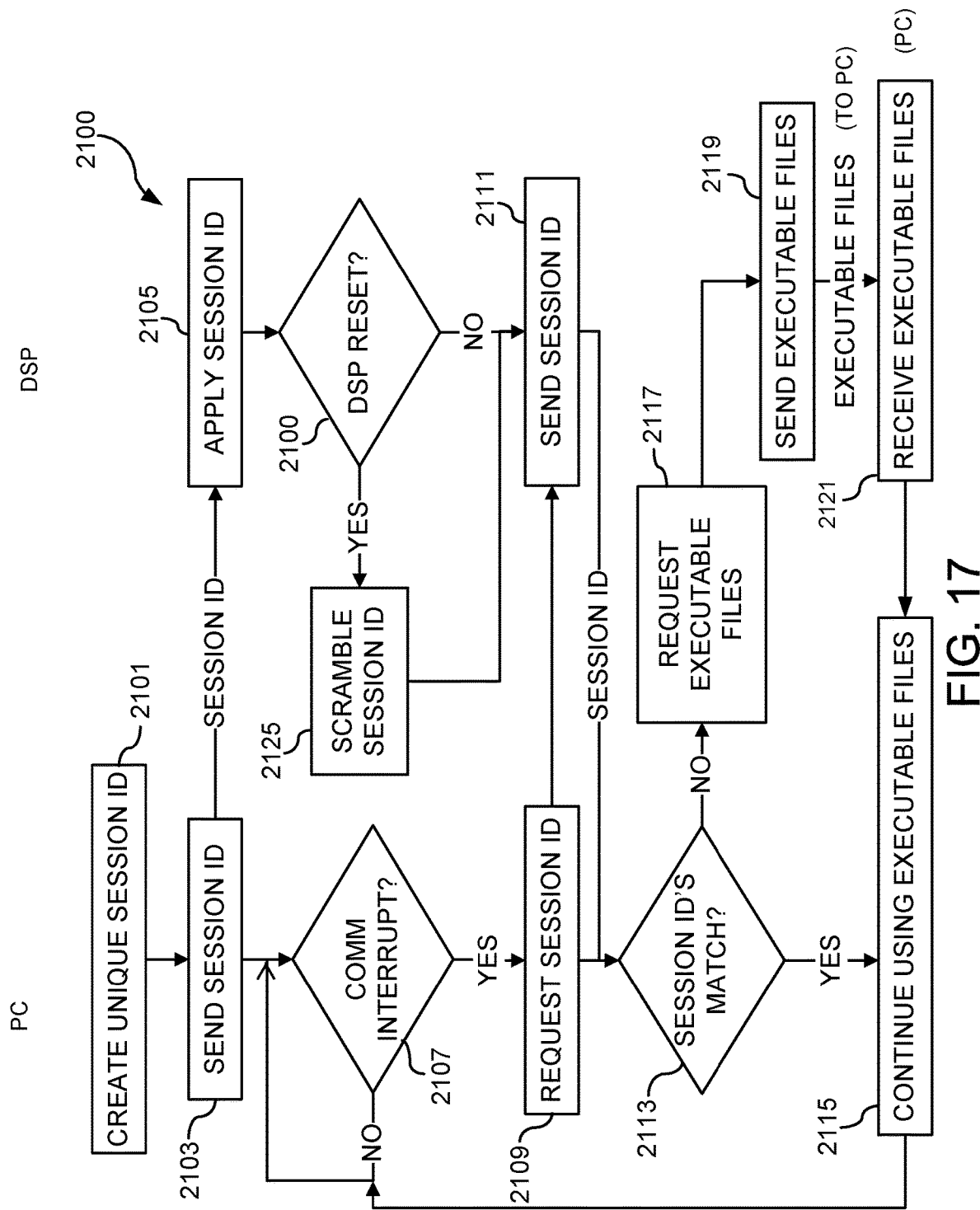
FIG. 17 is a flow chart of a configuration of the use of a Session ID to confirm an interruption in the communications and transmissions of an embedded power electronics system of the present teachings.

Referring now primarily to FIG. 17, certain items of data can be accessed in an area of virtual memory 21164 (FIG. 16) where DSP 19140 (FIG. 16) can translate a memory request from PC 19142 (FIG. 16) to a memory address understood by DSP 19140. These items of data can include, but are not limited to including, build metadata providing information about executable file 19148 (FIG. 16). If the build metadata in executable file 19148 (FIG. 16) does not match the build metadata received from DSP 19140 (FIG. 16), then the absolute addresses found in the symbol table of executable file 19148 (FIG. 16) may not be used reliably. Data items can also include session ID 21166, an arbitrary number created by PC 19142 (FIG. 16) at each communication with DSP 19140 (FIG. 16). To protect access to virtual memory 21164 (FIG. 16), method 2100 can include, but is not limited to including, creating 2101, by PC 19142 (FIG. 16), an initial unique session ID, and sending 2103 the session ID to DSP 19140 (FIG. 16). DSP 19140 (FIG. 16) can receive and apply 2105 session ID. If 2123 DSP 19140 (FIG. 16) has been reset, DSP 19140 (FIG. 16) can scramble 2111 session ID 21166. If 2107 PC 19142 (FIG. 16) experiences a communications interruption (detected by, for example, ping packet timeouts), PC 19142 (FIG. 16) can request 2109 session ID from DSP 19140 (FIG. 16), and if 2113 session ID 21166 (FIG. 16) has changed from a previous reading, then either DSP 19140 (FIG. 16) has been reset, or PC 19142 (FIG. 16) has been connected to a different DSP 19140 (FIG. 16). PC 19142 (FIG. 16) can then request 2117 executable files 19148 (FIG. 16) from DSP 19140 (FIG. 16), DSP 19140 (FIG. 16) can send 2119 executable files 19148 (FIG. 16), and PC 19142 (FIG. 16) can receive 2121 executable files 19148 (FIG. 16). If 2113 session ID 21166 (FIG. 16) has not changed, PC 19142 (FIG. 16) may assume that a temporary communications interruption has occurred between DSP 19140 (FIG. 16) and PC 19142 (FIG. 16) and can continue 2115 using executable files 19148 (FIG. 16).

Figure 18:
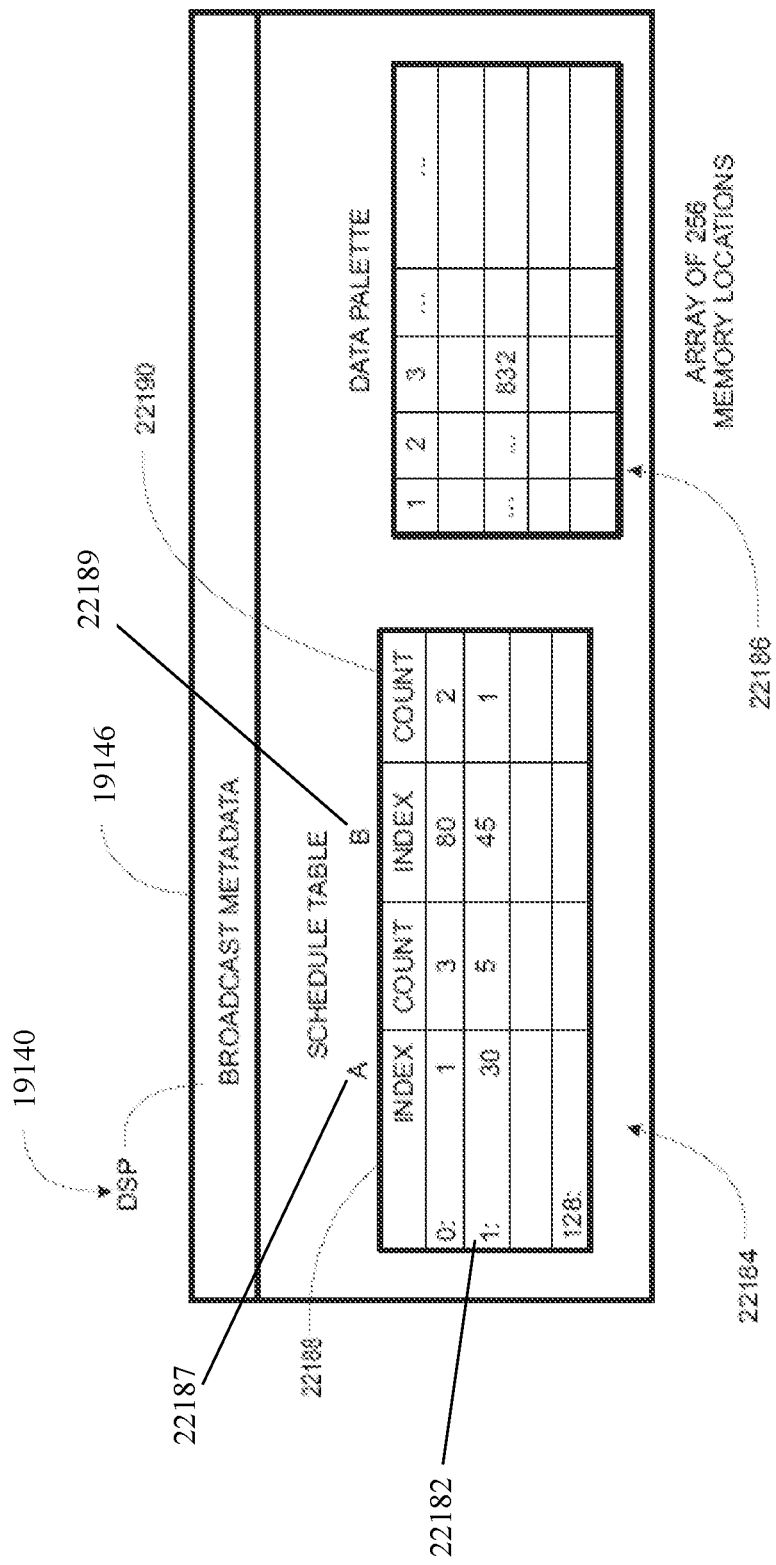
FIG. 18 is a schedule table and data palette of the communications links and transmissions of an embedded power electronics system according to one configuration of the present teachings.

Referring now primarily to FIG. 18, data can also include broadcast metadata 19146 (FIG. 16) which can include CPU metadata, including flags that identify (1) whether the CPU uses 8-bit or 16-bit memory words, (2) whether the CPU uses 16-bit or 32-bit pointers for memory addressing, (3) whether multiple-word quantities are most-significant-word first or least-significant-word first, and (4) whether memory address alignment is 1-byte-aligned, 2-byte-aligned, 4-byte-aligned, or 8-byte-aligned. DSP 19140 can use a particular block of virtual addresses to determine which data are sent over broadcast packets, including, in some configurations, schedule table 22184, data palette 22186, and a few counters. Broadcast packet IDs 22182 can correspond to rows of schedule table 22184. Schedule table 22184 can provide to DSP 19140 the information to send for each broadcast packet ID 22182. Each row of schedule table 22184 can include, but is not limited to including, two pairs of data, A data 22187 and B data 22189, with each pair consisting of index 22188 and count 22190 referring to an entry in broadcast data palette 22186. Data palette 22186 can include addresses of, for example, 16-bit data words that are written by PC 19142 (FIG. 16). Schedule table index 22188 and count 22190 can be used as a starting offset and a starting count respectively within data palette 22186. For example, if row 0 of A data 22187 contains index 1, count 3, and row 0 of B data 22189 contains index 80, count 2, then broadcast packet id 0 can send the contents of data palette addresses #1, #2, #3, #80, and #81. If schedule table row 1 contains A data 22187 index 30, count 5, and B data 22189 index 45, count 1, then the broadcast packet id 1 can send the contents of data palette addresses #30, #31, #32, #33, #34, and #45. A data 22187 can, for example, but not limited to, be several words of data that can be broadcast at, in some configurations, every 10 kHz cycle, or every other 10 kHz cycle, whereas B data 22189 can, for example, but not limited to, be one or two words of data of a long list of data, thereby creating a "fast" set of a few data words, and a "slow" set of many data words, making for a flexible system for data transfer.

Continuing to refer primarily to FIG. 18, if PC 19142 (FIG. 16) can set the contents of data palette 22186 and schedule table 22184, then PC 19142 (FIG. 16) can interpret the contents of each broadcast packet and can associate the contents with the appropriate memory locations in DSP 19140 (FIG. 16) that PC 19142 (FIG. 16) selects. In some configurations, DSP 19140 (FIG. 16) can cycle through rows 0 to SCHEDPERIOD-1 of schedule table index 22188, where SCHEDPERIOD can include a counter located, for example, in the virtual address space and may be set by PC 19142 (FIG. 16). It is possible for DSP 19140 (FIG. 16) to use any arbitrary ordering of rows (e.g. 0, 1, 0, 2, 0, 3, 0, 4, 0, 1, 0, 2, 0, 3, 0, 4, etc) of schedule table index 22188. If row # of schedule table index 22188 can be transmitted as packet ID 22182 of broadcast data packets, PC 19142 (FIG. 16) may not need to know about this ordering to be able to interpret the ordering correctly. In some configurations, a mechanism can be provided that can set up a desired ordering.

Referring again primarily to FIG. 16, debugging/diagnostic system and user interface (DiagUI) 19200 can indicate and relay engine operational data from engine 11 (FIG. 4G) to technicians, operators and engineers. Operational data for engine 11 (FIG. 4G) may be collected from a plurality of engine sensors and from DSP 19140 and engine control I/O PCB 49 (FIG. 3). The operational data may be optionally stored in a memory storage device, or relayed directly through DiagUI 19200 to the operator. DiagUI 19200 can enable an operator to read and write data to DSP 19140 of engine 11 (FIG. 4G), and can monitor engine 11 (FIG. 4G) and DSP 19140, and attend to data logging of predetermined operational data to evaluate and analyze operational conditions of engine 11 (FIG. 4G). DiagUI 19200 can use for example, but not limited to, a high bandwidth data communication channel in real time, and/or DiagUI 19200 can buffer data within a given time frame, and/or can take a snapshot of sensor data at some point in time of the operating data from engine 11 (FIG. 4G) and present the data in a coherent form for analysis. DiagUI 19200 can read/write data to and from desired variables of engine control I/O PCB 49 (FIG. 3). The read/write function can be an on-demand task for DiagUI 19200 and can be a one-time task, meaning although repetitive from the operator's perspective, the read/write function to any particular variable can be begun and completed in a short one-time task. DiagUI 19200 can monitor the proceeding engine operations by displaying desired variable values on the screen, for example, through immediate evaluation of engine operation, and through recording of data for later analysis. Reading and writing of variables for example can include determining and selecting a desired variable to write to, for example, a control parameter for engine 11 (FIG. 4G) that the operator desires to modify such as a voltage gain threshold limit. Monitoring of a desired variable can include for example, but not limited to, displaying a real time motor current in a table of DiagUI 19200 and then logging that value to a data file for subsequent analysis. In some configurations, any variable from executable file 19148 can be monitored and logged. The system can translate, for example, a variable name to an address by reading executable file 19148.

Referring now primarily to FIG. 19A, to associate specific unit definitions with program variables of DSP 19140 (FIG. 16), typedef declarations can be used, for example, but not limited to, to identify a variable by the unit of measure that it represents. Each variable in DSP 19140 (FIG. 16) can be associated with a variable type, e.g. uint32_t, an unsigned 32-bit, int16_t, signed 16-bit, and uint8_t, unsigned 8-bit. The typedef declaration can be a synonym used in place of a data type to associate that variable with specific data, such as a voltage, current, temperature, etc. Typedef int int16_t can create type int16_t 32100 as an equivalent to type int 32103. Typedef int16_t foo and typedef int16_t bar can create types foo 32105 and bar 32107 respectively as equivalent to type int16_t 32101 and type unsigned long 32117. Typedef unsigned long uint32_t and typedef unsigned long baz can create types uint32_t 32115 and baz 32111 respectively as equivalents to type unsigned long 32117. Typedef unit32_t blam can create type blam 32113 as equivalent to type unit32_t 32115 and type unsigned long 32117. Typedef bar quux can create type quux 32109 as equivalent to type bar 32107, and equivalent to type int16_t 32101, which is equivalent to type int 32103. Any variable or set of variables may be defined; for example a set of current and voltage readings may be defined as current1_S16, voltage1_S16, temp1_S16, current2_U32, voltage2_U32, etc. with each of these unit types resolved, in some configurations, to, for example, but not limited to, a C/C++ native data type. Variable names may be created with specific metadata such as an identifier, for example a suffix that can include the unit type. The identifiers may be grouped as members into a data structure providing for the group of identifiers to be called under one name, the name being a new valid type name the same as the fundamental types such as int or long. The structure name may be used in a particular namespace context allowing for variables having the special group identifier to be recognized.

Referring now primarily to FIG. 19B, in some configurations, a typedef declaration can be made for each identifier and these identifiers can be grouped under a data structure with a special pre-arranged name such as Unit_Base_ Marker. A typedef declaration can also be made for each variable to point to each of the appropriate identifiers. Each variable string can include the unit base marker suffix and may be recognized from other similarly named variables that are not within the same context as those variables of the Unit_Base_Marker type. For example:

```
typedef uint16_t U16;
typedef int16_t S16;
typedef uint32_t U32;
typedef int32_t S32;
struct _Unit_Base_Marker_ {
    U16 x000;
    S16 x001;
    U32 x002;
    S32 x003; . . . }
```

These definitions can provide for a variable string having raw value data to be automatically associated with a unit definition and thereby convert the raw data value to an engineering value using a conversion factor. In some configurations, DiagUI 19200 (FIG. 16) can provide a set of global variables that can each include a unit name, a static address, and unit type. Using the specific address information, DiagUI 19200 (FIG. 16) can extract data from DSP 19140 (FIG. 16), can associate these data with the specific global variable having that address information, and can create a variable string that can include the unit name, identifier unit type, and the DSP data. For example, a variable string can include Voltage1_S16 Vbat. Using typedef and the stored metadata defining the string, DiagUI 19200 (FIG. 16) can enable DSP data to be associated with unit definitions. DiagUI 19200 (FIG. 16) can read the DSP output data file with symbol string information to detect a program variable's type. DiagUI 19200 (FIG. 16) can compare the typedef chain to the data structure type for the special Unit_Base_Marker_and, if the typedef chain is defined within the context of that data structure type, DiagUI 19200 (FIG. 16) may associate a unit definition with the variable. If the variable type is descended from one of a unit base type, DiagUI 19200 (FIG. 16) can analyze the name to determine if the name ends in one of the members of the data structure, in this example one of the suffixes_S16, _U16, _ S32, _U32. If the variable name contains one of the suffixes, DiagUI 19200 (FIG. 16) can resolve the variable data to remove the identifying suffix from the unit name to determine the global variable. For example, the variable "Voltage1_S16 Vbat" can have an inferred unit name "Voltage1". DiagUI 19200 (FIG. 16) can search the unit name for the encoded unit definition string, for example "732.0Q15V". DiagUI 19200 (FIG. 16) can interpret the unit definition as $2^{15}$ counts=732.0V and this data can be associated with a program variable, Vbat, thereby converting the raw value DSP data to an engineering value.

Continuing to refer primarily to FIG. 19B, in some configurations, DiagUI 19200 (FIG. 16) may change the unit definition for any variable in the system any time DiagUI 19200 (FIG. 16) is turned on including, but not limited to, while the system is running. In some configurations, DiagUI 19200 (FIG. 16) may update the unit definitions for variables when it is turned on or when it is reinitialized. In some configurations, DiagUI 19200 (FIG. 16) may be programmed to update the unit definitions for variables at any time including, but not limited to, when a user requests DiagUI 19200 (FIG. 16) to update the unit definitions for variables, at specific time intervals, and whenever a unit definition for a variable has been updated using DiagUI 19200 (FIG. 16). In some configurations, when a unit definition of a variable has been changed using DiagUI 19200 (FIG. 16), DSP 19140 (FIG. 16) can update the unit definition of that variable and any unit definitions of variables dependent on the unit definition of that variable. For example, the unit definition of power may depend on the unit definitions of voltage and current. Therefore if the unit definitions of voltage and/or current are changed, DSP 19140 (FIG. 16) can update the unit definitions of voltage and/or current, and also the unit definition of power. In some configurations, various temperatures in the system may be measured including, but not limited to, battery temperature, motor temperature, ambient air temperature in various places relative to system 100 (FIG. 4G), and the heat sink temperature. In some configurations, if a battery is included, the battery temperature may alter the behavior of a battery charging algorithm. In some configurations, the motor and/or heat sink temperature measurements may be used to measure how much power is flowing in the system. In some configurations, the motor and/or heat sink and/or ambient air temperature measurements may be used as a basis for throttling down the engine or lowering the current limits in the system to reduce heat to safe levels. In some configurations, the motor and/or heat sink and/or ambient air temperature measurements may be used as a basis for running the system at less than the optimal power point to allow the system to cool. In some configurations, the motor and/or heat sink and/or ambient air temperature measurements may be used to measure the efficiency of the cooling system.

Configurations of the present teachings can be directed to computer systems for accomplishing the methods discussed in the description herein, and to computer readable media containing programs for accomplishing these methods. The raw data and results can be stored for future retrieval and processing, printed, displayed, transferred to another computer, and/or transferred elsewhere. Communications links can be wired or wireless, for example, using cellular communication systems, military communications systems, and satellite communications systems. Parts of system 100 (FIG. 4G), for example, can operate on a computer having a variable number of CPUs. Other alternative computer platforms can be used.

Some configurations can be directed to software for accomplishing the methods discussed herein, and computer readable media storing software for accomplishing these methods. The various modules described herein can be executed on the same CPU, or can be executed on different CPUs. In compliance with the statute, some configurations have been described herein in language more or less specific as to structural and methodical features. It is to be understood, however, that some configurations are not limited to the specific features shown and described, since the means herein disclosed comprise various forms of putting some configurations into effect.

Methods 9150 (FIG. 7), 10150 (FIG. 8), 979 (FIG. 10), 150 (FIG. 11), and 2100 (FIG. 17) can be, in whole or in part, implemented electronically. Signals representing actions taken by elements of system 100 (FIG. 4G) and other disclosed configurations can travel over at least one live communications network 20 (FIG. 4G). Control and data information can be electronically executed and stored on at least one computer-readable medium. The system can be implemented to execute on at least one computer node in at least one live communications network. Common forms of at least one computer-readable medium can include, for example, but not be limited to, a floppy disk, a flexible disk, a hard disk, magnetic tape, or any other magnetic medium, a compact disk read only memory or any other optical medium, punched cards, paper tape, or any other physical medium with patterns of holes, a random access memory, a programmable read only memory, and erasable programmable read only memory (EPROM), a Flash EPROM, or any other memory chip or cartridge, or any other medium from which a computer can read.

While the present teachings have been described above in terms of specific configurations, it is to be understood that they are not limited to these disclosed configurations. Many modifications and other configurations will come to mind to those skilled in the art to which this pertains, and which are intended to be and are covered by both this disclosure and the appended claims. It is intended that the scope of the present teachings should be determined by proper interpretation and construction of the appended claims and their legal equivalents, as understood by those of skill in the art relying upon the disclosure in this specification and the attached drawings.

What is claimed is:

1. A method for starting an engine comprising:
receiving first power from a first AC power supply;
receiving second power from a second AC power supply;
starting the engine by using the first power and a capacitor bank;
starting system control electronics by using the second power;
controlling, by the system control electronics, a power control board; and
controlling, by the power control board, the engine;
providing output from the engine to a permanent magnet synchronous motor generator (PMSMG) operably coupled to the engine;
producing AC power from the output of the PMSMG generator;
coupling a motor drive power board with the PMSMG generator, the motor drive power board converting the AC power to DC power, the PMSMG and the motor drive power board controlling a velocity of the engine;
coupling an arc fault detector to a DC output breaker;
shunt tripping, by the ARC fault detector, the DC output breaker during an arc fault condition; and
providing, by the DC output breaker, the DC power to an electric grid when at least one of a set of pre-selected conditions is false.

2. The method as in claim 1 further comprising:
disabling output of the DC power during a first set of pre-selected conditions.

3. The method as in claim 2 wherein the first set of the pre-selected conditions comprises overcurrent and ground fault conditions.

4. The method as in claim 1 further comprising:
limiting a rate of change of current of the DC power during a second set of pre-selected conditions.

5. The method as in claim 4 wherein the second set of the pre-selected conditions comprises abnormal conditions.

6. The method as in claim 1 further comprising:
reducing conducted and radiated emissions of the DC power.

7. The method as in claim 1 further comprising:
disconnecting the DC power from a load under a third set of pre-selected conditions.

8. The method as in claim 7 wherein the third set of the pre-selected conditions comprises an abnormal overcurrent condition.

9. The method as in claim 1 further comprising:
shunting excess heat of the DC power produced by the engine into a shunt load.

10. The method as in claim 9 further comprising:
heating water with the heat.

11. The method as in claim 1 further comprising:
providing the DC power to an igniter power board, a pump/fan/blower drive, an engine control I/O PCB, a system control PCB, and a power control PCB.

12. The method as in claim 1 further comprising:
receiving an angle from a sawtooth waveform generator;
representing the angle by a 16-bit value, the angle having a sine and a cosine;
applying an average increment to the angle, as an angle sweeps from 0-360°, every 100μsecs, the average increment having a 32-bit center frequency input and a 16-bit delta frequency input driven by a PI controller, the center frequency input representing a fractional value of the angle, the delta frequency oscillating about zero;
producing a sine/cosine pair for the angle;
creating an inverter output waveform based on the sine/cosine pair;
computing a phase error signal based on the sine of the angle and a voltage of a grid supply, the voltage of a grid supply being equal to the cosine of the voltage of the grid supply;
multiplying the sine by the voltage of the grid supply to produce a signal that contains both AC and DC components, the AC component having an amplitude variation based on amplitudes of the grid supply and the inverter output waveform and having a frequency equal to 2x the frequency of the grid supply when loop is locked, the DC component having an amplitude variation based on a phase error between the grid supply and the inverter output waveform;
low pass filtering the phase error; and
eliminating a part of the AC component not relevant to control by supplying the filtered phase error to the PI controller.

13. The method as in claim 1 further comprising:
providing output from the engine to a generator;
producing alternating current (AC) power by the generator;
converting the AC power to direct current (DC) power; and
providing the DC power to an electric grid.

14. The method as in claim 13 further comprising:
measuring voltage and frequency of the electric grid; and
recording the voltage and the frequency in a continuously running log file.

15. The method as in claim 14 further comprising:
reporting, via CANbus, the voltage and the frequency to a system controller.

16. The method as in claim 13 wherein providing the DC power to the electric grid comprises:
measuring a voltage and a frequency by a first digital phase locked loop when the voltage and the frequency are within a pre-selected range of tolerance;
continuously measuring phase error by a second digital phase locked loop;

referencing the measured voltage to the second digital phase locked loop; and declaring phase lock when the phase error is less than a pre-selected value and when the measured voltage is within a pre-selected range of voltage.

17. The method as in claim 1 wherein the engine comprises a Stirling engine.

18. A method for starting an engine comprising:
receiving first power from a first AC power supply;
receiving second power from a second AC power supply;
starting the engine by using the first power and a capacitor bank;
starting system control electronics by using the second power;
controlling, by the system control electronics, a power control board;
controlling, by the power control board, the engine;
providing output from the engine to a generator;
producing alternating current (AC) power by the generator;
converting the AC power to direct current (DC) power;
providing the DC power to an electric grid;
measuring a voltage and a frequency by a first digital phase locked loop when the voltage and the frequency are within a pre-selected range of tolerance;
continuously measuring phase error by a second digital phase locked loop;
referencing the measured voltage to the second digital phase locked loop; and
declaring phase lock when the phase error is less than a pre-selected value and when the measured voltage is within a pre-selected range of voltage.

19. The method as in claim 18 further comprising:
measuring voltage and frequency of the electric grid; and
recording the voltage and the frequency in a continuously running log file.

20. The method as in claim 19 further comprising reporting, via CANbus, the voltage and the frequency to a system controller.

* * * * *